(12) United States Patent
Nakamura et al.

(10) Patent No.: US 11,873,935 B2
(45) Date of Patent: Jan. 16, 2024

(54) INTERNAL HEAT EXCHANGER AND REFRIGERATION CYCLE APPARATUS HAVING THE INTERNAL HEAT EXCHANGER

(71) Applicants: DENSO AIR SYSTEMS CORPORATION, Anjyo (JP); DENSO CORPORATION, Kariya (JP)

(72) Inventors: Fumiaki Nakamura, Kariya (JP); Minoru Maruyama, Anjo (JP); Hideaki Inazawa, Kariya (JP); Masao Mutai, Azumino (JP); Kouichi Satou, Kariya (JP); Nobumichi Harada, Kariya (JP)

(73) Assignees: DENSO AIR SYSTEMS CORPORATION, Anjo (JP); DENSO CORPORATION, Kariya (JP)

( * ) Notice: Subject to any disclaimer, the term of this patent is extended or adjusted under 35 U.S.C. 154(b) by 325 days.

(21) Appl. No.: 17/179,592

(22) Filed: Feb. 19, 2021

(65) Prior Publication Data

US 2021/0172684 A1    Jun. 10, 2021

Related U.S. Application Data

(63) Continuation of application No. PCT/JP2019/046331, filed on Nov. 27, 2019.

(30) Foreign Application Priority Data

Dec. 5, 2018   (JP) .................................. 2018-228035
Nov. 21, 2019  (JP) .................................. 2019-210354

(51) Int. Cl.
*F16L 39/00*    (2006.01)
*F28D 7/10*     (2006.01)
(Continued)

(52) U.S. Cl.
CPC ............ *F16L 39/005* (2013.01); *F25B 41/33* (2021.01); *F28D 7/10* (2013.01); *F28F 9/22* (2013.01); *F28F 2009/222* (2013.01)

(58) Field of Classification Search
CPC . F16L 39/005; F28F 9/22; F25B 41/33; F28D 7/10
See application file for complete search history.

(56) References Cited

U.S. PATENT DOCUMENTS

| 5,593,279 A | 1/1997 | Hayashi |
| 2003/0127859 A1* | 7/2003 | Isaksson ............... F16L 41/086 285/374 |
| 2004/0112073 A1 | 6/2004 | Ito et al. |
| 2004/0261450 A1 | 12/2004 | Yoshino et al. |

(Continued)

FOREIGN PATENT DOCUMENTS

| JP | S51133011 U | 10/1976 |
| JP | H06249378 A | 9/1994 |

(Continued)

*Primary Examiner* — Devon Russell
(74) *Attorney, Agent, or Firm* — Harness, Dickey & Pierce, P.L.C.

(57) ABSTRACT

A double pipe forms an inner flow path, through which a low-pressure side refrigerant flows, inside an inner pipe, and forms an inner-outer flow path, through which a high-pressure side refrigerant flows, between the outer pipe and the inner pipe. It comprises an expansion valve side connector and a counter-expansion valve side connector which are interposed between distal ends of the outer pipe and the inner pipe and members to be connected. An outer diameter of the outer pipe is 30 millimeters or less. A ratio of a difference between an inner diameter of the outer pipe and an outer diameter of the inner pipe with respect to the inner diameter of the outer pipe is 25% or less. A sealing member is provided to prevent a refrigerant leakage. The plurality of members are mechanically fixed.

34 Claims, 23 Drawing Sheets

(51) Int. Cl.
*F28F 9/22* (2006.01)
*F25B 41/33* (2021.01)

(56) References Cited

U.S. PATENT DOCUMENTS

| | | |
|---|---|---|
| 2006/0096314 A1 | 5/2006 | Nakamura et al. |
| 2006/0096744 A1 | 5/2006 | Nakamura et al. |
| 2006/0112556 A1 | 6/2006 | Nakamura et al. |
| 2007/0240439 A1* | 10/2007 | Klug ................... F16L 37/00 62/216 |
| 2007/0251265 A1 | 11/2007 | Kurata et al. |
| 2011/0073208 A1 | 3/2011 | Nakamura et al. |
| 2013/0192804 A1* | 8/2013 | Matsuda ............... F28D 7/106 165/154 |
| 2014/0109373 A1* | 4/2014 | Nakamura ............. F28F 1/06 29/428 |

FOREIGN PATENT DOCUMENTS

| | | | | |
|---|---|---|---|---|
| JP | H0875074 A | 3/1996 | | |
| JP | 2003207083 A | 7/2003 | | |
| JP | 2004190875 A | 7/2004 | | |
| JP | 2004270928 A | 9/2004 | | |
| JP | 2006132653 A | 5/2006 | | |
| JP | 2006162238 A | 6/2006 | | |
| JP | 2006162241 A | 6/2006 | | |
| JP | 2007285693 A | 11/2007 | | |
| JP | 2007298196 A | 11/2007 | | |
| JP | 2007298273 A | * 11/2007 | ............. | F25B 40/00 |
| JP | 2010007940 A | * 1/2010 | ............. | F28D 7/106 |
| JP | 2010096225 A | * 4/2010 | ............. | F16L 39/005 |
| JP | 2013178079 A | 9/2013 | | |
| JP | 2019132509 A | * 8/2019 | | |
| JP | 2020094793 A | 6/2020 | | |

* cited by examiner

VIII – VIII

X-X

INTERNAL HEAT EXCHANGER AND REFRIGERATION CYCLE APPARATUS HAVING THE INTERNAL HEAT EXCHANGER

CROSS REFERENCE TO RELATED APPLICATION

The present application is a continuation application of International Patent Application No. PCT/JP2019/046331 filed on Nov. 27, 2019, which designated the U.S. and claims the benefit of priority from Patent Application No. 2018-228035 filed in Japan on Dec. 5, 2018, and Patent Application No. 2019-210354 filed in Japan on Nov. 21, 2019, the whole contents of the applications are incorporated by reference in their entirety.

TECHNICAL FIELD

The disclosure herein relates to an internal heat exchanger usable in a refrigeration cycle and a refrigeration cycle apparatus having an internal heat exchanger.

BACKGROUND

An internal heat exchanger is used to improve a refrigeration cycle apparatus. The internal heat exchanger performs heat exchanger between a low-pressure refrigerant from an evaporator and a high-pressure refrigerant to the evaporator. The internal heat exchanger is required to improve efficiency. On the other hand, the internal heat exchanger is required to reduce cost. In the above aspects, or in other aspects not mentioned, there is a need for further improvements in an internal heat exchanger and a refrigeration cycle apparatus having an internal heat exchanger

SUMMARY

The internal heat exchanger according to the disclosure comprises an outer pipe forming an outside pipe of a double pipe and an inner pipe forming an inside pipe of the double pipe.

The inner pipe forms, thereinside, an inner flow path through which a refrigerant of a low-pressure side for a refrigeration cycle flows. The inner pipe and the outer pipe form, therebetween, an inner-outer flow path through which the refrigerant of a high-pressure side for the refrigeration cycle flows. The outer pipe has an outer diameter of 30 millimeters or less. A ratio of a difference between an inner diameter of the outer pipe and an outer diameter of the inner pipe to the inner diameter of the outer pipe is 25% or less.

The inner pipe and the outer pipe form, therebetween, a concentric structure which increases a flow path cross-sectional area of the inner-outer flow path and arranges the outer pipe and the inner pipe concentrically. The inner pipe has a distal end extending more outwardly in an axial direction than a distal end of the outer pipe.

Further, it comprises a connector which interposes between the outer pipe and the inner pipe and a connection target member and defines both a low-pressure communication flow path communicating the inner flow path with a refrigerant passage of the connection target member and a high-pressure communication flow path communicating the inner-outer flow path with a refrigerant flow path of the connection target member.

The distal end of the outer pipe is separated from an innermost portion of the outer pipe insertion portion of the connector to form a high-pressure communication space communicating with the high-pressure communication flow path. Further, it comprises an outer pipe side sealing member which is interposed between the outer pipe and the outer pipe insertion portion of the connector to prevent refrigerant leakage from the high-pressure communication space, and an inner pipe side sealing member which is interposed between the inner pipe and the inner pipe insertion portion of the connector to prevent refrigerant leakage from the high-pressure communication space. The double pipe and the connector are mechanically fixed.

According to this, since the high-pressure communication flow path and the low-pressure communication flow path of the connector connects the inner-outer flow path and the inner flow path with the refrigerant flow path of the connection target member, it is possible to communicate the inner-outer flow path with the refrigerant flow path of the connection target member without branching the refrigerant pipe from the double pipe (the outer pipe and the inner pipe). Therefore, it is possible to reduce the number of refrigerant pipe branched from the double pipe.

Here, "mechanically fixed" means that it is fixed by bolts, screws, crimping, press fitting, etc. That is, fixing by material bonding between base materials such as welding, brazing, and solid phase bonding, and chemical fixing such as adhesion do not correspond to "mechanically fixed".

In the internal heat exchanger according to the disclosure, the inner flow path is used as a low-pressure refrigerant flow path, the inner-outer flow path is used as a high-pressure refrigerant flow path, and the inner diameter of the outer pipe is defined as the inner diameter of the outer pipe. Since the ratio of the difference from the outer diameter of the inner pipe is 25% or less, it is possible to increase the flow path cross-sectional area of the inner flow path and to reduce the flow path cross-sectional area of the inner-outer flow path. Since a pressure loss due to the flow of the refrigerant is larger in the inner passage through which the gas refrigerant flows than in the inner-outer flow path through which the liquid refrigerant flows, increasing a cross-sectional area of the inner flow path leads to an improvement in the efficiency of the refrigeration cycle.

In addition, since the ratio of the difference between the inner diameter of the outer pipe and the outer diameter of the inner pipe to the inner diameter of the outer pipe is 25% or less, it becomes easy to align the axes of the inner pipe and the outer pipe.

Further, it is possible to suppress the cross-sectional area of the refrigerant flow path (the inner flow path and the inner-outer flow path) as a whole by setting the outer diameter of the outer pipe to 30 millimeter or less. As a result, the amount of refrigerant circulating in the refrigeration cycle is not be unnecessarily increased. Since the amount of refrigerant increases in the inner-outer flow path through which the liquid refrigerant flows, setting a ratio of an average value of differences between an inner diameter of the outer pipe and an outer diameter of the inner pipe with respect to the inner diameter of the outer pipe to 25% or less is desirable to reduce the amount of refrigerant circulating in the cycle.

Further, the outer pipe and the inner pipe form, therebetween, a concentric structure which increases a cross-sectional area of the inner-outer flow path and arrange the outer pipe and the inner pipe concentrically, therefore, axes of the inner pipe and the outer pipe are more accurately aligned. Therefore, the sealing members are properly sandwiched and held between both the end portion of the inner pipe and the end portion of the outer pipe and the insertion portion of the connector while inserting and mechanically fixing both the end portion of the inner pipe and the end portion of the outer pipe into the inner pipe insertion portion and the outer pipe insertion portion.

According to the internal heat exchanger disclosed, the high-pressure communication space which communicates with the high-pressure communication flow path is formed between the distal end of the outer pipe and the innermost portion of the outer pipe insertion portion of the connector, and this high-pressure communication space is securely sealed by the sealing member arranged on the outer pipe and the sealing member arranged on the inner pipe.

The internal heat exchanger according to the disclosure is provided with attachments to which at least one of a service valve, a pressure switch and a pressure sensor is attached to the connector. As a result, the connector can be used as the attachment for a service valve or the like, and the attachment member for the service valve or the like can be eliminated, it is possible to reduce cost.

In the internal heat exchanger according to the disclosure, a concentric structure is formed by a structure in which a spiral groove is formed one of the inner pipe or the inner pipe, and a ridge portion of the spiral groove is formed on the other one of the inner pipe and the outer pipe. A surface area is increased by forming the spiral groove, and since the inner pipe and the outer pipe are in contact with each other, it is possible to improve the heat exchange efficiency of the internal heat exchanger.

In the internal heat exchanger according to the disclosure, a relationship between the distal end of the inner pipe, the inner pipe side sealing member, the distal end of the outer pipe, the outer pipe side sealing member, and the inner pipe insertion portion and the outer pipe insertion portion of the connector defines a structure in which, at inserting the inner pipe and the outer pipe into the connector, first, the distal end of the inner pipe comes into contact with the inner pipe insertion portion, next, the distal end of the outer pipe comes into contact with the outer pipe insertion portion, after that, the inner pipe side sealing member comes into contact with the inner pipe insertion portion, and finally, the outer pipe side sealing member comes into contact with the outer pipe insertion portion.

As a result, the axis alignment is performed between the connector and the inner pipe, after that, the axis alignment is performed between the connector and the outer pipe. Even if the axes of the inner pipe and the outer pipe are slightly deviated, are able to combine smoothly. The inner pipe side sealing member and the outer pipe side sealing member are inserted in a state of being axially aligned with each other. Since the outer pipe side sealing member is inserted after the inner pipe side sealing member is inserted, assembling process becomes smooth.

In the internal heat exchanger according to the disclosure, a gap is formed between the distal end of the inner pipe and the innermost portion of the inner pipe insertion portion. According to the internal heat exchanger in the disclosure, a contact portion which comes into contact with the connector is formed on the end portion of the outer pipe in an outer peripheral direction, and a distance of the distal end of the inner pipe and the innermost portion of the inner pipe insertion portion is longer than a distance of the distal end of the outer pipe and the innermost portion of the outer pipe insertion portion. As a result, it is possible to reliably bring the contact portion into contact with the connector by forming a gap between the distal end of the inner pipe and the innermost portion of the inner pipe insertion portion.

In the internal heat exchanger according to the disclosure, a portion inside than the distal end at the end portion of the outer pipe is press formed inward in the radial direction of the outer pipe over a predetermined length. That is, the outer pipe is press formed toward the inner pipe so that a diameter is reduced at the end portion. It is possible to align axes of the inner pipe and the outer pipe at ends by this pipe contracting, as a result, a positional alignment when the inner pipe and the outer pipe are inserted into the connector is ensured.

According to the internal heat exchanger disclosed, connectors are arranged on both sides of the inner pipe and the outer pipe. In this structure, the internal heat exchanger connects an entire length between the two connectors. Therefore, an amount of heat exchange in the internal heat exchanger is uniquely determined based on the lengths of the inner pipe and the outer pipe.

Therefore, the internal heat exchanger disclosed is configured so that the inner pipe and the outer pipe perform, therebetween, heat exchange efficiencies which are different at a part of portion between the inner pipe and the outer pipe and at another portion. As a result, the amount of heat exchange provided by a whole of the internal heat exchanger may be adjusted by adjusting the length of a part of the parts, it is possible to optimize a thermal efficiency of the entire refrigeration cycle.

The disclosure provides a refrigeration cycle apparatus having an internal heat exchanger. The refrigeration cycle apparatus includes a compressor, a condenser, an expansion valve for an indoor air-conditioning unit, an evaporator for the indoor air-conditioning unit, and an expansion valve for a rear cooler, an evaporator for the rear cooler, and an internal heat exchanger.

The internal heat exchanger comprises a connector located at the end portions of the outer pipe and the inner pipe. This connector is formed with a high-pressure communication flow path for communicating the inner-outer flow path with the refrigerant flow path of the connection target member and a low-pressure communication flow path for communicating the inner flow path with the refrigerant passage of the connection target member. In addition, the internal heat exchanger is interposed between both the condenser and the compressor, and the expansion valve of the indoor air-conditioning unit. Then, the connector connects the high-pressure communication flow path to the condenser and at least one of the expansion valve for the indoor air-conditioning unit and the expansion valve for the rear cooler. Further, the connector connects the low-pressure communication flow path to the compressor and at least one of the expansion valve for the indoor air-conditioning unit and the expansion valve for the rear cooler.

Since the refrigeration cycle apparatus according to the disclosure has an internal heat exchanger interposed between both the condenser and the compressor, and the expansion valve of the indoor air-conditioning unit, it is possible to increase enthalpy of both the indoor air-conditioning unit and the rear cooler. In addition, the liquid refrigerant flowing from the condenser to both the indoor air-conditioning unit and the rear cooler can be collected by the internal heat exchanger.

Reference numerals in parentheses in each means described in this section and the claims indicate an example of correspondence between the means and specific means described in the embodiment described later.

BRIEF DESCRIPTION OF THE DRAWINGS

The disclosure is further described with reference to the accompanying drawings in which.

DESCRIPTION OF EMBODIMENT

Figure 1:
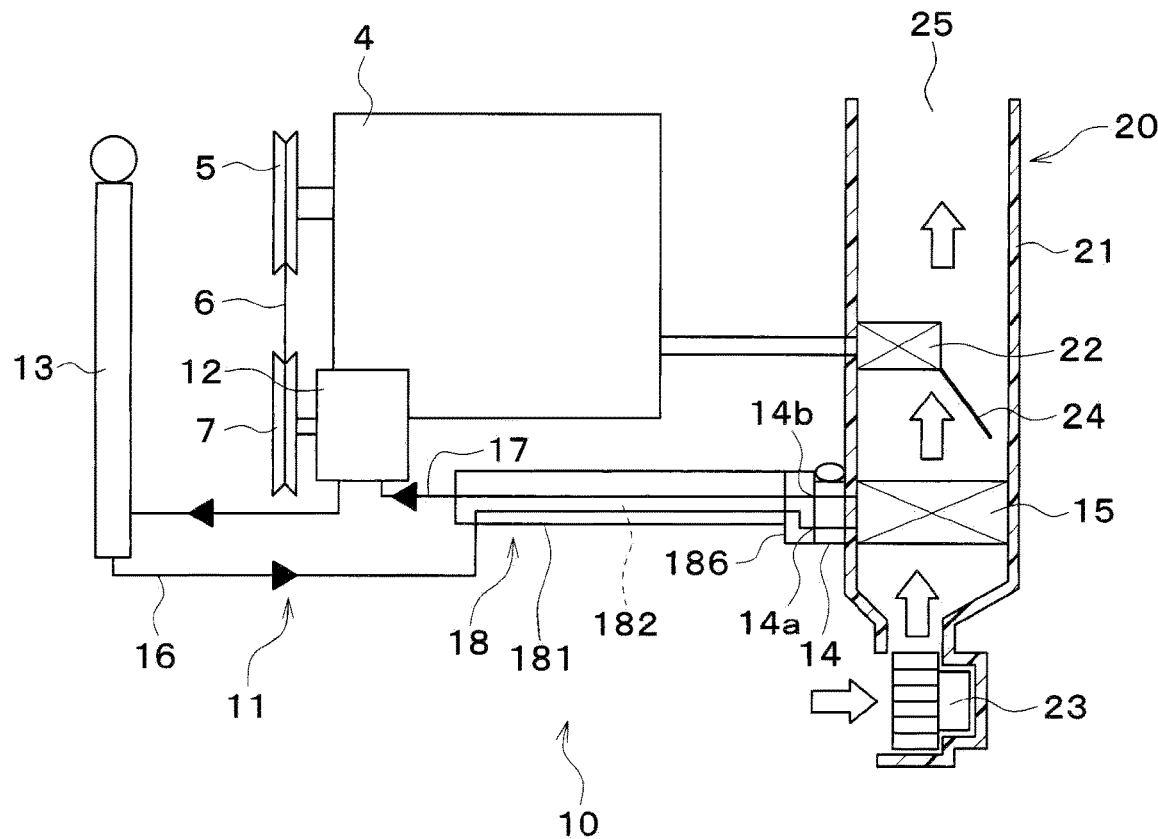
FIG. 1 is an overall configuration diagram of a refrigeration cycle apparatus in a first embodiment.

A disclosed internal heat exchanger described has a double pipe including an outer pipe and an inner pipe. A high-pressure liquid refrigerant from a condenser of the refrigeration cycle flows through an inner-outer flow path formed between the outer pipe and the inner pipe. The low-pressure gas refrigerant evaporated by an evaporator of the refrigeration cycle flows through a flow path formed inside the inner pipe. As a result, the double pipe functions as an internal heat exchanger.

A liquid pipe is brazed to a circumferential wall surface on both ends in a longitudinal direction of the outer pipe. The liquid pipe on one end side in the longitudinal direction of the outer pipe is a high-pressure pipe which communicates a refrigerant outlet of the condenser and the inner-outer flow path. The liquid pipe on the other end side in the longitudinal direction of the outer pipe is a high-pressure pipe which communicates the inner-outer flow path and a high-pressure refrigerant inlet of an expansion valve.

A suction pipe is brazed to a circumferential wall surface on both ends in the longitudinal direction of the inner pipe. The suction pipe on one end side in the longitudinal direction of the inner pipe is a low-pressure pipe which communicates an inner flow path of the inner pipe with a refrigerant suction port of a compressor of the refrigeration cycle. The suction pipe on the other end side in the longitudinal direction of the inner pipe is a low-pressure pipe which communicates a low-pressure refrigerant outlet of the expansion valve with the inner flow path of the inner pipe.

The inner pipe may be used as the high-pressure pipe communicating the refrigerant outlet of the condenser with the high-pressure refrigerant inlet of the expansion valve, and the inner-outer flow path is used as the low-pressure pipe through which the low-pressure refrigerant evaporated in the evaporator of the refrigerant cycle flows.

In this structure, the double pipe may be connected to a connector via an O-ring without brazing the double pipe with the liquid pipe and the suction pipe.

Since the liquid pipe and the suction pipe are branched from the double pipe, a space for arranging the liquid pipe and the suction pipe is required, and the overall physique becomes large. As a result, the space required for mounting becomes large and design restrictions become tight, and when a large number of the double pipes are transported at the same time, a packing shape becomes poor and a transportation efficiency becomes low. When transporting the double pipe, the liquid pipe and the suction pipe may be bent or damaged.

In addition, since it is hard to perform internal heat exchange on a terminal side than a part where the liquid pipe or suction pipe is branched, a length performing internal heat exchange is shortened, and an improving effect of a cycle efficiency is limited.

Further, since the liquid pipe and the suction pipe are brazed to the double pipe, if the brazing quality is insufficient, the refrigerant may leak. It is hard to ensure a stable manufacturing quality.

On the other hand, even if brazing is not performed, the inner pipe may be a high-pressure pipe and the inner-outer flow path is a low-pressure pipe. Therefore, it is necessary to design a flow path cross-sectional area of the inner pipe small and a flow path cross-sectional area of the inner-outer flow path large, and it is necessary to increase a distance between an inner diameter of the outer pipe and an outer diameter of the inner pipe by designing the inner pipe with a smaller diameter. Moreover, the internal heat exchanger may not have a structure such as a rib bridging both pipes between the inner pipe and the outer pipe because the inner-outer flow path is a low-pressure pipe. Therefore, it is difficult to arrange the inner pipe and the outer pipe concentrically.

It is an object of the disclosure to perform sure connection between the double pipe and the connector, while employing a structure in which the double pipe is directly connected to the connector by reducing the number of refrigerant pipe branching from the double pipe.

Hereinafter, embodiments is described with reference to the drawings. In the following embodiments, identical or equivalent elements are denoted by the same reference numerals as each other in the figures.

First Embodiment

A vehicle air-conditioner 10 shown in FIG. 1 has a refrigeration cycle apparatus 11. A double pipe type internal heat exchanger 18 is applied to the refrigeration cycle apparatus 11. The refrigeration cycle apparatus 11 is a vapor-compression refrigerator including a compressor 12, a condenser 13, an expansion valve 14, and an evaporator 15. According to the refrigeration cycle apparatus 11 of the present embodiment, a fluorocarbon refrigerant is used as the refrigerant to configure a sub-critical refrigeration cycle in which a high-pressure side refrigerant pressure does not exceed a critical pressure of the refrigerant.

The compressor 12 and the condenser 13 are arranged in an engine room of a vehicle (not shown). The expansion valve 14 and the evaporator 15 are arranged in a passenger compartment of the vehicle. The compressor 12, the condenser 13, the expansion valve 14, and the evaporator 15 are connected in series with respect to a flow of the refrigerant.

The compressor 12 sucks, compresses, and discharges the refrigerant of the refrigeration cycle apparatus 11. The compressor 12 is a belt driven type compressor or an electric driven compressor. The belt-driven compressor is driven by transmitting driving force of an engine 4 via a crank pulley 5, a drive belt 6, and a pulley 7. The electric driven compressor is driven by a motor powered by electric power supplied from a battery.

The condenser 13 is a radiator which condenses the high-pressure refrigerant by performing heat exchange between an outside air and the high-pressure gas refrigerant discharged from the compressor 12, and radiates heat from the high-pressure gas refrigerant to the outside air. The condenser 13 is disposed on a vehicle front side inside the engine room. The liquid-phase refrigerant condensed by the condenser 13 flows into the high-pressure refrigerant inlet 14a of the expansion valve 14 via the high-pressure refrigerant pipe 16. The high-pressure refrigerant pipe 16 corresponds to an inner-outer flow path 18a of the internal heat exchanger 18.

The expansion valve 14 serves as a pressure reducer to decompress and expand the liquid-phase refrigerant flowing out of the high-pressure refrigerant pipe 16. The expansion valve 14 includes a thermos-sensitive portion. The thermos-sensitive portion detects a super-heat degree of an outlet side refrigerant of the evaporator 15 based on a temperature and a pressure of the outlet side refrigerant of the evaporator 15. The expansion valve 14 is a thermos-sensitive expansion valve which adjusts an orifice passage cross sectional area by a mechanical mechanism so that the super-heat degree of the outlet side refrigerant of the evaporator 15 falls within a specified range.

The evaporator 15 is a heat exchanger for cooling air which evaporates the low-pressure refrigerant by performing heat exchange between the low-pressure refrigerant flowing out of the expansion valve 14 and the air sent to the passenger compartment, and thereby cools the air sent to the passenger compartment. The gas phase refrigerant evaporated in the evaporator 15 flows into the temperature sensitive portion of the expansion valve 14. The refrigerant passed through the temperature sensitive portion of the expansion valve 14 flows out from the low-pressure refrigerant outlet 14b of the expansion valve 14 to the low-pressure refrigerant pipe 17, and is sucked into the compressor 12 via the low-pressure refrigerant pipe 17, and is compressed. The low-pressure refrigerant pipe 17 corresponds to an inner flow path 18b of the internal heat exchanger 18.

The evaporator 15 is accommodated in the casing 21 of the indoor air-conditioning unit 20. The indoor air-conditioning unit 20 is disposed on an inside of an instrument panel (not shown) at a front portion of the passenger compartment. The casing 21 is an air-passage forming member which defines an air passage therein. In the air passage in the casing 21, a heater core 22 is arranged on an air flow downstream side of the evaporator 15. The heater core 22 is a heat exchanger for heating air which is configured to perform heat exchange between the engine cooling water and air supplied to the vehicle compartment thereby heating the air supplied to the vehicle compartment.

An inside/outside air switching case (not shown) and an indoor blower 23 are arranged in the casing 21. The inside/outside air switching case is an inside/outside air switching unit which selectively introduces an inside air and an outside air into the air passage of the casing 21. The indoor blower 23 draws the inside air and the outside air introduced into the air passage of the casing 21 via the inside/outside air switching case.

An air mix door 24 is arranged between the evaporator 15 and the heater core 22 in the air passage of the casing 21. The air mix door 24 adjusts an air flow ratio between a cool air, which flows into the heater core 22, and a cool air, which bypasses the heater core 22, among a cool air passing through the evaporator 15. The air mix door 24 is a rotary door which includes a rotary shaft supported by the casing 21 in a rotatable manner, and a door plate body coupled with the rotary shaft. It is possible to adjust a temperature of conditioned air, which is discharged from the casing 21 into the passenger compartment, by adjusting an opening position of the air mix door 24.

Outlet openings 25 are formed at the most downstream end of the air flow of the casing 21. Although not shown in FIG. 1, a plurality of outlet openings 25 are formed. The conditioned air of which temperature is adjusted in the casing 21 is discharged into the passenger compartment that is the air-conditioning target space through the outlet openings 25. An outlet mode switching door (not shown) is arranged air flow upstream side to the plurality of outlet openings 25. The outlet mode switching door is configured to switch the outlet modes. The outlet mode include a face mode, a bi-level mode, a foot mode, and a vent mode.

Figure 2:
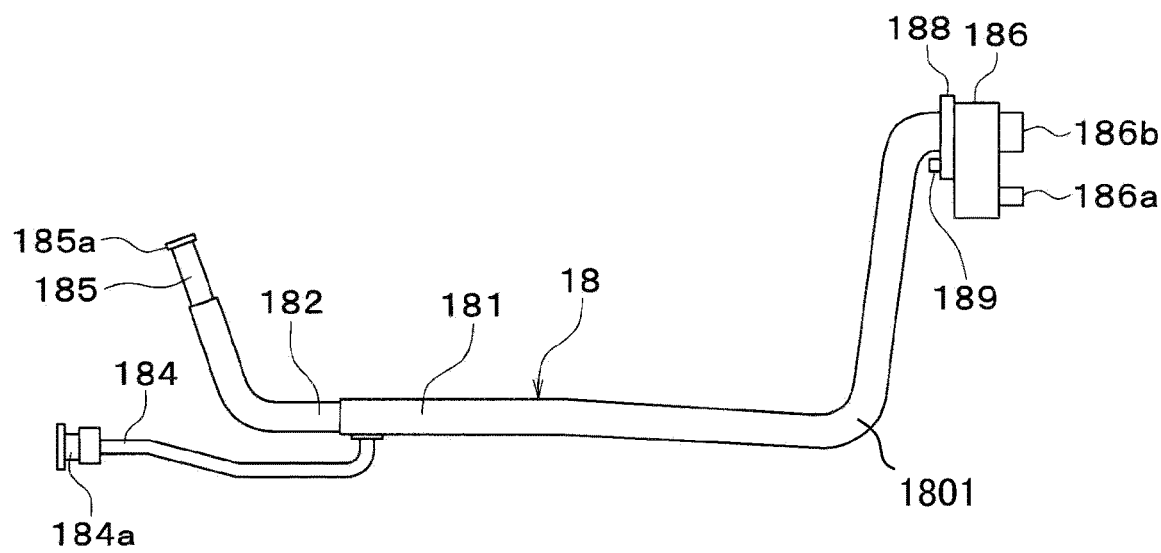
FIG. 2 is an overall configuration diagram of an internal heat exchanger according to the first embodiment.
Figure 3:
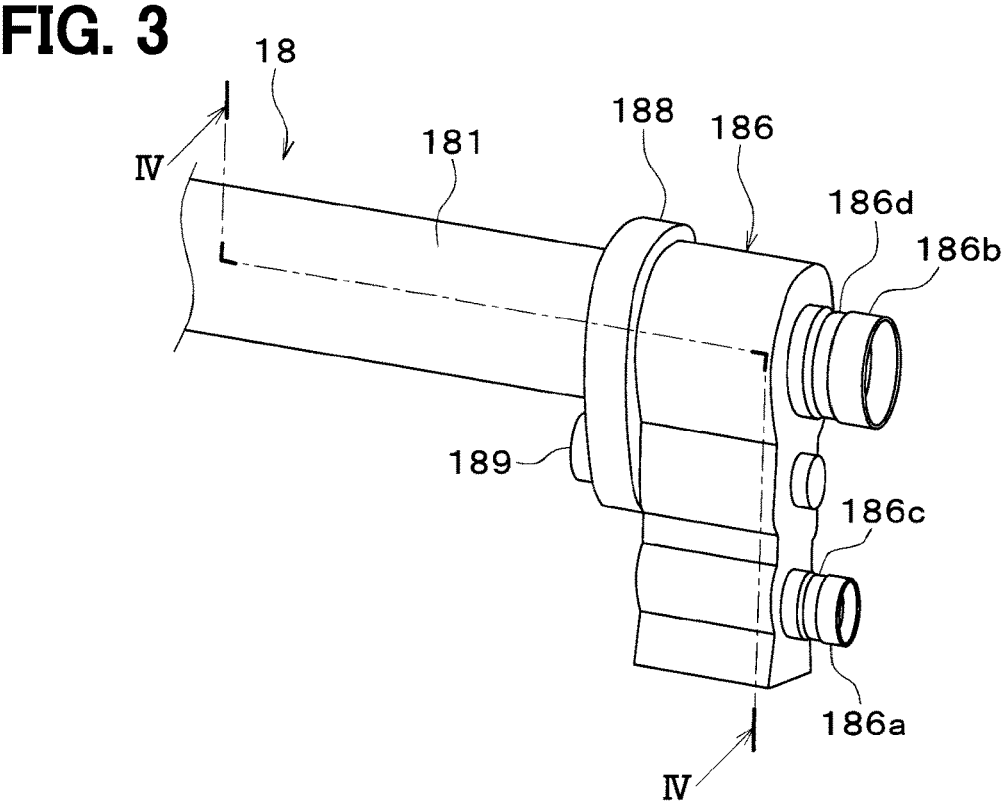
FIG. 3 is a perspective view showing a part of an internal heat exchanger according to the first embodiment.
Figure 4:
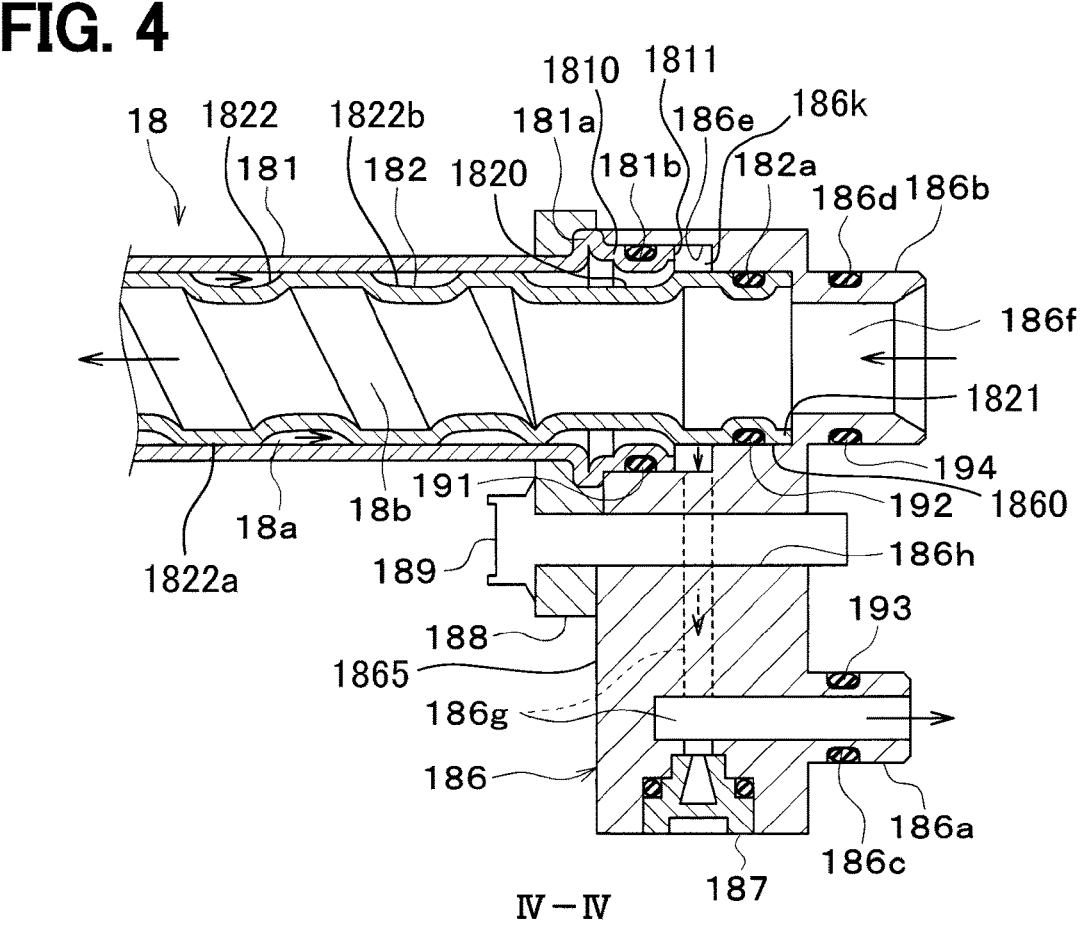
FIG. 4 is a cross-sectional view on a line IV-IV of FIG. 3.

At least a part of the high-pressure refrigerant pipe 16 and at least a part of the low-pressure refrigerant pipe 17 are provided by the double pipe type internal heat exchanger 18 shown in FIGS. 2 to 4. The internal heat exchanger 18 has a total length of about 200 to 1200 mm.

The length of this internal heat exchanger 18 is determined according to the required heat exchange capacity. That is, the internal heat exchanger 18 increases an enthalpy of the refrigeration cycle apparatus 11 by performing heat exchange between the low-temperature and low-pressure gas-phase refrigerant toward the compressor 12 and the high-temperature and high-pressure liquid-phase refrigerant toward the expansion valve 14. Therefore, the internal heat exchanger 18 is required to have a length sufficient to obtain a desired enthalpy. On the other hand, if the amount of heat exchanged by the internal heat exchanger 18 is too large, the temperature of the refrigerant sucked into the compressor rises too much, which is not desirable. Therefore, in a case that the length of the internal heat exchanger 18 is determined, it is desired to adjust the amount of heat exchange in the internal heat exchanger 18. The adjustment of this heat exchange amount is described later.

There may be a case in which the internal heat exchanger 18 is covered with a heat insulating material in order to block heat transfer from the outside air to the internal heat exchanger 18. This case is that, for example, the internal heat exchanger 18 is arranged in the engine room, and a direct heating of the internal heat exchanger 18 from the engine is prevented.

As shown in FIG. 2, the double pipe type internal heat exchanger 18 includes an outer pipe 181 and an inner pipe 182. The inner pipe 182 is inserted into the outer pipe 181 to penetrate the outer pipe 181. As a result, a double pipe is formed by the outer pipe 181 and the inner pipe 182.

The outer pipe 181 is, for example, φ22 mm pipe made of aluminum. The φ22 mm pipe is a pipe having an outer diameter of 22 mm and an inner diameter of 19.6 mm. As one of the vehicle air-conditioners 10, the outer pipe 181 used in the automobile air-conditioner has an outer diameter of about 22 mm in order to make the diameter as small as possible. Even in a case that the outer pipe 181 is designed large to enable a large circulating amount of refrigerant, it is desirable to design it less than 28 mm. Further, the wall thickness of the outer pipe 181 is also designed about 1.2 mm, and even if it is thickened, it is designed less than 2 mm.

The inner pipe 182 is, for example, a ¾ inch pipe made of aluminum. The ¾ inch pipe is a pipe having an outer diameter of 19.1 mm and an inner diameter of 16.7 mm. In this way, sizes are selected to increase a surface area of the inner pipe 182 while satisfying both ensuring of the inner-outer flow path 18a and setting the outer diameter of the inner pipe 182 and the inner diameter of the outer pipe 181 as close as possible.

Since the low-pressure gas refrigerant flows inside the inner pipe 182 (inner flow path 18b), it is necessary to secure a sufficient cross-sectional area of the flow path. In particular, since the gas refrigerant has a larger volume and a higher flow velocity than the liquid refrigerant, the pressure loss when flowing through the inner flow path 18b is much larger than that of the liquid refrigerant flowing through the inner-outer flow path 18a. Therefore, as a design concept of the internal heat exchanger 18, the inner diameter of the inner pipe 182 is determined so that the inner pipe 182 has a sufficient flow path cross-sectional area, and the outer diameter of the inner pipe 182 is determined based on a wall thickness of about 1 to 2 mm. The outer diameter of the inner pipe 182 is about 15.8 to 22 mm.

The diameter of the outer pipe 181 is designed to be the minimum within the range in which the high-pressure liquid refrigerant can flow through the inner-outer flow path 18a according to the outer diameter of the inner pipe 182. This is because the high-pressure liquid refrigerant flows through the inner-outer flow path 18a, enlarging the cross-sectional view of the inner-outer flow path 18a adversely requires unnecessarily large amount of refrigerant sealed in the refrigeration cycle. It is possible to reduce cost by reducing the amount of refrigerant used in the refrigeration cycle.

Therefore, the ratio of the difference between the inner diameter of the outer pipe 181 and the outer diameter of the inner pipe 182 to the inner diameter of the outer pipe 181 is set 25% or less. More preferably, it is set 20% or less.

Figure 12:
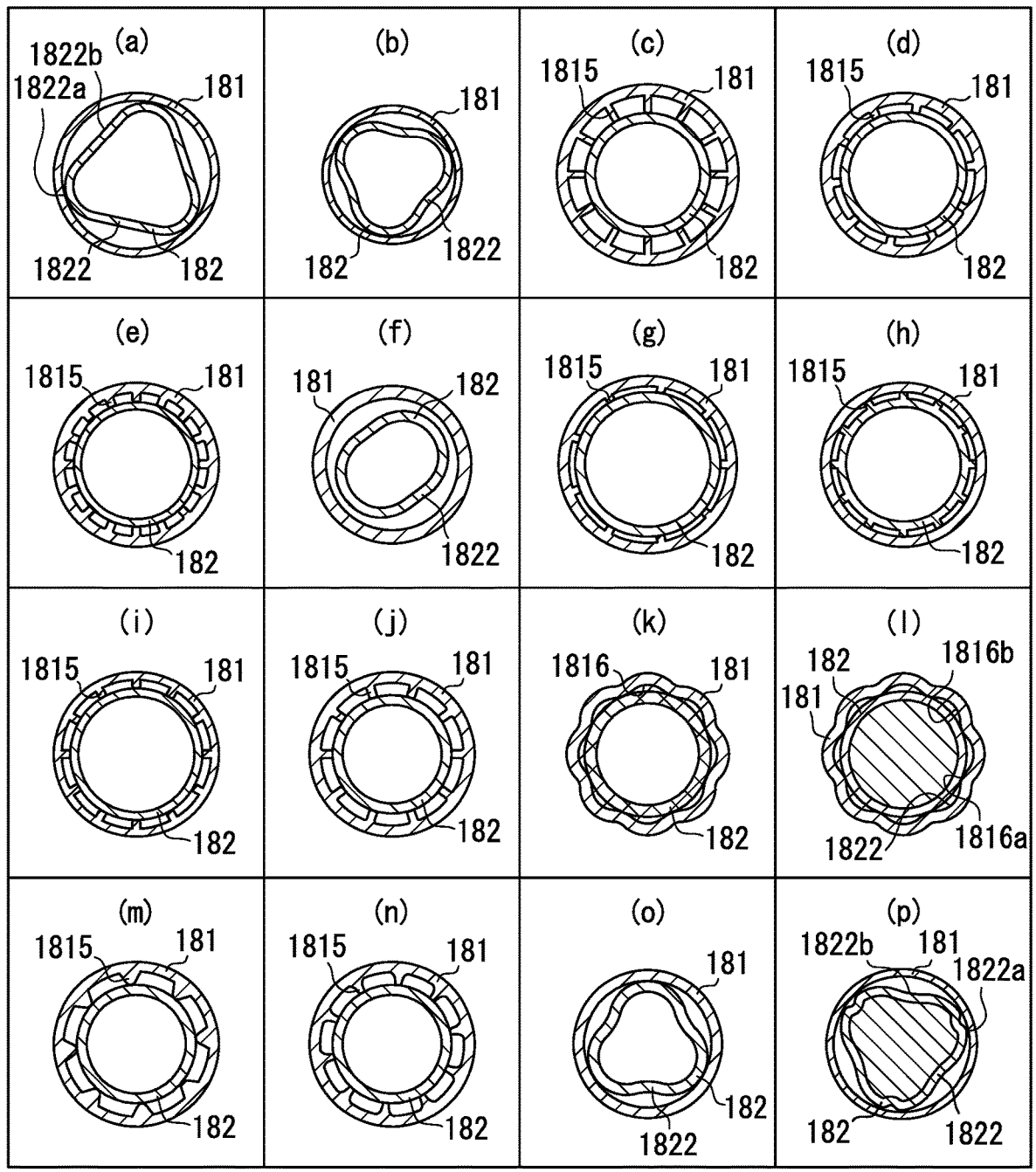
FIG. 12 is a cross-sectional view of double pipes.

Drawings (a) to (o) in FIG. 12 show the cross-sectional shape of the double pipe, and the outer diameter and wall thickness of each are as follows. Further, the ratio of the difference between the inner diameter of the outer pipe 181 and the outer diameter of the inner pipe 182 to the inner diameter of the outer pipe 181 calculated based on this dimension is also as follows, and is set 20% or less.

FIG. 12(*a*): Outer pipe outer diameter 25 mm, Outer pipe wall thickness 1.2 mm, Inner pipe outer diameter 22.1 mm, Inner pipe wall thickness 1.2 mm, Ratio 2.2%

FIG. 12(*b*): Outer pipe outer diameter 21.1 mm, Outer pipe wall thickness 1.2 mm, Inner pipe outer diameter 19.1 mm, Inner pipe wall thickness 1.2 mm, Ratio 3.0%

FIG. 12(*c*): Outer pipe outer diameter 27.5 mm, Outer pipe wall thickness 1.7 mm, Inner pipe outer diameter 21.9 mm, Inner pipe wall thickness 1.5 mm, Ratio 9.1%

FIG. 12(*d*): Outer pipe outer diameter 25 mm, Outer pipe wall thickness 1.7 mm, Inner pipe outer diameter 19.1 mm, Inner pipe wall thickness 1.3 mm, Ratio 11.6%

FIG. 12(*e*): Outer pipe outer diameter 25 mm, Outer pipe wall thickness 1.6 mm, Inner pipe outer diameter 18.9 mm, Inner pipe wall thickness 1.1 mm, Ratio 13.3% FIG. 12(*f*): Outer pipe outer diameter 24 mm, Outer pipe wall thickness 2 mm, Inner pipe outer diameter 17.8 mm, Inner pipe wall thickness 1.5 mm, Ratio 11.0%

FIG. 12(*g*): Outer pipe outer diameter 27 mm, Outer pipe wall thickness 1.6 mm, Inner pipe outer diameter 22 mm, Inner pipe wall thickness 1.5 mm, Ratio 7.6%

FIG. 12(*h*): Outer pipe outer diameter 25 mm, Outer pipe wall thickness 1.5 mm, Inner pipe outer diameter 20 mm, Inner pipe wall thickness 1.3 mm, Ratio 9.1%

FIG. 12(*i*): Outer pipe outer diameter 25 mm, Outer pipe wall thickness 1.2 mm, Inner pipe outer diameter 20 mm, Inner pipe wall thickness 1.2 mm, Ratio 11.5%

FIG. 12(*j*): Outer pipe outer diameter 25 mm, Outer pipe wall thickness 1.7 mm, Inner pipe outer diameter 18 mm, Inner pipe wall thickness 1.5 mm, Ratio 16.7%

FIG. 12(*k*): Outer pipe outer diameter 24.6 mm, Outer pipe wall thickness 1.8 mm, Inner pipe outer diameter 19.1 mm, Inner pipe wall thickness 1.8 mm, Ratio 9.1% FIG. 12(*l*): Outer pipe outer diameter 24.6 mm, Outer pipe wall thickness 1.7 mm, Inner pipe outer diameter 19.1 mm, Inner pipe wall thickness 1.3 mm, Ratio 9.9%

FIG. 12(*m*): Outer pipe outer diameter 25 mm, Outer pipe wall thickness 1.5 mm, Inner pipe outer diameter 18 mm, Inner pipe wall thickness 1.5 mm, Ratio 18.2%

FIG. 12(*n*): Outer pipe outer diameter 25 mm, Outer pipe wall thickness 1.6 mm, Inner pipe outer diameter 18 mm, Inner pipe wall thickness 1.5 mm, Ratio 17.4%

FIG. 12(*o*): Outer pipe outer diameter 22.5 mm, Outer pipe wall thickness 1.6 mm, Inner pipe outer diameter 19.1 mm, Inner pipe wall thickness 1.6 mm, Ratio 1.0%

FIG. 12(*p*): Outer pipe outer diameter 22.5 mm, Outer pipe wall thickness 1.6 mm, Inner pipe outer diameter 19.1 mm, Inner pipe wall thickness 1.6 mm, Ratio 1.0%

The double pipes (a), (b), (f), (o) and (p) in FIG. 12 has a spiral groove 1822 on the inner pipe 182. The outer diameter of the inner pipe 182 on which the spiral groove 1822 is formed is indicated by the dimension before the spiral groove 1822 is formed, that is, the outer diameter dimension of the inner pipe 182 at the portion where the spiral groove 1822 is not formed.

The spiral groove 1822 includes recessed groove portions 1822b and ridge portions 1822a, and is configured to have a structure in which the ridge portion 1822a abuts on the outer pipe 181 at a plurality of portions. Therefore, a concentric structure in which the inner pipe 182 and the outer pipe 181 are arranged coaxially is formed by coming into contact the outer peripheral surface of the inner pipe 182 with the inner peripheral surface of the outer pipe 181.

The double pipe shown in FIG. 12(p) further has a recess on a ridge portion 1822a to widen a width of the ridge portion 1822a. As described above, the shapes of the ridge portion 1822a and the groove portion 1822b may be changed to meet requirements.

Further, the double pipes (k) and (l) in FIG. 12 has a spiral groove 1816 on the outer pipe 181. The outer diameter of the outer pipe 181 is the dimension before the spiral groove 1816 is formed, that is, the outer diameter dimension of the outer pipe 181 at the portion where the spiral groove 1816 is not formed.

The spiral groove 1816 is also includes recessed groove portions 1816b and ridge portions 1816a, and the ridge portion 1816a comes in contact with the outer peripheral surface of the inner pipe 182 at a plurality of portions. Therefore, a concentric structure in which the inner pipe 182 and the outer pipe 181 are arranged coaxially is formed by coming into contact the outer peripheral surface of the inner pipe 182 with the inner peripheral surface of the outer pipe 181. Since the ridge portion represents a contact portion, the spiral groove 1822 of the inner pipe 182 and the spiral groove 1816 of the outer pipe 181 are opposite to each other. That is, the ridge portion 1822a is formed to protrude outward in the spiral groove 1822 of the inner pipe 182, and the ridge portion 1816a is formed to protrude inward in the spiral groove 1816 of the outer pipe 181.

By forming the spiral grooves 1822 and 1816 in the inner pipe 182 or the outer pipe 181 in this way, the inner pipe 182 and the outer pipe 181 can come into contact with each other at a plurality of places, and the inner pipe 182 and the outer pipe 181 are coaxially arranged and provides a concentric structure.

In addition, it is possible to enlarge the surface area of the inner pipe 182 or the outer pipe 181 by forming the spiral grooves 1822 and 1816 on the inner pipe 182 or the outer pipe 181. In particular, in a case that the spiral groove 1822 is formed on the inner pipe 182, it is possible to increase the heat exchange area between the inner flow path 18b and the inner-outer flow path 18a.

Further, heat exchange between the inner flow path 18b and the inner-outer flow path 18a is promoted by contacting the inner pipe 182 and the outer pipe 181 at the ridge portion 1822a and 1816a of the spiral grooves 1822 and 1816 formed on the inner pipe 182 or the outer pipe 181.

Further, the double pipes (c), (d), (e), (g), (i), (j), (m) and (n) of FIG. 12 have ribs 1815, which are formed at equal intervals and toward inwardly, on the outer pipe 181, and are configured so that distal ends of the ribs 1815 come into contact with the outer peripheral surface of the inner pipe 182 at least in part after the inner pipe 182 is inserted. The contact of the ribs 1815 also forms a concentric structure in which the inner pipe 182 and the outer pipe 181 are arranged coaxially.

In addition, the rib 1815 increases the heat exchange efficiency by increasing the surface area of the inner-outer flow path 18a, and the rib 1815 increases the heat exchange efficiency by contacting the rib 1815 with the inner pipe 182.

In the double pipe of FIG. 12(h), ribs 1815 are formed so as to protrude outward from the inner pipe 182 at equal intervals. A coaxially arranging structure of the inner pipe 182 and the outer pipe 181 is provided by contacting the distal end of the rib 1815 of the inner pipe 182 with the inner peripheral surface of the outer pipe 181 at least in part.

Moreover, the improvement of the heat exchange efficiency by the rib 1815 is the same as the above-mentioned example of the double pipe formed so as to project inward from the outer pipe 181.

It is difficult to completely match the axial cores of the inner pipe 182 and the outer pipe 181 regardless of whether the spiral grooves 1822 and 1816 and the ribs 1815 are used. Therefore, in the description of this case, the concentric structure refers to a structure that acts in the direction of aligning the axial cores of the inner pipe 182 and the outer pipe 181. Compared to a structure in which nothing exists between the inner pipe 182 and the outer pipe 181, if the spiral grooves 1822 and 1816 and the rib 1815 are formed, the inner pipe 182 and the outer pipe 181 act to align axial cores.

As shown in FIG. 2, the outer pipe 181 and the inner pipe 182 are formed with a bent portion 1801 in order to avoid interference with the engine 4, various in-vehicle devices (not shown), and a vehicle body, and the like. The bent portion 1801 is formed by simultaneously bending the outer pipe 181 and the inner pipe 182 while a straight inner pipe 182 inserted inside the straight outer pipe 181.

In this bent portion 1801, the concentric structure of the spiral grooves 1822, 1816 or the ribs 1815 is also useful for defining the inner-outer flow path 18a between the inner pipe 182 and the outer pipe 181. This is because, if there is no concentric structure, the outer surface of the inner pipe 182 and the inner surface of the outer pipe 181 may come into direct contact with each other at the bent portion 1801. In that case, the cross-sectional shape of the inner-outer flow path 18a becomes distorted, and the flow resistance increases. Contrary, if the concentric structure is provided, the outer surface of the inner pipe 182 and the inner surface of the outer pipe 181 do not come into direct contact with each other due to the concentric structure even in the bent portion 1801.

Figure 13:
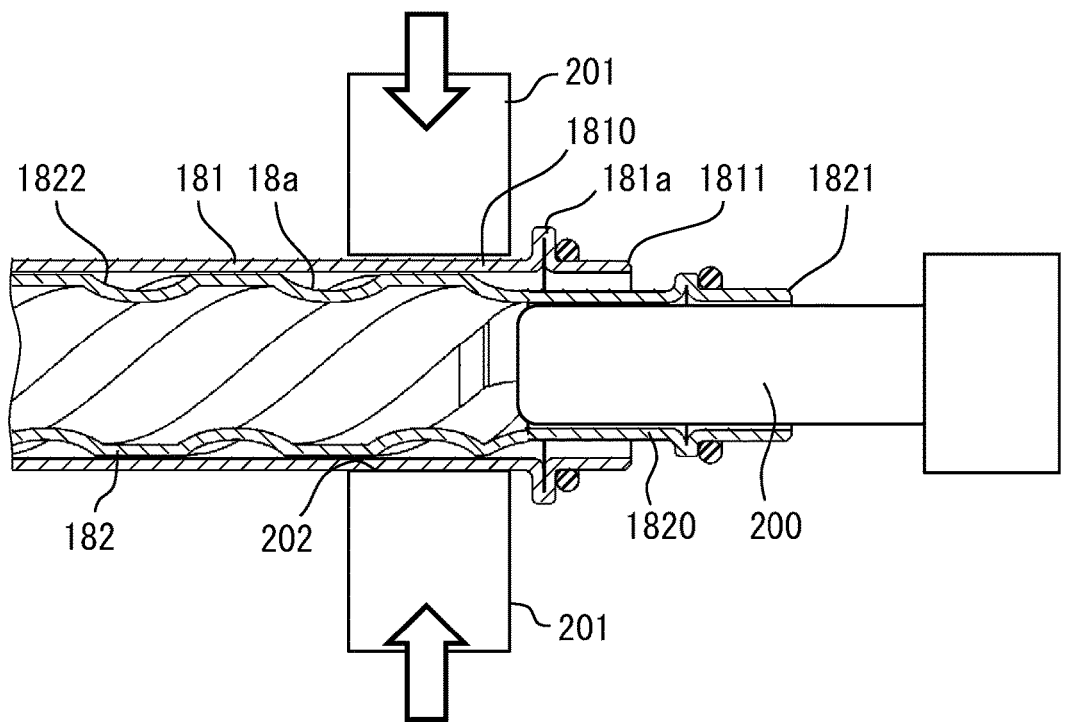
FIG. 13 is a cross-sectional view showing a pipe contracting.

An end portion 1810 of the outer pipe 181 in the longitudinal direction is combined with the inner pipe 182 and then the entire circumference thereof is pressed (pipe contracting) inward in the radial direction and joined to the circumferential surface of the inner pipe 182. As shown in FIG. 13, the pipe contracting is performed by pressing a triple-claw chuck 201 from an outside of the outer pipe 181 with a core metal 200 applied to an inside of the inner pipe 182. A distal ends 202 of the triple-claw chuck 201 define a circular cylindrical shape corresponding to the outer shape of the outer pipe 181 and presses the outer pipe 181 from three directions.

The triple-claw chuck 201 once presses the outer pipe 181, then retracts, rotates 60 degrees in a circumferential direction, and presses the outer pipe 181 again. As a result, as shown in FIG. 13, the outer pipe 181 and the inner pipe 182 are arranged concentrically, especially at the end portions 1810 and 1820. The terms of the end portions 1810 and 1820 do not mean distal ends, but indicate a portion from a position where the triple-claw chuck 201 is arranged to the distal ends. The distal end portions of the outer pipe 181 and the inner pipe 182 are illustrated by the distal end 1811 and the distal end 1821, respectively (FIG. 4).

The spiral groove 1822 of the inner pipe 182 begins from an inner side than the end portion 1820, and the spiral groove 1822 is not formed at the distal end 1821, which is in a circular cylindrical shape, than the end portion 1820 of the inner pipe 182. Therefore, the core metal 200 is a cylinder shape, and its outer surface is in contact with the inner surface of the inner pipe 182 at the front surface.

Due to this pipe contracting, the inner pipe 182 and the outer pipe 181 are placed so that axes are more aligned at the end portions 1820 and 1810. As a result, an inserting work into the connector described later becomes smooth.

As shown in FIG. 4, a space is defined between the outer pipe 181 and the inner pipe 182, and this space is provided as the inner-outer flow path 18a. The internal space of the inner pipe 182 is an inner flow path 18b. Flow direction of the refrigerant in the inner-outer flow path 18a and the inner flow path 18b are opposite to each other. The inner-outer fluid flowing through the inner-outer flow path 18a is a high-pressure liquid refrigerant. The inner fluid flowing through the inner flow path 18b is a low-pressure gas refrigerant.

As shown in (a), (b), (f), (o), and (p) of FIG. 12, spiral grooves 1822 are provided on the outer surface of the inner pipe 182. The spiral groove 1822 is a multi-line groove extending spirally in the longitudinal direction of the inner pipe 182, and has three grooves in (a), (b), (o), and (p) of FIG. 12, and has two grooves in (f) of FIG. 12.

In the example of FIG. 4, the inner pipe 182 is formed in a bellows shape (e.g., a folded shape) by the spiral groove 1822. Therefore, the inner-outer flow path 18a is spirally formed on the outer circumference of the inner pipe 182, and as described above, the contact surface area between the inner pipe 182 and the outer pipe 181 increases, and it is possible to improve the heat exchange efficiency.

FIG. 4 shows an example in which the inner pipe 182 having the spiral groove 1822 shown in FIGS. 12 (a), (b), (f), (o), and (p) is used, but the end portion 1820 is formed in a similar shape in a case that the other double pipe is used. In the case of the double pipes (c), (d), (e), (g), (i), (j), (m) and (n) of FIG. 12, the distal end 1821 of the inner pipe 182 is located more outwardly in the axial direction than the distal end 1811 of the outer pipe 181, and the outer pipe 181 and the rib 1815 do not exist at the distal end 1820 of the inner pipe 182 (See later described FIG. 17).

In the double pipe of FIG. 12(h), the double pipe is formed by arranging the inner pipe 182 in the outer pipe 181 after the rib 1815 of the inner pipe 182 is cut at the distal end 1820. Therefore, in the assembled double pipe, neither the outer pipe 181 nor the rib 1815 is present at the distal end 1820 of the inner pipe 182.

As shown in FIG. 2, a liquid pipe 184 is brazed to the outer peripheral surface of the outer pipe 181 near one end in the longitudinal direction. The liquid pipe 184 communicates with the inner-outer flow path 18a.

A joint 184a, which is connected to a refrigerant outlet side of the condenser 13, is provided at the distal end portion of the liquid pipe 184. Therefore, as described above, the high-pressure liquid refrigerant from the condenser 13 flows into the inner-outer flow path 18a. The joint 184a may be directly connected to the condenser 13 or may be connected to the condenser 13 via a piping member (not shown).

A suction pipe 185 is provided at one end of the inner pipe 182 in the longitudinal direction. The suction pipe 185 is a pipe forming the low-pressure refrigerant pipe 17. A joint 185a, which is connected to a refrigerant suction side of the compressor 12, is provided at the distal end of the suction pipe 185. The low-temperature low-pressure refrigerant flowing out of the evaporator 15 flows through the inner flow path 18b and is sucked into the compressor 12. The joint 185a is usually connected to the compressor 12 via a hose member.

As shown in FIG. 4, a bulge processed portion 181a is formed in the vicinity of the end portion 1810 in the longitudinal direction of the outer pipe 181. The bulge processed portion 181a is a contact portion that comes into contact with the end surface 1865 of the expansion valve side connector 186, and is formed by bulging the outer pipe 181 toward the outer peripheral side.

An outer pipe side O-ring groove 181b having a circumferential groove-shape is formed between the distal end 1811 in the longitudinal direction of the outer pipe 181 and the bulge processed portion 181a. An outer pipe side O-ring 191 in an annular shape is arranged in the outer pipe side O-ring groove 181b. The outer pipe side O-ring 191 is a sealing member that prevents refrigerant leakage between the inner-outer flow path 18a and the expansion valve side connector 186.

An inner pipe side O-ring groove 182a having a circumferential groove-shape is formed in the vicinity of the end portion 1820 in the longitudinal direction of the inner pipe 182. An inner pipe side O-ring 192 in an annular shape is arranged in the inner pipe side O-ring groove 182a. The outer pipe side O-ring 192 is a sealing member that prevents refrigerant leakage between the inner flow path 18b and the expansion valve side connector 186. In particular, the inner pipe side O-ring 192 secures a seal between the inner flow path 18b and the high-pressure communication space 186k of the expansion valve side connector 186.

Since the distal end 1821 of the inner pipe 182 is located more outwardly in the axial direction than the distal end 1811 of the outer pipe 181, the expansion valve side connector 186 is formed to have a high-pressure communication space 186k among the distal end 1811 of the outer pipe 181, an innermost part of the outer pipe insertion portion 186e, and an outer periphery of the end portion 1820 of the inner pipe 182. Then, the high-pressure refrigerant flow path 186g communicates with the high-pressure communication space 186k. The outer pipe side sealing member (outer pipe side O-ring) 191 seals between the high-pressure communication space 186k and the atmosphere, and the inner pipe side sealing member (inner pipe side O-ring 192) seals between the high-pressure communication space 186k and the low-pressure refrigerant flow path 186f.

As shown in FIG. 3, the expansion valve side connector 186 is arranged at the ends 1810 and 1820 of the outer pipe 181 and the inner pipe 182 in the longitudinal direction. The expansion valve side connector 186 is a member that forms a connecting portion between the internal heat exchanger 18 and the expansion valve 14. The expansion valve 14 is a connection target member connected to the expansion valve side connector 186.

The expansion valve side connector 186 is provided with a high-pressure side joint 186a and a low-pressure side joint 186b. The high-pressure side joint 186a is connected to the high-pressure refrigerant inlet 14a of the expansion valve 14. The low-pressure side joint 186b is connected to the low-pressure refrigerant outlet 14b of the expansion valve 14. The low-pressure side joint 186b is a male-shaped portion that protrudes in a male shape on an extension line of the internal heat exchanger 18. The high-pressure side joint 186a is a male-shaped portion that protrudes in a male shape in parallel with the low-pressure side joint 186b.

The high-pressure refrigerant inlet 14a and the low-pressure refrigerant outlet 14b of the expansion valve 14 form a female joint portion. The male high-pressure joint 186a is inserted into the female high-pressure refrigerant inlet 14a of the expansion valve 14. The male low-pressure joint 186*b* is inserted into the female low-pressure refrigerant outlet 14*b* of the expansion valve 14.

As shown in FIG. 4, a high-pressure side O-ring groove 186*c* having a circumferential groove-shape is formed on an outer peripheral surface of the high-pressure side joint 186*a*. A high-pressure side O-ring 193 is arranged in the high-pressure side O-ring groove 186*c*. The high-pressure side O-ring 193 is a sealing member that prevents leakage of the refrigerant flowing out from the inner-outer flow path 18*a*.

A low-pressure side O-ring groove 186*d* having a circumferential groove-shape is formed on an outer peripheral surface of the low-pressure side joint 186*b*. A low-pressure side O-ring 194 is arranged in the low-pressure side O-ring groove 186*d*. The low-pressure side O-ring 194 is a sealing member that prevents leakage of the refrigerant flowing out from the low-pressure refrigerant outlet 14*b* of the expansion valve 14.

The expansion valve side connector 186 is formed with the outer pipe insertion portion 186*e*, the inner pipe insertion portion 186*O*, the low-pressure refrigerant flow path 186*f*, the high-pressure refrigerant flow path 186*g*, and bolt holes 186*h*. The outer pipe 181 is inserted into the outer pipe insertion portion 186*e*, and in the inserted state, the outer pipe side O-ring 191 is compressed and deformed to maintain the seal. Similarly, the inner pipe 182 is inserted into the inner pipe insertion portion 186*O*, and in the inserted state, the inner pipe side O-ring 192 is compressed and deformed to maintain the seal.

When in an inserting work of the double pipe, the distal end 1821 of the inner pipe 182 first comes into contact with the inner pipe insertion portion 186*O* of the expansion valve side connector 186, and then the distal end 1811 of the outer pipe 181 comes into contact with the outer pipe insertion portion 186*e* of the expansion valve side connector 186. Then, in order to perform the inserting process smoothly at this time, a taper is formed at the distal end 1821 of the inner pipe 182 and the distal end 1811 of the outer pipe 181. Further, as described above, since the end portions 1820 and 1810 of the outer pipe 181 and the inner pipe 182 are contracted so that the axes are aligned, the insertion is smoothly performed.

Therefore, first, the inner pipe 182 is aligned axially with the inner pipe insertion portion 186*O* of the expansion valve side connector 186 by the tapered shape, and in that state, the outer pipe 181 is axially aligned with the outer pipe insertion portion 186*e* by the tapered shape. Therefore, even if the axis of the inner pipe 182 and the axis of the outer pipe 181 are slightly shifted, smooth insertion is possible.

The low-pressure refrigerant flow path 186*f* is a low-pressure side communication flow path that communicates the low-pressure refrigerant outlet 14*b* of the expansion valve 14 with the inner flow path 18*b*. The low-pressure refrigerant flowing out from the low-pressure refrigerant outlet 14*b* of the expansion valve 14 flows to the inner flow path 18*b* through the low-pressure refrigerant flow path 186*f*. The low-pressure refrigerant flow path 186*f* extends from the inner pipe insertion portion 186*O* toward the low-pressure side joint 186*b* and penetrates through an inside of the low-pressure side joint 186*b*.

The high-pressure refrigerant flow path 186*g* is a high-pressure side communication flow path that communicates the inner-outer flow path 18*a* with the high-pressure refrigerant inlet 14*a* of the expansion valve 14. Therefore, the high-pressure refrigerant flowing out from the inner-outer flow path 18*a* flows to the high-pressure refrigerant inlet 14*a* of the expansion valve 14 via the high-pressure refrigerant flow path 186*g*. The high-pressure refrigerant flow path 186*g* is located: to open the high-pressure communication space 186*k* formed in the outer pipe insertion portion 186*e* at an one end thereof, to extend downwardly in FIG. 4, and then to bend and extend toward the high-pressure side joint 186*a*, and to penetrate inside the high-pressure side joint 186*a*.

The high-pressure refrigerant flow path 186*g* is formed by cutting process. An opening hole formed in the expansion valve side connector 186 in the cutting process is closed by a sealing plug 187.

The bolt hole 186*h* is used to mechanically fix the expansion valve side connector 186 to the outer pipe 181 and the inner pipe 182. Specifically, the expansion valve side connector 186 and a holding plate 188 sandwich the bulge processed portion 181*a* of the outer pipe 181, and the expansion valve side connector 186 is mechanically fixed to the outer pipe 181 and the inner pipe 182 by fastening the expansion valve side connector 186 and the holding plate 188 with a bolt 189.

Figure 28:
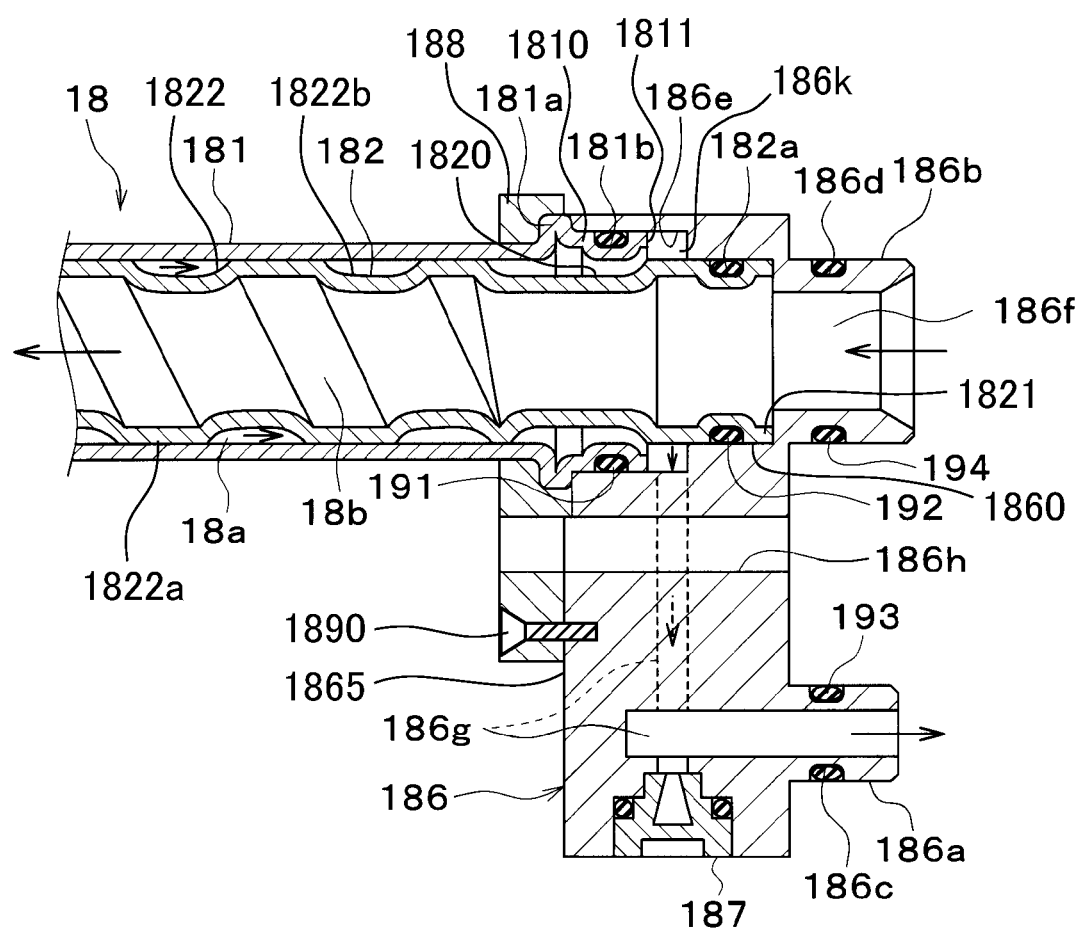
FIG. 28 is a perspective view showing a part of the internal heat exchanger according to the first embodiment.

The reason why the bolt 189 protrudes from the expansion valve side connector 186 in FIG. 4 is that the bolt 189 also fixes the expansion valve side connector 186 and the expansion valve 14. In a state before the expansion valve side connector 186 and the expansion valve 14 are fixed, as shown in FIG. 28, the holding plate 188 is fixed to the expansion valve side connector 186 by a flat head screw 1890.

Next, operation of the above configuration is described. When the compressor 12 is driven, the compressor 12 sucks the low-pressure gas refrigerant from the evaporator 15 side, compresses it, and then discharges it to the condenser 13 side as the high-temperature high-pressure gas refrigerant. The high-pressure refrigerant is cooled by the condenser 13 and condensed to be the liquid-phase. The refrigerant here is substantially in the liquid-phase. The condensed liquefied refrigerant flows through the high-pressure refrigerant pipe 16 (the inner-outer flow path 18*a*), is decompressed and expanded by the expansion valve 14, and is evaporated by the evaporator 15. The refrigerant here is in a substantially saturated gas state with a super-heat degree of 0 to 3 degrees Celsius. In the evaporator 15, the air is cooled as the refrigerant evaporates. Then, the saturated gas refrigerant evaporated in the evaporator 15 flows through the low-pressure refrigerant pipe 17 (the inner-outer flow path 18*b*) as a low-temperature and low-pressure refrigerant and returns to the compressor 12.

At this time, since there is a temperature difference between the high-pressure refrigerant flowing through the high-pressure refrigerant pipe 16 and the low-pressure refrigerant flowing through the low-pressure refrigerant pipe 17, the high-pressure refrigerant flowing through the high-pressure refrigerant pipe 16 and the low-pressure refrigerant flowing through the low-pressure refrigerant pipe 17 perform heat exchange at the internal heat exchanger 18, the high-pressure refrigerant is cooled, and the low-pressure refrigerant is heated.

That is, the liquid phase refrigerant flowing out of the condenser 13 is sub-cooled by the internal heat exchanger 18 to promote lowering the temperature. The saturated gas refrigerant flowing out of the evaporator 15 is heated by the internal heat exchanger 18 to become a gas refrigerant having a super-heat degrees. This improves the performance of the refrigeration cycle apparatus 11.

Since the low-pressure refrigerant flowing from the evaporator 15 to the compressor 12 has a low temperature, dew condensation on the surface of the low-pressure refrigerant pipe 17 may be concerned. However, in the internal heat exchanger 18 of this example, the inner pipe 182 is covered by the outer pipe 181. Since the outer pipe 181 is heated to a high temperature by the high-pressure refrigerant flowing through the inner-outer flow path 18a, dew condensation does not occur on the outer surface of the outer pipe 181.

The high-pressure refrigerant flowing out from the inner-outer flow path 18a of the internal heat exchanger 18 flows into the high-pressure refrigerant inlet 14a of the expansion valve 14 through the high-pressure communication space 186k and the high-pressure refrigerant flow path 186g of the expansion valve side connector 186. Refrigerant leakage from the inner-outer flow path 18a and the high-pressure communication space 186k is prevented by the outer pipe side O-ring 191. Refrigerant leakage from between the high-pressure refrigerant flow path 186g and the high-pressure refrigerant inlet 14a of the expansion valve 14 is prevented by the high-pressure side O-ring 193.

The low-pressure refrigerant flowing out from the low-pressure refrigerant outlet 14b of the expansion valve 14 flows into the inner flow path 18b of the internal heat exchanger 18 through the low-pressure refrigerant flow path 186f of the expansion valve side connector 186. Refrigerant leakage from between the low-pressure refrigerant outlet 14b of the expansion valve 14 and the low-pressure refrigerant flow path 186f is prevented by the low-pressure side O-ring 194. Refrigerant leakage between the low-pressure refrigerant flow path 186f and the high-pressure communication space 186k is prevented by the inner pipe side O-ring 192.

According to this embodiment, the inner-outer flow path 18a and the high-pressure refrigerant inlet 14a of the expansion valve 14 are communicated with each other by the high-pressure communication space 186k and the high-pressure refrigerant flow path 186g of the expansion valve side connector 186. Therefore, a refrigerant pipe for communicating the inner-outer flow path 18a and the high-pressure refrigerant inlet 14a of the expansion valve 14 is unnecessary. The refrigerant pipe for communicating the inner-outer flow path 18a and the high-pressure refrigerant inlet 14a of the expansion valve 14 is hereinafter referred to as an expansion valve side liquid pipe.

Since the expansion valve side liquid pipe is not required, it is possible to miniaturize the overall physique of the internal heat exchanger 18. Since a space for arranging the liquid pipe on the expansion valve side is not required, it is possible to reduce necessary space required to mount the internal heat exchanger 18 on the vehicle side, and to reduce design restrictions. Further, when a large number of the internal heat exchangers 18 are transported at the same time, it is possible to improve a packaging shape and to improve the transport efficiency.

The expansion valve side liquid pipe may be bent and damaged during transportation of the internal heat exchanger 18, but the expansion valve side connector 186 may not be bent during transportation of the internal heat exchanger 18. Therefore, it is possible to reduce damage to the internal heat exchanger 18 during transportation. Since there is no liquid pipe on the expansion valve side, it is possible to increase a length of a heat exchange performing portion among the internal heat exchanger 18, and to enhance an improving effect of the cycle efficiency.

In the present embodiment, the expansion valve side connector 186 is interposed between the end portion 1810 of the outer pipe 181 and the end portion 1820 of the inner pipe 182 and the expansion valve 14, and forms a high-pressure communication space 186k and a high-pressure refrigerant flow path 186g. The high-pressure communication space 186k and the high-pressure refrigerant flow path 186g communicate the inner-outer flow path 18a with the refrigerant flow path of the expansion valve 14.

Since the connections of the two flow paths of the high-pressure refrigerant flow path and the low-pressure refrigerant flow path are completed by connecting one expansion valve side connector 186 to the expansion valve 14, it is possible to ease assembling works of the internal heat exchanger 18 with the expansion valve 14. The expansion valve side connector 186 is mechanically fixed to the internal heat exchanger 18. Leakage of the high-pressure refrigerant between the expansion valve side connector 186 and the internal heat exchanger 18 is prevented by the outer pipe side O-ring 191. Therefore, it becomes easier to secure stable manufacturing quality as compared with a case where the liquid pipe on the expansion valve side is brazed to prevent the refrigerant from leaking.

In the present embodiment, since the high-pressure communication space 186k is formed between the distal end 1811 of the outer pipe 181 and the innermost part of the outer pipe insertion portion 186e, the distal end 1811 of the outer pipe 181 and the innermost portion of the outer pipe insertion portion 186e do not come into contact with each other. Therefore, the bulge-processed portion 181a can be reliably brought into contact with the end surface 1865 of the expansion valve side connector 186.

In the present embodiment, the sealing member (the outer pipe side O-ring 191) prevents refrigerant leakage from the inner-outer flow path 18a and both the high-pressure communication space 186k and the high-pressure refrigerant flow path 186g. Then, the outer pipe 181 and the expansion valve side connector 186 are mechanically fixed. According to this, the inner-outer flow path 18a and the refrigerant flow path of the expansion valve 14 can be communicated with each other without branching the refrigerant pipe from the outer pipe 181 and the inner pipe 182. Therefore, it is possible to reduce the number of refrigerant pipes branched from the outer pipe 181 and the inner pipe 182.

In this embodiment, the outer pipe 181 and the expansion valve side connector 186 are mechanically fixed by the bolt 189. As a result, the outer pipe 181 and the expansion valve side connector 186 can be mechanically fixed with a simple configuration.

In the present embodiment, the expansion valve side connector 186 has a male high-pressure side joint 186a and a low-pressure side joint 186b. The male high-pressure side joint 186a and the low-pressure side joint 186b are inserted into the female joint portion (not shown) of the expansion valve 14. As a result, it is possible to connect the expansion valve side connector 186 to the female expansion valve 14.

In the present embodiment, the expansion valve side connector 186 is formed so that end portions of the high-pressure refrigerant flow path 186g on a side to the expansion valve 14 open in a direction parallel to an extension direction of the outer pipe 181 and the inner pipe 182. Thereby, in a case that the expansion valve 14 is arranged on the extension direction side of the outer pipe 181 and the inner pipe 182, the expansion valve side connector 186 can be satisfactorily connected to the expansion valve 14.

Second Embodiment

Figure 5:
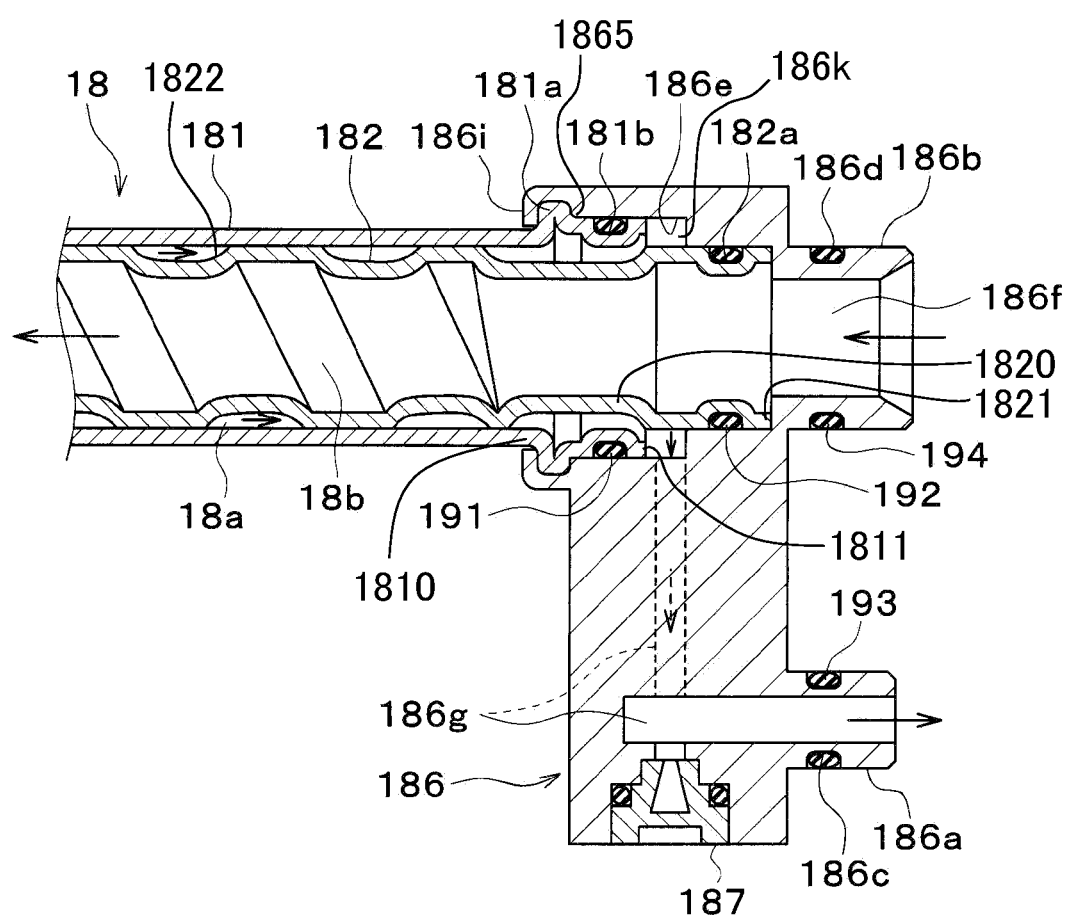
FIG. 5 is a cross-sectional view showing a part of an internal heat exchanger according to a second embodiment.

In the first embodiment, the expansion valve side connector 186 is fixed to the outer pipe 181 and the inner pipe 182 by using the bolt 189, but in the present embodiment, as shown in FIG. 5, the expansion valve side connector 186 is crimped and fixed to the outer pipe 181 and the inner pipe 182. A crimped fixing portion 186i is formed around the bulge processed portion 181a of the outer pipe 181 among the expansion valve side connector 186. The crimped fixing portion 186i is crimped so as to involve the bulge processed portion 181a of the outer pipe 181.

Also in this embodiment, since the expansion valve side connector 186 is mechanically fixed to the outer pipe 181 and the inner pipe 182, the same effect as that of the first embodiment can be obtained. In the present embodiment, the outer pipe 181 and the expansion valve side connector 186 are mechanically caulked crimped and fixed. As a result, the outer pipe 181 and the expansion valve side connector 186 can be reliably and mechanically fixed.

Although the crimped fixing portion 186i is formed on the expansion valve side connector 186 in FIG. 5, in a case that the holding plate 188 is used as shown in FIG. 4, the crimped fixing portion may be formed on the holding plate 188.

Third Embodiment

Figure 6:
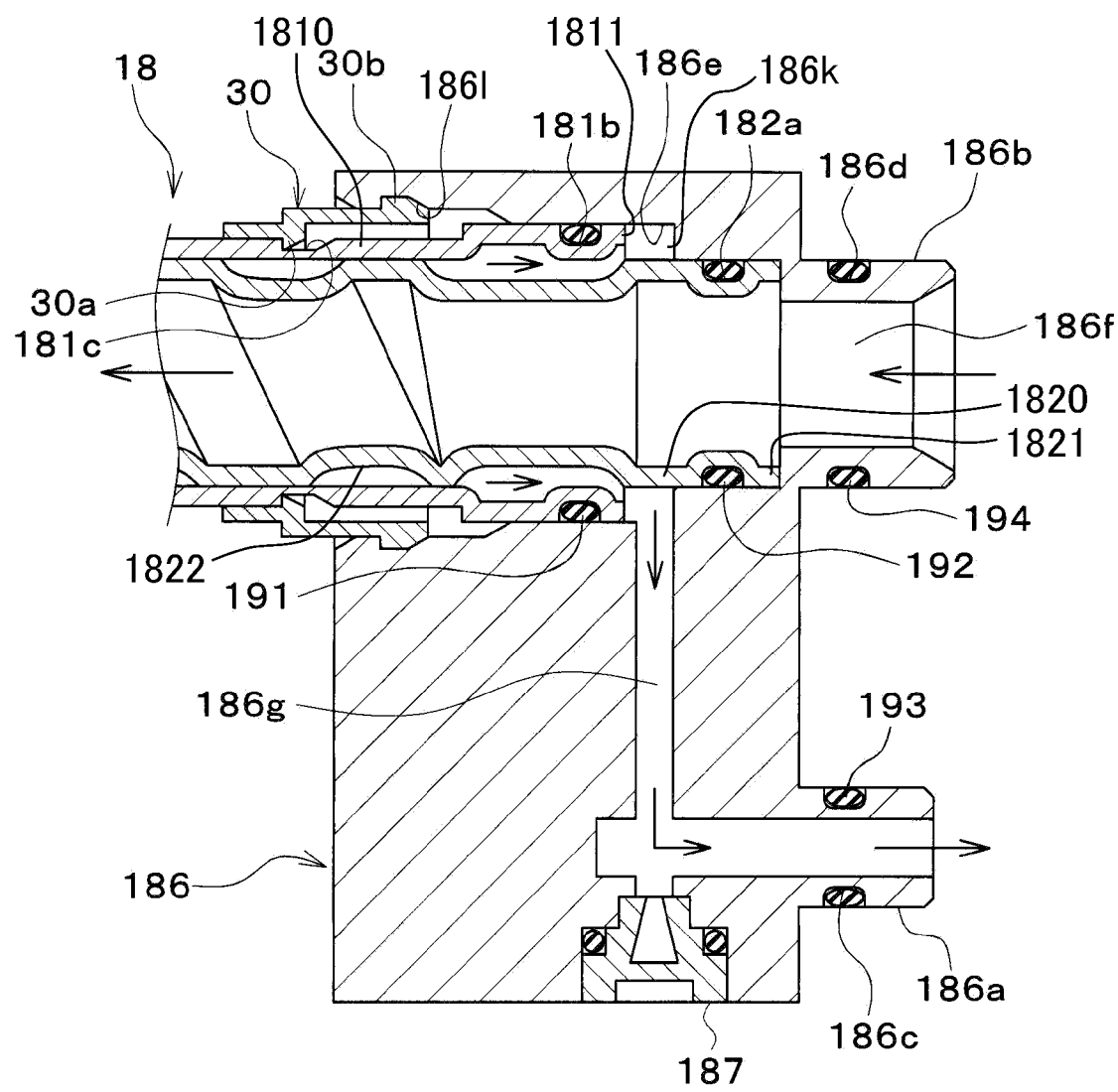
FIG. 6 is a cross-sectional view showing a part of an internal heat exchanger according to a third embodiment.

In the first embodiment, the expansion valve side connector 186 is fixed to the outer pipe 181 and the inner pipe 182 by using the bolt 189, and in the second embodiment, the expansion valve side connector 186 is crimped and fixed to the outer pipe 181 and the inner pipe 182. However, in the present embodiment, as shown in FIG. 6, the expansion valve side connector 186 is fixed to the outer pipe 181 and the inner pipe 182 by utilizing an elastic force of a resin member 30.

The resin member 30 is formed of an elastic resin in a circular cylindrical shape. The outer pipe side claw portion 30a and the connector side claw portion 30b are formed on the resin member 30. The outer pipe side claw portion 30a is formed in a circumferential shape on the inner cylinder surface of the resin member 30. The connector side claw portion 30b is formed in a circumferential shape on the outer cylinder surface of the resin member 30.

An outer pipe side engaging portion 181c is formed on the outer peripheral surface of the outer pipe 181. The outer pipe side engaging portion 181c has a concave shape so that the outer pipe side claw portion 30a engages with the outer pipe 181 and the inner pipe 182 in the axial direction (a left-right direction in FIG. 6). A connector-side engaging portion 186l is formed on the inner peripheral surface of the outer pipe insertion portion 186e of the expansion valve side connector 186. The connector side engaging portion 186l has a concave shape so that the connector side claw portion 30b engages with the outer pipe 181 and the inner pipe 182 in the axial direction (the left-right direction in FIG. 6).

An outer diameter of the connector side claw portion 30b is slightly larger than an inner diameter of the connector side engaging portion 186l. Therefore, when the connector side claw portion 30b engages with the connector side engaging portion 186l, the resin member 30 elastically deforms so as to reduce the diameter, and an urging force is generated to press the connector side engaging portion 186l. Therefore, since the expansion valve side connector 186 is fixed to the outer pipe 181 and the inner pipe 182 by using the elastic force of the resin member 30, the expansion valve side connector 186 is mechanically fixed to the outer pipe 181 and the inner pipe 182.

In the present embodiment, first, the outer pipe side claw portion 30a of the resin member 30 is engaged with the outer pipe side engaging portion 181c, and the resin member 30 is attached to the end portion 1810 of the outer pipe 181. In that state, the double pipe is inserted into the expansion valve side connector 186. At that time, first, the distal end 1821 of the inner pipe 182 comes into contact with the inner pipe insertion portion 1860 of the expansion valve side connector 186, and the axis alignment is performed. Next, the distal end 1811 of the outer pipe 181 comes into contact with the outer pipe insertion portion 186e, and the outer pipe 181 is axially aligned. After that, the connector side claw portion 30b of the resin member 30 engages with the connector side engaging portion 186l of the expansion valve side connector 186.

In the present embodiment, the mechanical assembly can be completed only by pressing the double pipe axially against the expansion valve side connector 186 with the resin member 30 attached to the double pipe. It is not necessary to tighten the bolt 189 as in the first embodiment or to crimp the crimped fixing portion 186i as in the second embodiment. Therefore, it is particularly effective for mechanical assembly in a narrow space.

Fourth Embodiment

Figure 7:
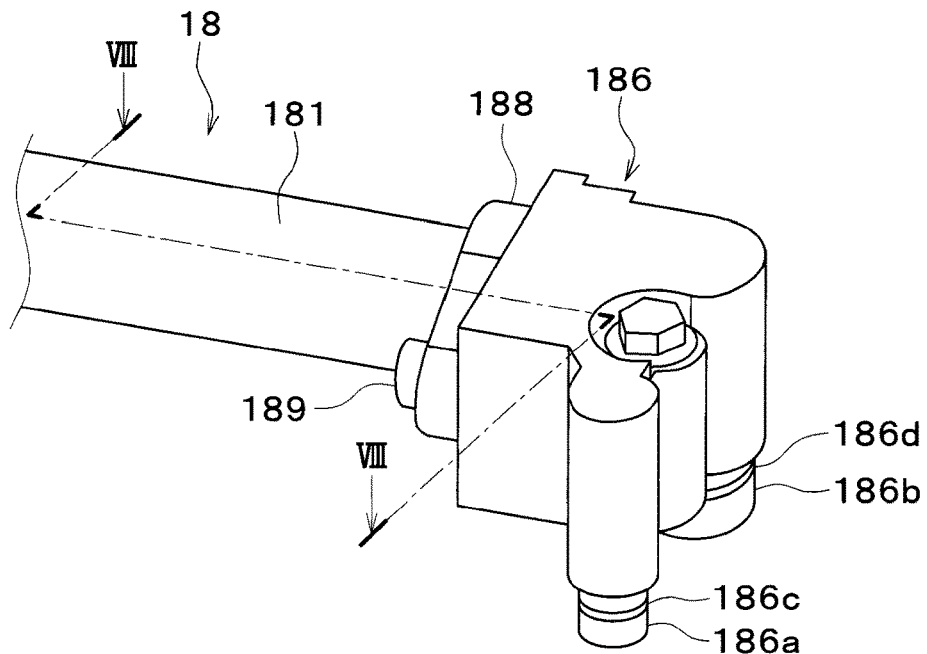
FIG. 7 is a perspective view showing a part of an internal heat exchanger according to a fourth embodiment.
Figure 8:
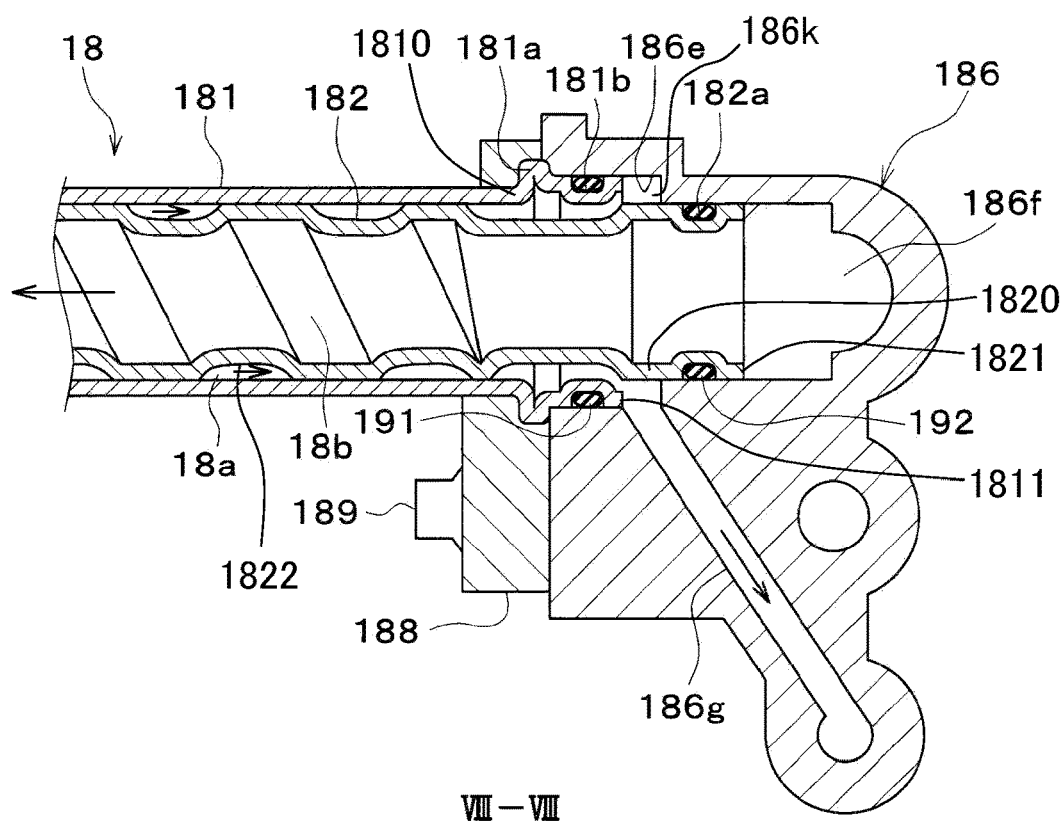
FIG. 8 is a cross-sectional view on a line VIII-VIII in FIG. 7.

In the above embodiment, the high-pressure side joint 186a and the low-pressure side joint 186b project in a direction parallel to the extension direction of the outer pipe 181 and the inner pipe 182. However, in the present embodiment, as shown in FIGS. 7 and 8, the high-pressure side joint 186a and the low-pressure side joint 186b project in a direction orthogonal to the extension direction of the outer pipe 181 and the inner pipe 182. As a result, even if the expansion valve 14 cannot be arranged on the extension direction side of the outer pipe 181 and the inner pipe 182 due to layout restrictions, the internal heat exchanger 18 and the expansion valve 14 can be connected by the expansion valve side connector 186.

In the present embodiment, the expansion valve side connector 186 opens in a direction in which the end of the high-pressure refrigerant flow path 186g and the low-pressure refrigerant flow path 186f on the expansion valve 14 side is orthogonal to the extension direction of the outer pipe 181 and the inner pipe 182. It is formed to do. Therefore, a connection is improved in a case that the expansion valve 14 is arranged on a side in an orthogonal direction to the extension direction of the outer pipe 181 and the inner pipe 182.

In this embodiment, the high-pressure communication space 186k is formed between the distal end 1811 of the outer pipe 181 and the innermost portion of the outer pipe insertion portion 186e, and the low-pressure refrigerant flow path 186f is formed between the distal end 1821 of the inner pipe 182 and the innermost portion of the inner pipe insertion portion 1860. Therefore, the distal end 1811 of the outer pipe 181 and the distal end 1821 of the inner pipe 182 are both free and do not interfere with the member of the expansion valve side connector 186. As a result, the bulge processed portion 181a of the outer pipe 181 can be reliably brought into contact with the end surface 1865.

In particular, as a result of forming the bent portion 1801 on the double pipe, the distal end 1821 of the inner pipe 182 and the distal end 1811 of the outer pipe 181 are capable of being adversely shifted in the axial direction. Even in such a case, in the present embodiment, since the distal end 1811 of the outer pipe 181 and the distal end 1821 of the inner pipe 182 are both free, it is possible to absorb this shift in the axial direction.

Fifth Embodiment

Figure 9:
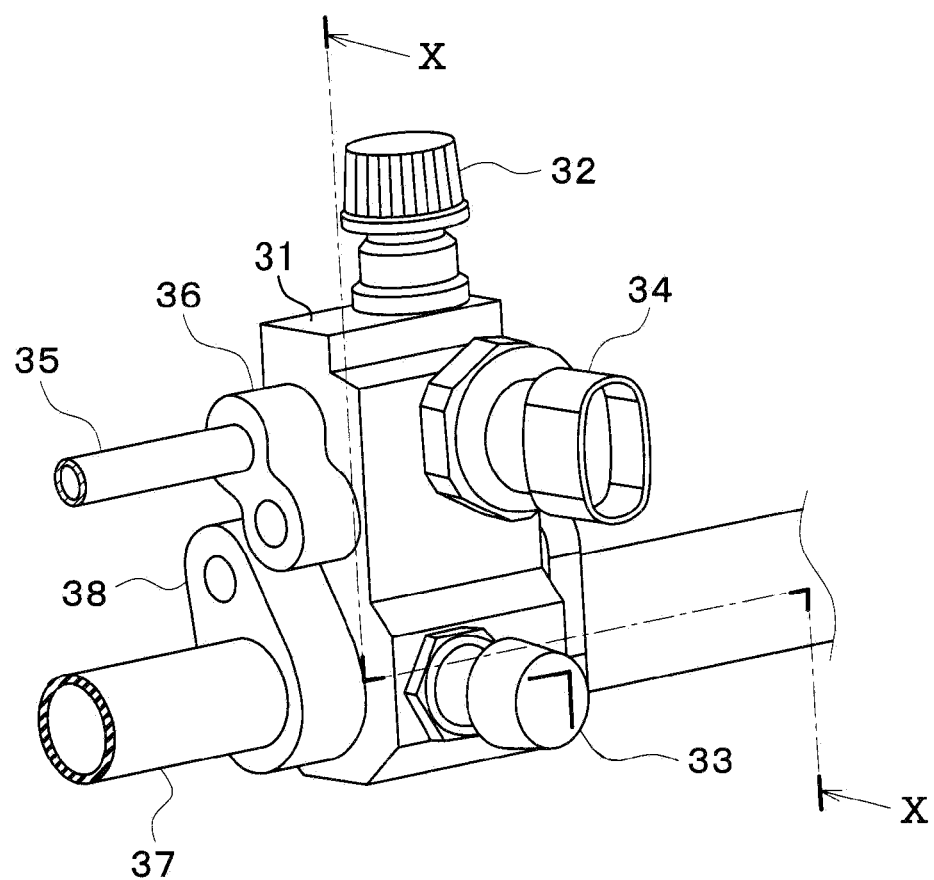
FIG. 9 is a perspective view showing a part of an internal heat exchanger according to a fifth embodiment.
Figure 10:
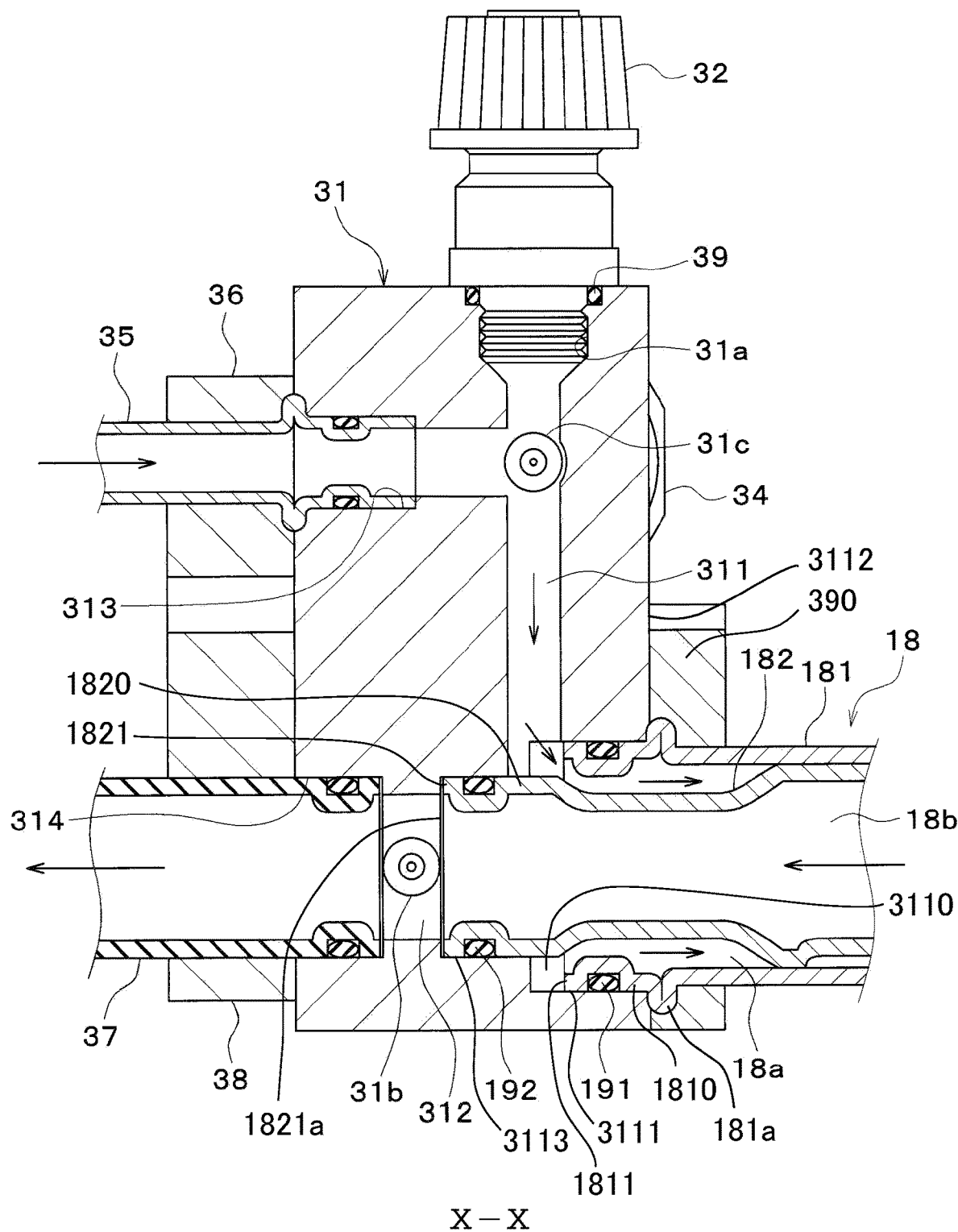
FIG. 10 is a cross-sectional view on a line X-X in FIG. 9.

In the above embodiment, the end portions of the outer pipe 181 and the inner pipe 182 opposite to the expansion valve 14 are connected to the condenser 13 and the compressor 12 by the liquid pipe 184, the suction pipe 185 and the joints 184a and 185a. Contrary, as shown in FIGS. 9 and 10, the present embodiment employs a structure in which the end portions of the outer pipe 181 and the inner pipe 182 opposite to the expansion valve 14 are connect to the condenser 13 and the compressor 12 by a counter-expansion valve side connector 31.

The present embodiment provides a structure in which both ends of the outer pipe 181 and the inner pipe 182 are connected by the expansion valve side connector 186 and the counter-expansion valve side connector 31.

The basic structure of the counter-expansion valve side connector 31 is the same as that of the expansion valve side connector 186. Therefore, in the following, detailed description of the basic structure of the counter-expansion valve side connector 31 is omitted. As shown in FIG. 9, a high-pressure side service valve 32, a low-pressure side service valve 33, and a pressure switch 34 are attached to the counter-expansion valve side connector 31. Therefore, an attachment tool for attaching the high-pressure side service valve 32 or the like to the refrigerant pipe becomes unnecessary, it is possible to reduce the cost by reducing the number of parts. As is described later, a pressure sensor may be used instead of the pressure switch. The pressure sensor is a sensor that detects a refrigerant pressure.

However, the high-pressure side service valve 32, the low-pressure side service valve 33, and the pressure switch 34 do not necessarily have to be all attached to the counter-expansion valve side connector 31, and some of them may be provided around the counter-expansion valve side connector 31. Depending on restrictions such as an attaching position, all of the high-pressure side service valve 32 and the like may be provided around the counter-expansion valve side connector 31.

For example, in the illustrated embodiment, the high-pressure side service valve 32 is arranged upward and the low-pressure side service valve 33 is arranged sideways, but there may be a needs to place both the high-pressure side service valve 32 and the low-pressure side service valve 33 being arranged upwards. In such a case, it is desirable to dispose the low-pressure side service valve 33 upward at a position away from the counter-expansion valve side connector 31.

The high-pressure side service valve 32 and the low-pressure side service valve 33 are valves which are used for supplementary filling of the refrigerant. The pressure switch 34 is a switch that switches on and off depending on whether a refrigerant pressure is higher or lower than a predetermined value. A high-pressure side piping member 35 made of a hard material is fixed to the counter-expansion valve side connector 31 by using a high-pressure side joint plate 36 and a bolt (not shown). The high-pressure side piping member 35 made of a hard material is, for example, a pipe shaped member made of a hard material such as a metal such as aluminum or a hard resin. A metal made low-pressure side piping member 37 at an end portion of a soft hose member is fixed to the counter-expansion valve-side connector 31 by using a low-pressure side joint plate 38 and a bolt (not shown). The soft hose member is, for example, a tubular member made of a soft material such as rubber or a soft resin.

As shown in FIG. 10, the counter-expansion valve side connector 31 is formed with a high-pressure side service valve mounting portion 31a, a low-pressure side service valve mounting portion 31b, and a pressure switch mounting portion 31c. The high-pressure side service valve 32 is attached to the high-pressure side service valve mounting portion 31a. The high-pressure side service valve mounting portion 31a communicates with the high-pressure refrigerant flow path 311 of the counter-expansion valve side connector 31. The low-pressure side service valve 33 is attached to the low-pressure side service valve mounting portion 31b. The low-pressure side service valve mounting portion 31b communicates with the low-pressure refrigerant flow path 312 of the counter-expansion valve side connector 31. The pressure switch 34 is attached to the pressure switch attachment portion 31c. The pressure switch mounting portion 31c communicates with the high-pressure refrigerant flow path 311 of the counter-expansion valve side connector 31.

In a case that the pressure sensor is attached, the size and shape of the pressure sensor are almost the same as those of the pressure switch 34, so that the shape of the pressure sensor mounting portion is almost the same as that of the pressure switch mounting portion 31c.

The pressure sensor mounting portion communicates with the high-pressure refrigerant flow path 311 of the counter-expansion valve side connector 31. As described above, it is possible to provide mounting portions of the pressure switch 34 and the pressure sensor on other than the counter-expansion valve side connector 31. For example, the pressure sensor may be provided in the condenser 13.

The high-pressure side service valve 32 is air-tightly and liquid-tightly attached to the counter-expansion valve side connector 31 via an elastic sealing material 39 (for example, an O-ring). Similarly, the low-pressure side service valve 33, the pressure switch 34, and the pressure sensor are air-tightly and liquid-tightly attached to the counter-expansion valve side connector 31 via an elastic sealing material (not shown).

The counter-expansion valve side connector 31 also has the outer pipe insertion portion 3111 into which the end portion 1810 of the outer pipe 181 is inserted, and the end surface 3112 with which the bulge processed portion 181a of the outer pipe 181 comes in contact. A high-pressure communication space 3110 that communicates with the high-pressure refrigerant flow path 311 is formed between the distal end 1811 of the outer pipe 181 and the innermost portion of the outer pipe insertion portion 3111.

Further, an inner pipe insertion portion 3113 is also formed in the counter-expansion valve side connector 31, and the end portion 1820 of the inner pipe 182 is inserted into the inner pipe insertion portion 3113. Then, the inner pipe side O-ring 192 is held by the inner pipe insertion portion 3113. Further, the innermost portion of the inner pipe insertion portion 3113 and the distal end 1821 of the inner pipe 182 form a gap 1821a therebetween.

The counter-expansion valve side connector 31 is formed with a high-pressure side joint portion 313 and a low-pressure side joint portion 314. The high-pressure side joint portion 313 is a female joint into which a high-pressure side piping member 35 made of a hard material is inserted. The low-pressure side joint portion 314 is a female type joint into which the low-pressure side piping member 37 is inserted. The high-pressure side joint portion 313 and the low-pressure side joint portion 314 are female-shaped portions.

In FIG. 10, a holding plate 390 is placed to press against the bulge processed portion 181a of the outer pipe 181 and the internal heat exchanger 18 is fixed by using a bolt (not shown).

In the present embodiment, the counter-expansion valve side connector 31 has the high-pressure side service valve mounting portion 31a, the low-pressure side service valve mounting portion 31b, and the pressure switch mounting portion 31c. As a result, the number of members can be reduced and the configuration can be simplified as compared with the case where the dedicated member for attaching the high-pressure side service valve 32, the low-pressure side service valve 33, and the pressure switch 34 is separately provided.

In the present embodiment, the counter-expansion valve side connector 31 has a female high-pressure side joint portion 313 into which the male high-pressure side piping member 35 is inserted. The counter-expansion valve side connector 31 has a female low-pressure side joint portion 314 into which a male low-pressure side piping member 37 is inserted. As a result, the male high-pressure side piping member 35 and the low-pressure side piping member 37 can be connected to the counter-expansion valve side connector 31.

In the present embodiment, a high-pressure communication space 3110 is formed between the innermost portion of the outer pipe insertion portion 3111 of the counter-expansion valve side connector 31 and the distal end 1811 of the outer pipe 181. In addition, the innermost portion of the inner pipe insertion portion 3113 of the counter-expansion valve side connector 31 and the distal end 1821 of the inner pipe 182 form a gap 1821a therebetween. Therefore, the bulge processed portion 181a of the outer pipe 181 can be reliably brought into contact with the end surface 3112. That is, the distal end 1811 of the outer pipe 181 and the distal end 1821 of the inner pipe 182 do not interfere with the portion of the counter-expansion valve side connector 31 at the time of insertion.

Sixth Embodiment

Figure 11:
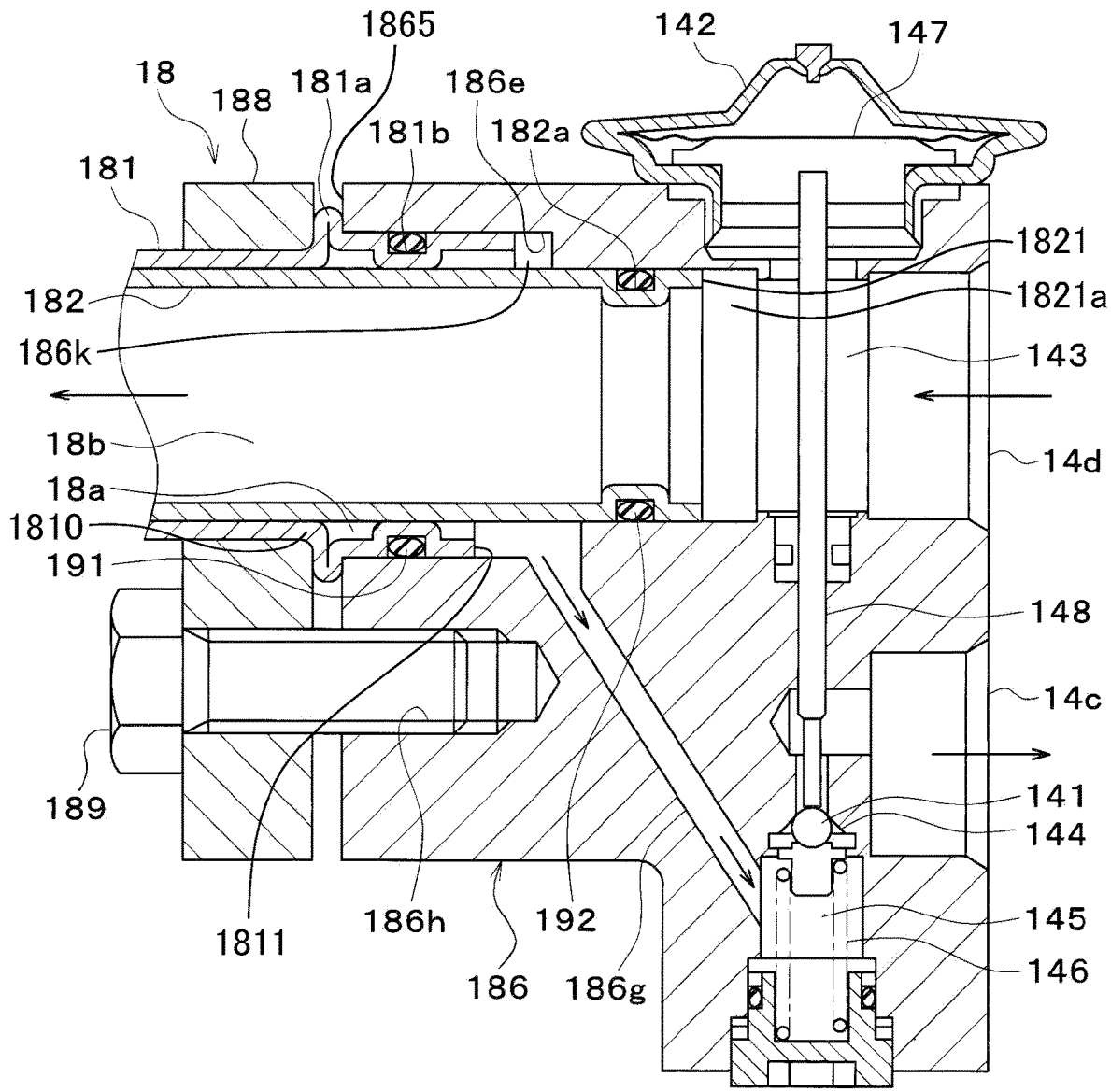
FIG. 11 is a cross-sectional view showing a part of an internal heat exchanger according to a sixth embodiment.

In the above embodiment, the expansion valve 14 is connected to the expansion valve side connector 186, but in the present embodiment, the expansion valve 14 is integrated with the expansion valve side connector 186 as shown in FIG. 11. Specifically, the valve body portion 141 and the element portion 142 are arranged in the expansion valve side connector 186, and a low-pressure refrigerant passage 143, an orifice passage 144, and a valve chamber 145 are formed in an inside of the expansion valve side connector 186.

FIG. 11 shows a portion where the outer pipe 181 and the inner pipe 182 are in contact with each other. Similar to the above-described embodiment, the inner-outer flow path 18a is formed between the outer pipe 181 and the inner pipe 182. Then, the inner-outer flow path 18a communicates with the high-pressure communication space 186k, and the high-pressure liquid refrigerant flows into the valve chamber 145 from the high-pressure refrigerant flow path 186g.

The low-pressure refrigerant passage 143 is used as a refrigerant passage where a temperature and a pressure of the low-pressure refrigerant is detected, and allows the low-pressure refrigerant flowing out of the evaporator 15 to flow. The orifice passage 144 is a refrigerant passage that functions as an orifice that reduces the pressure of the high-pressure refrigerant flowing out of the condenser 13 until it becomes a low-pressure refrigerant by reducing the passage cross-sectional area of the refrigerant passage. The valve chamber 145 is a space arranged on an upstream side of the refrigerant flow of the orifice passage 144 and accommodating the valve body portion 141. The valve chamber 145 communicates with the high-pressure refrigerant flow path 186g.

The valve body portion 141 is a spherical valve. Passage cross-sectional area of the orifice passage 144 is changed by displacing the valve body portion 141. A coil spring 146 is housed inside the valve chamber 145. The coil spring 146 is an elastic member that applies a load to the valve body portion 141 on a side that reduces the passage cross-sectional area of the orifice passage 144.

The evaporator side outlet 14c and the low-pressure side inlet 14d are open on the outer surface of the expansion valve side connector 186. The evaporator side outlet 14c discharges the low-pressure refrigerant decompressed in the orifice 144. The low-pressure side inlet 14d causes the low-pressure refrigerant flowing out of the evaporator 15 to flow into the low-pressure refrigerant passage 143.

The evaporator side outlet 14c and the low-pressure side inlet 14d are female joints. A connection target member (not shown) on the evaporator 15 side, such as a refrigerant pipe, is inserted into the evaporator side outlet 14c and the low-pressure side inlet 14d. The evaporator side outlet 14c and the low-pressure side inlet 14d are open on the same surface (the surface on the right side in FIG. 11) of the expansion valve side connector 186.

The element portion 142 outputs a driving force for displacing the valve body portion 141. The element portion 142 has a diaphragm 147. The diaphragm 147 is made of a thin plate-shaped metal, and is deformed according to the temperature and the pressure of the low-pressure refrigerant flowing through the low-pressure refrigerant passage 143. An operating rod 148 is connected to the diaphragm. The operating rod 148 transmits the displacement due to the deformation of the diaphragm to the valve body portion 141 to displace the valve body portion 141.

Next, operation of the above configuration is described. The high-pressure refrigerant flowing out of the inner-outer flow path 18a of the internal heat exchanger 18 flows into the valve chamber 145 through the high-pressure refrigerant flow path 186g of the expansion valve side connector 186. The refrigerant entered the valve chamber 145 is decompressed in the orifice passage 144, and then flows out from the evaporator side outlet 14c to the evaporator 15.

The refrigerant evaporated by the evaporator 15 flows into the low-pressure refrigerant passage 143 through the low-pressure side inlet 14d. The diaphragm 147 is deformed according to the temperature and pressure of the low-pressure refrigerant flowing through the low-pressure refrigerant passage 143, and the operating rod 148 transmits the displacement due to the deformation of the diaphragm 147 to the valve body portion 141 to displace the valve body portion 141. As a result, the amount of refrigerant flowing into the evaporator 15 is adjusted, and the super-heat degree of the refrigerant flowing out of the evaporator 15 is maintained constant. The refrigerant flowing through the low-pressure refrigerant passage 143 flows into the inner passage 18b of the internal heat exchanger 18.

According to this embodiment, since the expansion valve is integrated with the expansion valve side connector 186, the number of parts can be reduced and the man-hours for assembling the refrigeration cycle apparatus 11 to the vehicle body can be reduced.

In the present embodiment, the low-pressure refrigerant passage 143 and the orifice passage 144 are formed in an inside of the expansion valve side connector 186. The low-pressure refrigerant passage 143 communicates with the inner flow path 18b. The throttle passage 144 communicates with the inner-outer flow path 18a to decompress and reduce the refrigerant on the high-pressure side. The valve body portion 141 and the element portion 142 are arranged on the expansion valve side connector 186. The valve body portion 141 changes the passage cross-sectional area of the orifice passage 144. The element portion 142 outputs a driving force for displacing the valve body portion 141. As a result, since the expansion valve 14 can be integrated with the expansion valve side connector 186, it is possible to reduce the number of parts of the refrigeration cycle apparatus 11.

In this embodiment as well, similar to the fourth and fifth embodiments described above, the high-pressure communication space 186k is formed among the innermost portion of the outer pipe insertion portion 186e of the expansion valve side connector 186, the distal end 1811 of the outer pipe 181, and the outer circumference of the end portion 1820 of the inner pipe 182. In addition, the innermost portion of the inner pipe insertion portion 1860 of the expansion valve side connector 186 and the distal end 1821 of the inner pipe 182 form a gap 1821a therebetween.

Therefore, the distal end 1811 of the outer pipe 181 and the distal end 1821 of the inner pipe 182 do not interfere with the expansion valve side connector 186 at the inserting process, and the bulge processed portion 181a of the outer pipe 181 can be reliably brought into contact with the end surface 1865. In particular, even when the distal end 1821 of the inner pipe 182 and the distal end 1811 of the outer pipe 181 are displaced in the axial direction, reliable assembly is possible.

In FIG. 11, the holding plate 188 is placed to press against the bulge processed portion 181a, and the bulge processed portion 181a is sandwiched and held between the holding plate 188 and an end surface 1865 of the expansion valve side connector 186. Then, in that state, the internal heat exchanger 18 and the expansion valve side connector 186 are assembled using the bolt 189. However, as in the third embodiment shown in FIG. 6, the assembling process may be performed by using the resin member 30. In particular, as shown in FIG. 1, the expansion valve 14 is attached to the casing 21 together with the evaporator 15.

As described above, the internal heat exchanger 18 is arranged in the engine room of an automobile, and the casing 21 is arranged in the passenger compartment. The expansion valve 14 is exposed more to a side of the engine room than the firewall that separates the engine room and the passenger compartment. Therefore, the exposed portion of the expansion valve 14a provide a limited work space.

As described above, in a case that the resin member 30 is used, the internal heat exchanger 18 can be attached to the expansion valve side connector 186 by pressing the internal heat exchanger 18 in the axial direction. Therefore, in the example of integrating the expansion valve 14 with the expansion valve side connector 186, it is desirable to use the resin member 30.

Seventh Embodiment

In the above-described embodiment, the spiral groove 1822 is formed over almost the entire length of the inner pipe 182 except for the end portion 1820. The spiral groove 1822 allows the inner-outer flow path 18a to be formed in a spiral shape, and the heat exchange efficiency can be improved.

On the other hand, in a case that the expansion valve side connector 186 is arranged at one end of the internal heat exchanger 18 and the counter-expansion valve side connector 31 is also arranged on the opposite side, a space between the expansion valve side connector 186 and the counter-expansion valve side connector 31 is entirely provided by the internal heat exchanger 18. Therefore, the heat exchange amount of the internal heat exchanger 18 is uniquely defined by a distance between the expansion valve side connector 186 and the counter-expansion valve side connector 31.

However, it is necessary to optimize the amount of heat exchange as a system. As the amount of heat exchange in the internal heat exchanger 18 increases, the temperature of the refrigerant flowing into the compressor 12 tends to rise. As a result, the system may not be optimized.

For example, in a case that cooling other equipment by using a low-temperature intake refrigerant from the evaporator 15 to the compressor 12, it is not desirable that the temperature of the intake refrigerant rises too high. Other devices may include, for example, inverters of electric compressors of electric vehicles or hybrid vehicles.

Figure 14:
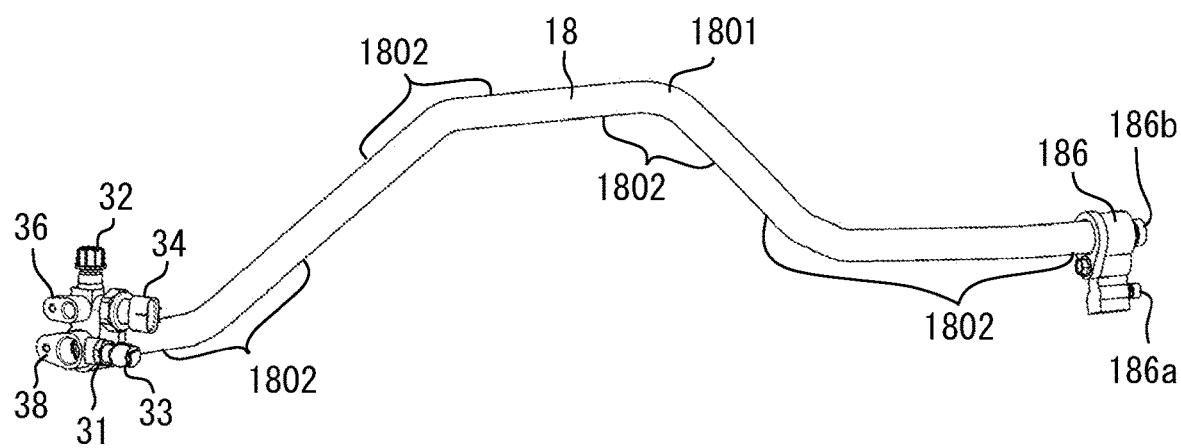
FIG. 14 is a perspective view showing an internal heat exchanger.

Therefore, in order to ensure consistency between the amount of heat exchange required for the internal heat exchanger 18 and the length of the internal heat exchanger 18, the spiral groove 1822 may be formed on a part of the internal heat exchanger 18, i.e., the spiral groove 1822 may not be formed in other parts, as shown in FIG. 14. In particular, in a case that it is necessary to reduce the amount of heat exchange of the internal heat exchanger 18, the portion where the spiral groove 1822 is formed is shortened. In FIG. 14, the spiral groove 1822 is formed in the portion indicated by 1802, and the spiral groove 1822 is not formed in the remaining portion.

Further, as described above, the spiral groove 1822 also has a function as a concentric structure of the inner pipe 182 and the outer pipe 181. As a portion where this concentric structure is required, in addition to the end portions 1820 and 1810 to be assembled with the expansion valve side connector 186 and the counter-expansion valve side connector 31, there is also a bending portion 1801. Therefore, in the example of FIG. 14, the spiral grooves 1822 are formed at the end portions 1820 and 1810 and the bent portion 1801.

In addition, it is possible to adjust the heat exchange efficiency by partially cutting the rib 1815 in the example in which the rib 1815 toward inwardly is formed on the outer pipe 181 in a protruding manner similar to the double pipes (c), (d), (e), (g), (i), (j), (m) and (n) in FIG. 12, and the rib 1815 toward outwardly from the inner pipe 182 is formed in a protruding manner similar to (h).

Further, adjusting heat exchange efficiency is possible to form a partial coating of a heat insulating material, instead of forming or not forming the spiral groove 1822 or the rib 1815, or in addition to the spiral groove 1822 and the like.

Eighth Embodiment

Figure 15:
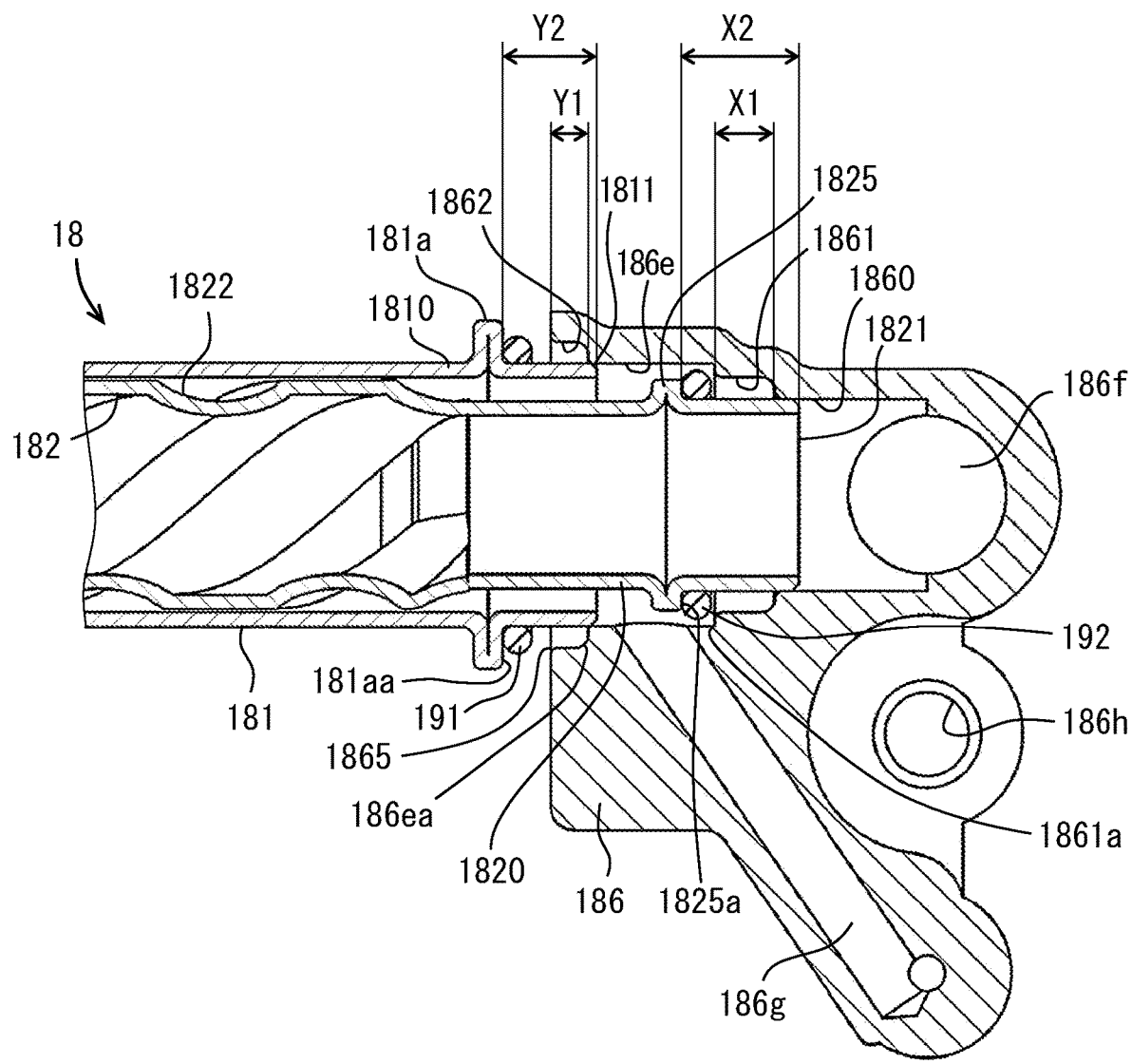
FIG. 15 is a cross-sectional view showing a part of an internal heat exchanger according to an eighth embodiment.

In the above-described embodiment, the inner pipe 182 and the outer pipe 181 are provided with the inner pipe side O-ring groove 182a and the outer pipe side O-ring groove 181b for holding the O-ring, respectively, but the end portions 1820 and 1810 of the inner pipe 182 and the outer pipe 181 may have straight cylindrical shapes. As shown in FIG. 15, the outer pipe side O-ring 191 is sandwiched and held between the bulge processed portion 181a and the outer pipe insertion portion 186e of the expansion valve side connector 186. A flange portion (a bulge processed portion) 1825 is formed on the inner pipe 182 similarly, and the inner pipe side O-ring 192 is sandwiched and held between the bulge processed portion 1825 and the inner pipe O-ring holding portion 186l of the expansion valve side connector 186.

Also in this embodiment, a distance from the end surface 1865 of the expansion valve side connector 186 to a beginning point (a left end in FIG. 15) of the outer pipe insertion portion 186e and a distance from the end surface 1865 to a beginning point (the left end in FIG. 15) of the inner pipe insertion portion 1860, and a distance from the distal end 1811 of the outer pipe 181 to the distal end 1821 of the inner pipe 182 are set in order to prevent the outer pipe side O-ring 191 and the inner pipe side O-ring 192 from an abnormally biting.

As shown in FIG. 15, at inserting the internal heat exchanger 18 into the expansion valve side connector 186, first, the distal end 1821 of the inner pipe 182 comes into contact with the inner pipe insertion portion 1860 of the expansion valve side connector 186. Since the distal end 1821 of the inner pipe 182 and the inner pipe insertion portion 1860 of the expansion valve side connector 186 are both formed with the tapers, the inner pipe 182 is guided by this taper and is smoothly inserted into the inner pipe insertion portion 1860.

Next, the distal end 1811 of the outer pipe 181 comes into contact with the outer pipe insertion portion 186e of the expansion valve side connector 186. Since the distal end 1821 of the outer pipe 181 and the outer pipe insertion portion 186e of the expansion valve side connector 186 are also both formed with the tapers, the outer pipe 181 is guided by this taper and is smoothly inserted into the outer pipe insertion portion 186e.

When the insertion is further advanced from that state, the inner pipe side O-ring 192 comes into contact with the inner pipe O-ring holding portion 186l of the expansion valve side connector 186. The inner pipe O-ring holding portion 186l is a part of the inner pipe insertion portion 1860 of the expansion valve side connector 186, and is formed on a side to the outer pipe insertion portion 186e (a right side in FIG. 15). The inner diameter of the inner pipe O-ring holding portion 186l is formed to be larger than the outer diameter of the bulge processed portion 1825 of the inner pipe 182. Since the inner pipe O-ring holding portion 186l is also formed with the taper, the inner pipe side O-ring 192 is inserted into the inner pipe O-ring holding portion 186l along the taper while being compressed and deformed.

When the insertion is further advanced, the outer pipe side O-ring 191 comes into contact with the outer pipe O-ring holding portion 1862 of the expansion valve side connector 186. The outer pipe O-ring holding portion 1862 is also a part of the outer pipe insertion portion 186e. It is formed among the outer pipe insertion portion 186e on a side of the end surface 1865 of the expansion valve side connector 186.

Similar to the inner pipe O-ring holding portion 186l described above, since the outer pipe O-ring holding portion 1862 is also formed with the taper, the outer pipe side O-ring 191 is also inserted while being compressed and deformed along the taper. The inner diameter of the outer pipe O-ring holding portion 1862 is smaller than the outer diameter of the bulge processed portion 181a of the outer pipe 181. When the inserting process is further advanced, the bulge processed portion 181a of the outer pipe 181 finally comes into contact with the end surface 1865 of the expansion valve side connector 186. Then, in order to perform the above insertion smoothly, the pipe contracting described with reference to FIG. 13 are performed at the end portions 1820 and 1810 of the inner pipe 182 and the outer pipe 181. The pipe contracting is molded so that the axes of the inner pipe 182 and the outer pipe 181 are aligned.

Figure 16:
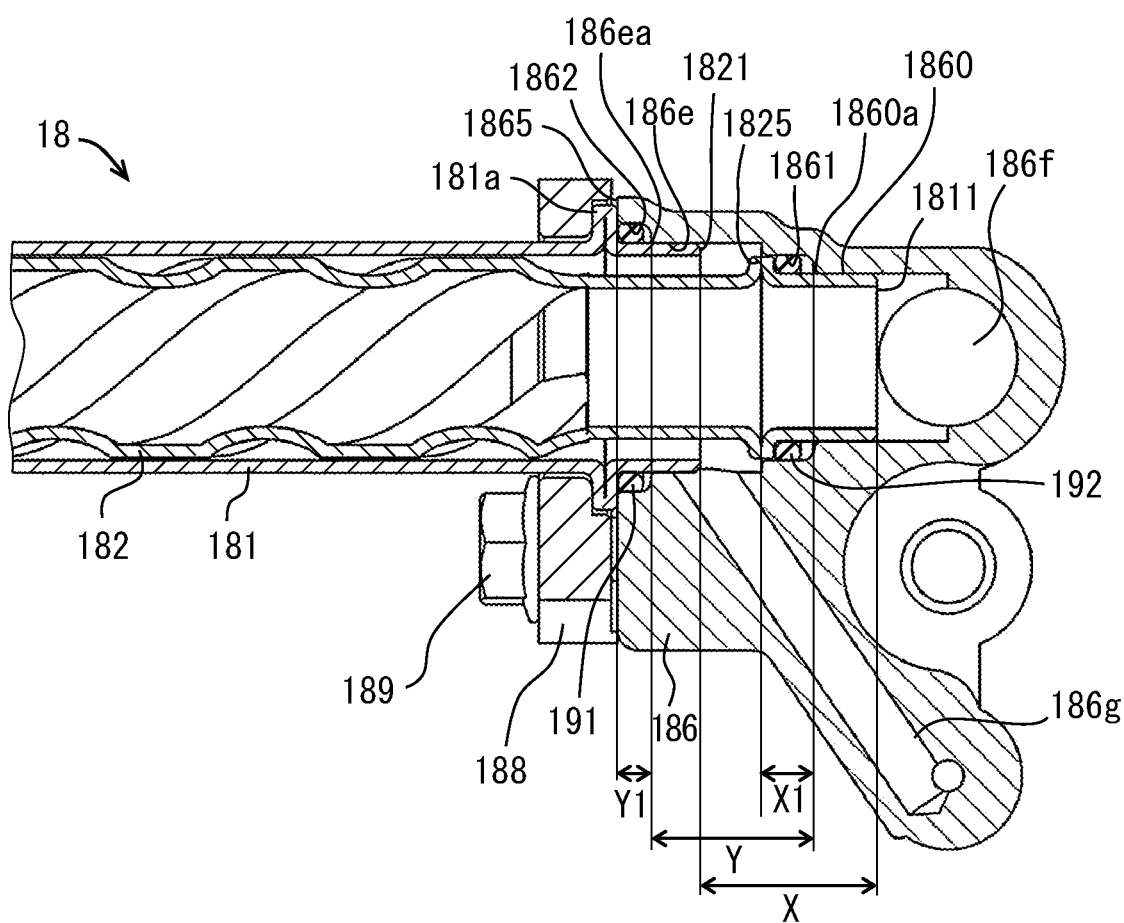
FIG. 16 is a cross-sectional view showing a part of the internal heat exchanger according to the eighth embodiment.

A state in which the inserting process is completed is a state shown in FIG. 16, and the inner pipe side O-ring 192 is held by the outer peripheral surface of the end portion 1820 of the inner pipe 182, the bulge processed portion 1825, and the inner peripheral surface of the inner pipe O-ring holding portion 186l. The outer pipe side O-ring 191 is held by the outer peripheral surface of the end portion 1810, the bulge processed portion 181a, and the inner peripheral surface of the outer pipe O-ring holding portion 1862.

In the present embodiment, a positional relationship of the distal end 1821 of the inner pipe, the inner pipe side O-ring 192, the distal end 1811 of the outer pipe, and the outer pipe side O-ring 191, and the inner pipe insertion portion 1860 and the outer pipe insertion portion 186e of the expansion valve side connector 186 defines a following configuration. At inserting the inner pipe 182 and the outer pipe 181 into the expansion valve side connector 186, first the distal end 1821 of inner pipe comes into contact with the inner pipe insertion portion 1860, and next the distal end 1811 of the outer pipe 181 comes into contact with the outer pipe insertion portion 186e. After that, the inner pipe side O-ring 192 comes into contact with the inner pipe insertion portion 1860, and then the outer pipe side O-ring 191 comes into contact with the outer pipe insertion portion 186e. In the structure, finally the bulge processed portion 181a abuts on the end surface 1865 of the expansion valve side connector 186.

As a result, an axis alignment is first performed between the expansion valve side connector 186 and the inner pipe 182. In that state, an axis alignment is performed between the expansion valve side connector 186 and the outer pipe 181. Therefore, even if the axes of the inner pipe and the outer pipe are slightly deviated from each other, smooth coupling is possible.

Moreover, since the inner pipe side O-ring 192 and the outer pipe side O-ring 191 are already inserted in a state where the inner pipe 182 and the outer pipe 181 are axially aligned with each other, the risk of biting is greatly reduced. In particular, since the outer pipe side O-ring 191 is inserted after the inner pipe side O-ring 192 is inserted, the two O-rings do not start to be deformed at the same time, and the assembly becomes smooth.

The positional relationship between the inner pipe 182, the inner pipe side O-ring 192, the outer pipe 181 and the outer pipe side O-ring 191 and the expansion valve side connector 186, in an assembled state, is described as follows.

A beginning point of a portion, which comes into contact with the inner pipe 182, among the inner pipe insertion portion 1860, i.e., a boundary portion with the inner pipe O-ring holding portion 186l among the inner pipe insertion portion 1860 is indicated by reference numeral 1860a. The beginning point of a portion, which comes into contact with the outer pipe 181, among the outer pipe insertion portion 186e, i.e., a boundary portion with the outer pipe O-ring holding portion 1862 among the outer pipe insertion portion 186e is indicated by reference numeral 186ea. Then, Y indicates a distance between the beginning point 1860a of the inner pipe insertion portion 1860 and the beginning point 186ea of the outer pipe insertion portion 186e.

The distance X of the distal end 1821 of the inner pipe 182 and the distal end 1811 of the outer pipe 181 is longer than the distance Y. As a result, as described above, the distal end 1821 of the inner pipe 182 is inserted into the inner pipe insertion portion 1860 prior to the distal end 1821 of the outer pipe 181.

Further, X1 indicates a distance of the inner pipe O-ring holding part 186l among the inner pipe insertion part 1860. Then, Y1 indicates a distance of the outer pipe O-ring holding portion 1862 among the outer pipe insertion portion 186e.

An assembled state provides a structure in which the distance X1 is longer than the distance Y1. That is, the inner pipe O-ring holding portion 186*l* is longer than the outer pipe O-ring holding portion 1862. As a result, as described above, a structure is that the inner pipe side O-ring 192 comes into contact with the inner pipe O-ring holding portion 186*l* prior to the outer pipe side O-ring 191 in a prior manner.

Further, in an assembled state, X2 indicates a distance between the distal end 1821 of the inner pipe 182 and a surface 1825*a* (a surface on the right side in FIG. 15) on a side of the inner pipe side O-ring 192 of the bulge processed portion 1825. This distance X2 is longer than a sum of the distance X1 to the beginning point 1860*a* of a portion, which comes into contact with the inner pipe 182, among the inner pipe insertion portion 1860 and a diameter of the inner pipe side O-ring 192. The distance X1 to the beginning point 1860*a* of the portion which comes into contact with the inner pipe 182 among the inner pipe insertion portion 1860 is also the length X1 of the inner pipe O-ring holding portion 186*l* among the inner pipe insertion portion 1860.

As a result, the inner pipe side O-ring 192 is inserted into the inner pipe O-ring holding portion 186*l* after the distal end 1821 of the inner pipe 182 is inserted into the inner pipe insertion portion 1860.

The outer pipe 181 also has a distance Y2 of the distal end 1811 thereof and a surface 181*aa* (a surface on the right side in FIG. 15) on a side of the outer pipe side O-ring 191 of the bulge processed portion 181*a* longer than a sum of a distance Y1 to the beginning point 186*ea* of the portion, which comes into contact with the outer pipe 181, among the outer pipe insertion portion 186*e* and the diameter of the outer pipe side O-ring 191. The distance Y1 to the beginning point 186*ea* of the portion, which comes into contact with the outer pipe 181, among the outer pipe insertion portion 186*e* is also the distance Y1 of the outer pipe O-ring holding portion 1862 among the outer pipe insertion portion 186*e*.

The distal end 1811 of the outer pipe 181 is also inserted into the outer pipe insertion portion 186*e* prior to the outer pipe side O-ring 191. Therefore, biting of the outer pipe side O-ring 191 can be satisfactorily prevented.

In this embodiment, similar to the fourth embodiment described above, the high-pressure communication space 186*k* is formed between the distal end 1811 of the outer pipe 181 and the innermost portion of the outer pipe insertion portion 186*e*, and the low-pressure refrigerant flow path 186*f* is formed between the distal end 1821 of the inner pipe 182 and the innermost portion of the inner pipe insertion portion 1860. Therefore, the distal end 1811 of the outer pipe 181 and the distal end 1821 of the inner pipe 182 are both free and do not interfere with other portions of the expansion valve side connector 186, and the bulge processed portion 181*a* of the outer pipe 181 ca be surely abut to the end surface 1865. Even if a positional shift between the distal end 1821 of the inner pipe 182 and the distal end 1811 of the outer pipe 181 occurs, it is possible to perform fine assembly.

Figure 17:
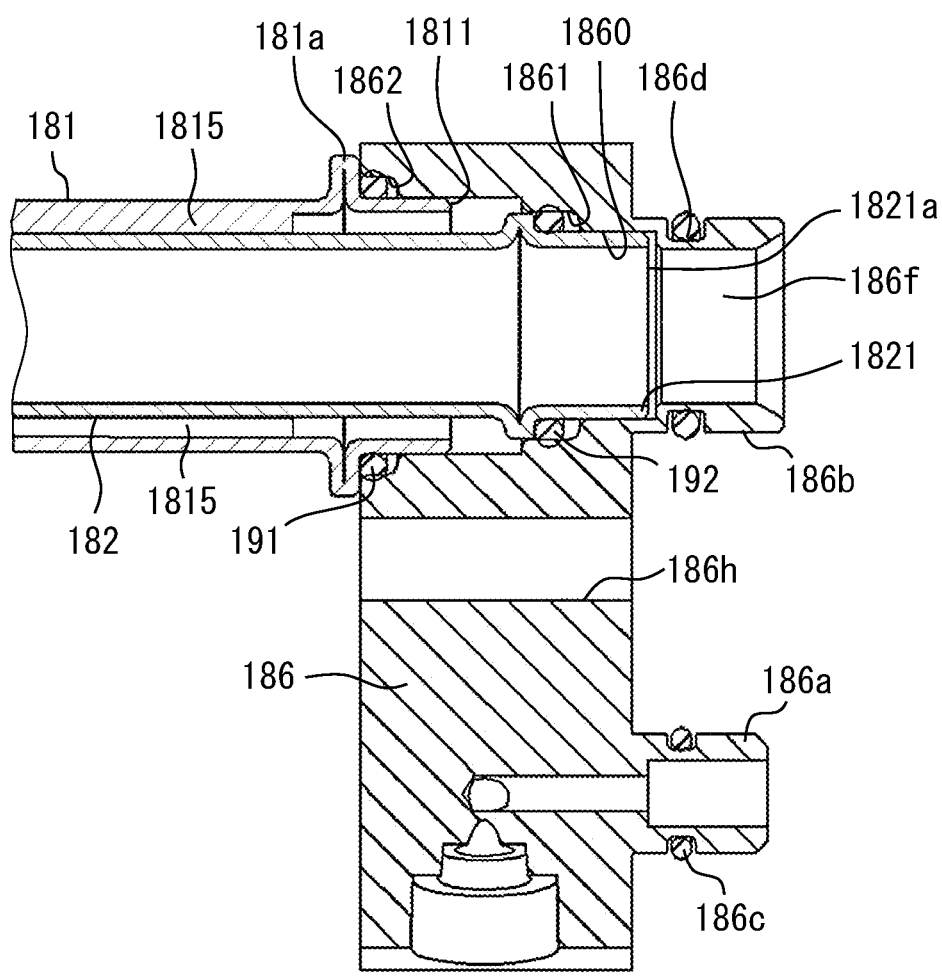
FIG. 17 is a cross-sectional view showing a part of the internal heat exchanger according to the eighth embodiment.

In the embodiment of FIGS. 15 and 16, as in the example of FIG. 8, the outlet direction of the high-pressure refrigerant flow path 186*g* of the expansion valve side connector 186 and the inlet of the low-pressure refrigerant flow path 186*f* are placed so that the axes thereof are orthogonal with respect to the internal heat exchanger 18. However, as in the embodiment of FIG. 4, the axes of the high-pressure refrigerant flow path 186*g* of the expansion valve side connector 186 and the inlet of the low-pressure refrigerant flow path 186*f* may be in the same direction as the axis of the internal heat exchanger 18. Similar to the above examples, it is possible to have a degree of freedom in positional arrangements by changing the shape of the expansion valve side connector 186. FIG. 17 shows an example in which the axes of the outlet of the high-pressure refrigerant flow path 186*g* and the inlet of the low-pressure refrigerant flow path 186*f* and the axis of the internal heat exchanger 18 are in the same direction.

Also in the embodiment of FIG. 17, since the gap 1821*a* is formed between the distal end 1821 of the inner pipe 182 and the innermost portion (right side of FIG. 17) of the inner pipe insertion portion 1860, it is possible to bring into contact the bulge processed portion 181*a* of the outer pipe 181 with the end surface 1865.

In the embodiment of FIG. 17, the rib 1815 is used instead of the spiral groove 1822 of FIGS. 15 and 16. The rib 1815 is formed integrally and toward inwardly from the outer pipe 181 similar to the double pipe of (c), (d), (e), (g), (i), (j), (m) and (n) of FIG. 12. Therefore, the rib 1815 is cut and removed at the end portion 1810 of the outer pipe 181, and then the bulge processed portion 181*a* is formed in that state.

Ninth Embodiment

In the above-described embodiment, the high-pressure refrigerant flow path 186*g* is formed inside the expansion valve side connector 186 to communicate the high-pressure side joint 186*a* and the inner-outer flow path 18*a*. However, as shown in FIG. 18, the high-pressure side joint 186*a* may be directly opposed to the high-pressure communication space 186*k* sealed by the inner pipe side O-ring 192 and the outer pipe side O-ring 191.

In this case, the inside of the high-pressure side joint 186*a* becomes the high-pressure refrigerant flow path 186*g*. Therefore, since the sealing plug 187 (FIG. 4) of the expansion valve side connector 186 is also unnecessary, this facilitates a molding process.

Figure 18:
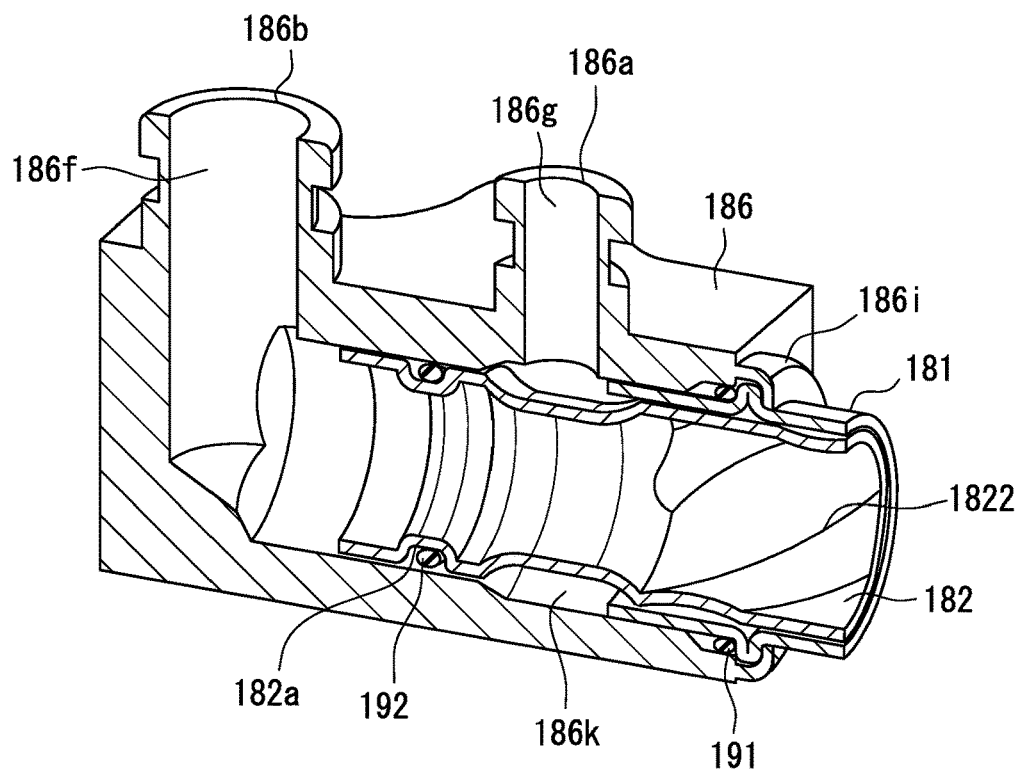
FIG. 18 is a cross-sectional view showing a part of an internal heat exchanger according to a ninth embodiment.
Figure 19:
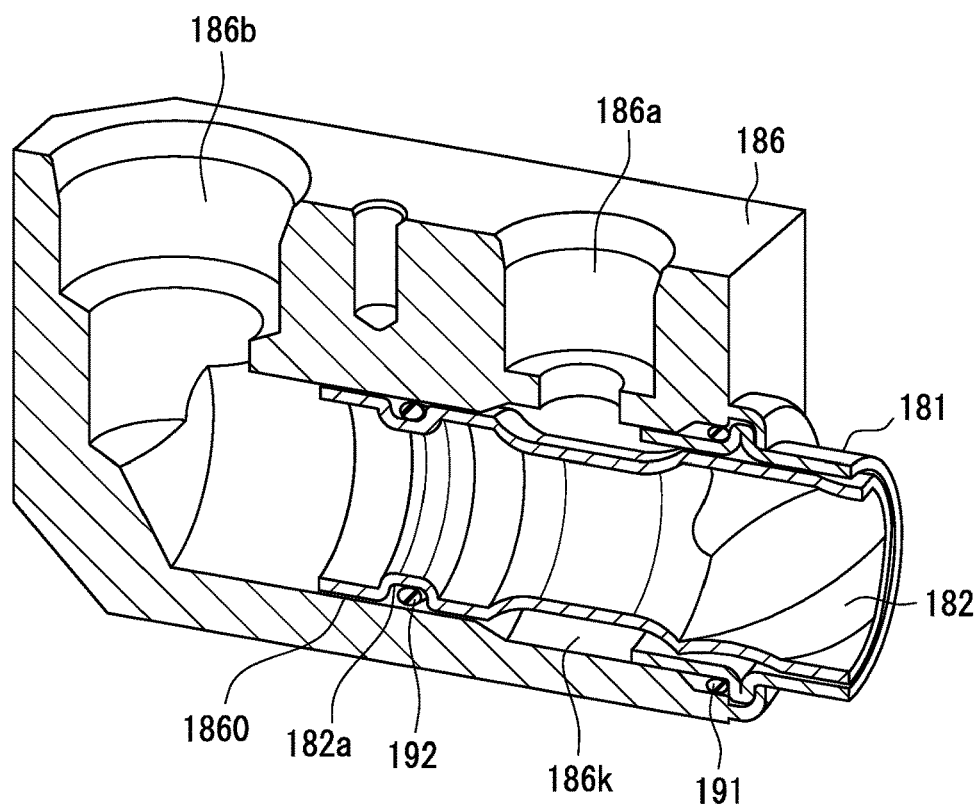
FIG. 19 is a cross-sectional view showing a part of the internal heat exchanger according to the ninth embodiment.

In the embodiment of FIG. 18, the high-pressure side joint 186*a* and the low-pressure side joint 186*b* are formed in male shapes, but as shown in FIG. 19, the high-pressure side joint 186*a* and the low-pressure side joint 186*b* may be formed in female shapes.

Even in this embodiment, the distal end 1811 of the outer pipe 181 and the distal end 1821 of the inner pipe 182 are free, and the bulge processed portion 181*a* can be reliably brought into contact with the end surface 1865 similar to the above described embodiment.

In the embodiments shown in FIGS. 18 and 19, the inner pipe side O-ring groove 182*a* is formed in the inner pipe 182 to hold the inner pipe side O-ring 192, as in the first embodiment. Similar to the eighth embodiment, the outer pipe 181 is formed in a straight at the end portion 1810 and holds the outer pipe side O-ring 191 on the outer circumference.

Here, compared to the straight shape, the inner pipe side O-ring groove O-ring groove 182*a* requires more steps to form, but on the other hand, if the straight shape is used, it is required to process the bulge processed portion 1825 for holding the inner pipe side O-ring 192. Choice of a holding method may be determined to meet requirements by considering a sealing performance of the O-ring, an axial tolerance of the inner pipe 182 and/or the outer pipe 181 and the like.

This also applies to an example in which the outer pipe side O-ring groove 181*b* is formed in the outer pipe 181. Therefore, whether the O-ring grooves 181*b* and 182*a* are formed or the straight shape is determined in consideration of the sealing performance, cost, and the like.

Further, in the embodiment of FIGS. 18 and 19, the bulge processed portion 181a of the outer pipe 181 is fixed by the crimped fixing portion 186i of the expansion valve side connector 186 as in the second embodiment shown in FIG. 5. In this way, combinations of embodiments may be selected to meet requirements.

Tenth Embodiment

Figure 20:
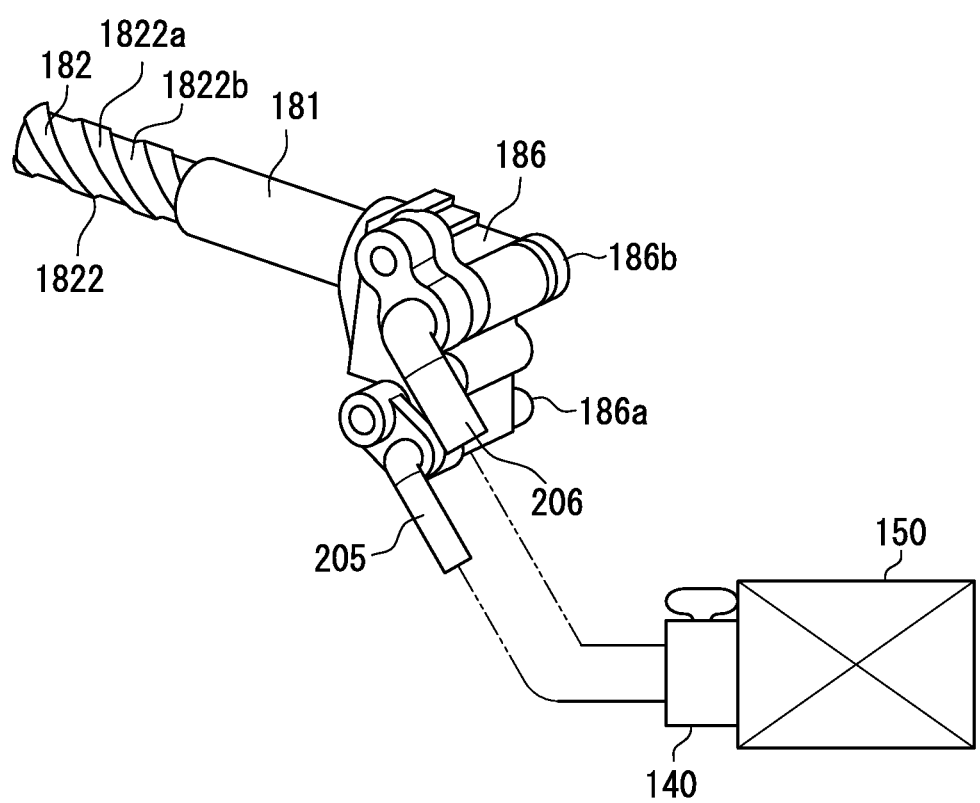
FIG. 20 is a cross-sectional view showing a part of an internal heat exchanger according to a tenth embodiment.

In the above embodiment, the high-pressure side joint 186a and the low-pressure side joint 186b of the expansion valve side connector 186 are formed only on one side of the connector, but may be formed on both sides as shown in FIG. 20. The high-pressure side joint 186a and the low-pressure side joint 186b projecting to the right in FIG. 20 are connected to the high-pressure refrigerant inlet 14a and the low-pressure refrigerant outlet 14b of the expansion valve 14. The high-pressure side joint 186a and the low-pressure side joint 186b are also formed on the left side, and are connected to the high-pressure liquid refrigerant pipe 205 and the low-pressure gas refrigerant pipe 206, respectively. The high-pressure liquid refrigerant pipe 205 has an outer diameter of 8 mm and a wall thickness of 1.0 mm. The low-pressure gas refrigerant pipe 206 has an outer diameter of 12.7 mm and a wall thickness of 1.2 mm.

The high-pressure liquid refrigerant pipe 205 and the low-pressure gas refrigerant pipe 206 in FIG. 20 are connected to a rear cooler expansion valve 140 located at a rear of an automobile passenger compartment. The rear cooler expansion valve 140 is attached to the rear cooler evaporator 150 and decompresses and expands the refrigerant flowing into the rear cooler evaporator 150. An operation of the expansion valve 140 for the rear cooler and the evaporator 150 for the rear cooler is the same as that of the expansion valve 14 and the evaporator 15 of the indoor air conditioning unit 20 described above.

Eleventh Embodiment

Figure 21:
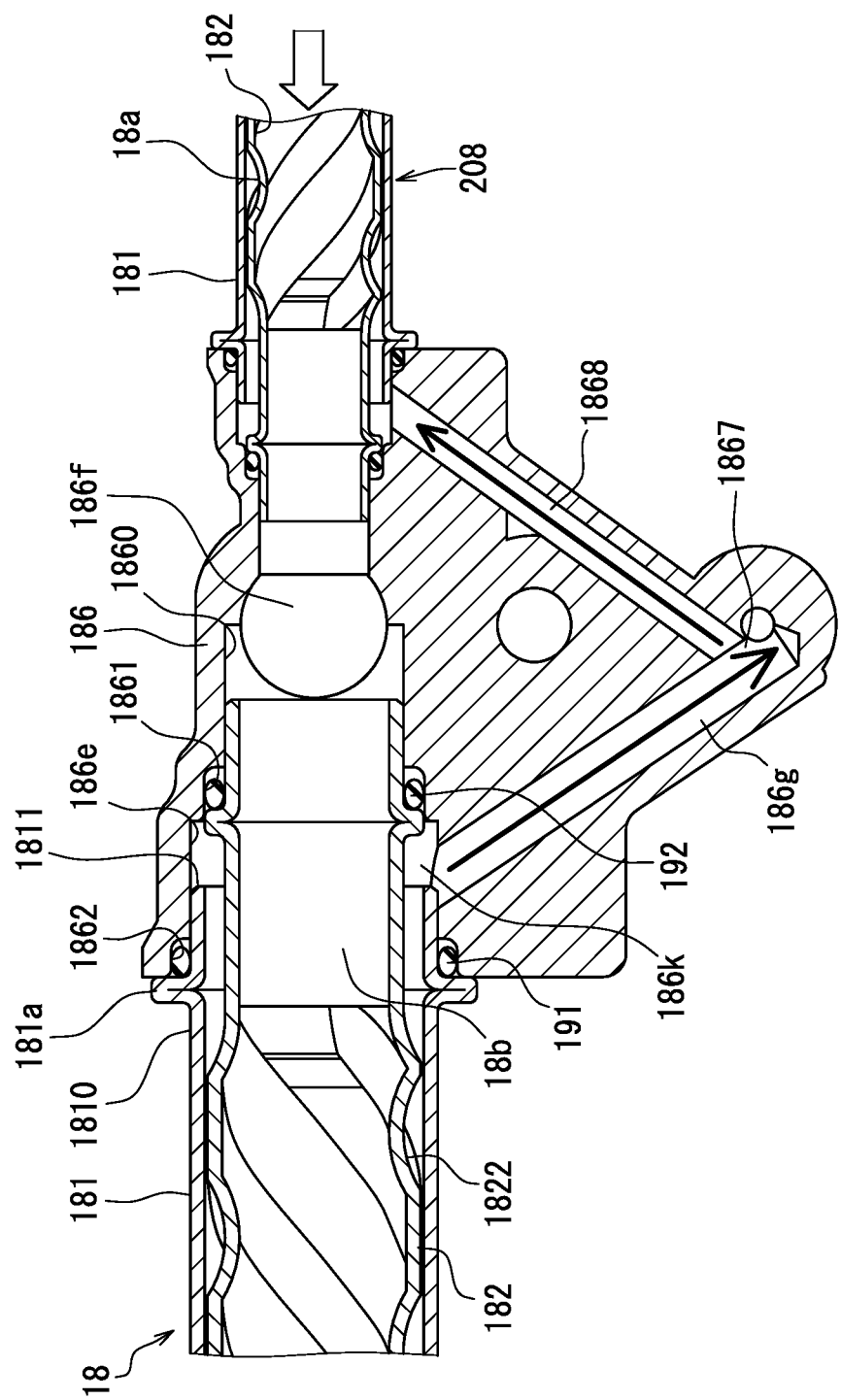
FIG. 21 is a cross-sectional view showing a part of an internal heat exchanger according to an eleventh embodiment.

In the embodiment of FIG. 20, two pipes including the high-pressure liquid refrigerant pipe 205 and the low-pressure gas refrigerant pipe 206 are shown, but the pipes 205 and 206 both may be double pipes. FIG. 21 shows an example in which a rear pipe connecting the rear cooler and the expansion valve side connector 186 is a rear side internal heat exchanger 208 made of the double pipe. The low-pressure refrigerant from the low-pressure refrigerant outlet 14b of the expansion valve 14 and the low-pressure refrigerant from the inner pipe 182 of the rear internal heat exchanger 208 flow into the low-pressure refrigerant flow path 186f, and two low-pressure refrigerants are merged in the low-pressure refrigerant flow path 186f, and are sucked into the compressor 12 through the inner flow path 18b of the inner pipe 182.

The high-pressure refrigerant flow path 186g of the expansion valve side connector 186 branches at the branch portion 1867, and one of the high-pressure refrigerant flow paths 186g flows from the high-pressure side joint 186a into the high-pressure refrigerant inlet 14a of the expansion valve 14. The other branched portion flows from the rear side high-pressure refrigerant flow path 1868 and into the inner-outer flow path 18a of the rear side internal heat exchanger 208. The connection between the outer pipe 181 and the inner pipe 182 of the rear side internal heat exchanger 208 and the expansion valve side connector 186 is the same as that of the above-described embodiment. An outer diameter of the inner pipe 182 of the rear side internal heat exchanger 208 is 12.7 mm, and an outer diameter of the outer pipe 181 is 15.9 mm. Each wall thickness is 1.2 mm.

Twelfth Embodiment

In the above-described embodiment, the axis of the double pipe is aligned with or orthogonal to the extension direction of the high-pressure side joint 186a and the low-pressure side joint 186b. However, an angle between the axis of the double pipe and the extension direction of the high-pressure side joint 186a and the low-pressure side joint 186b can be freely set.

Figure 22:
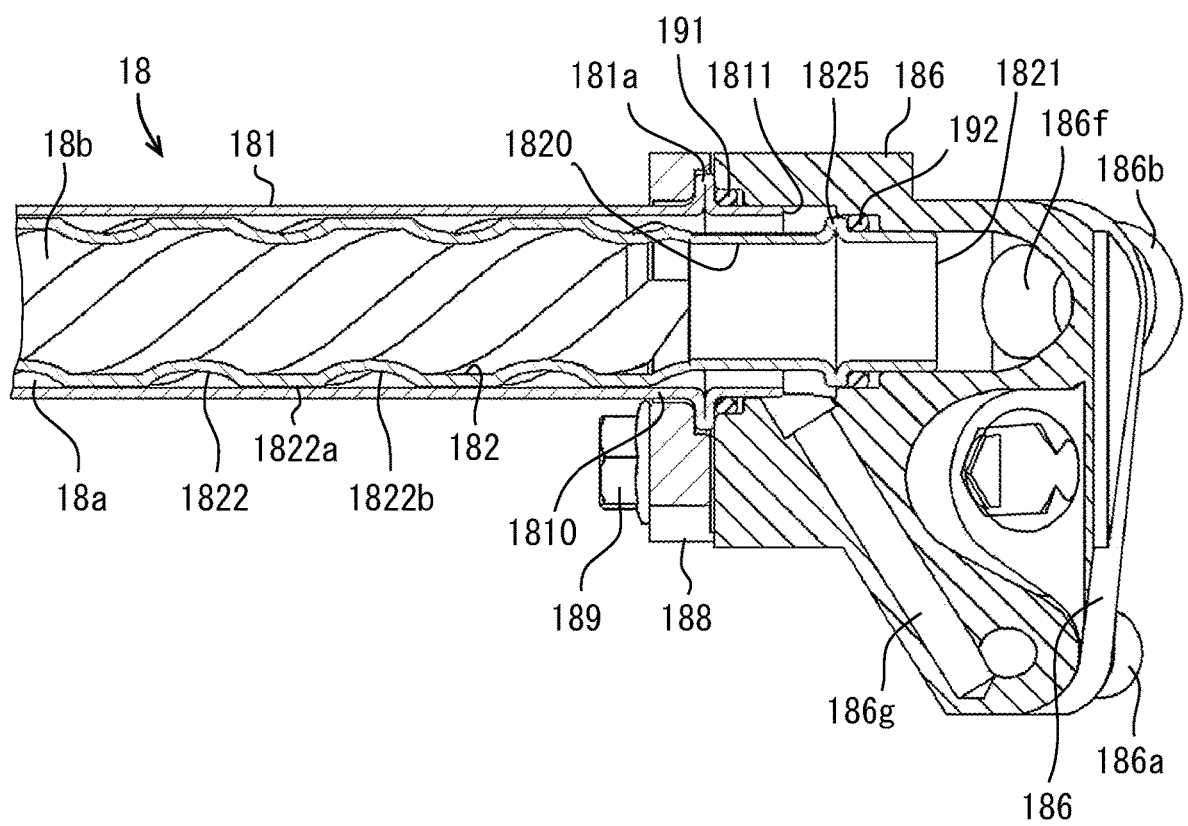
FIG. 22 is a cross-sectional view showing a part of an internal heat exchanger according to a twelfth embodiment.
Figure 23:
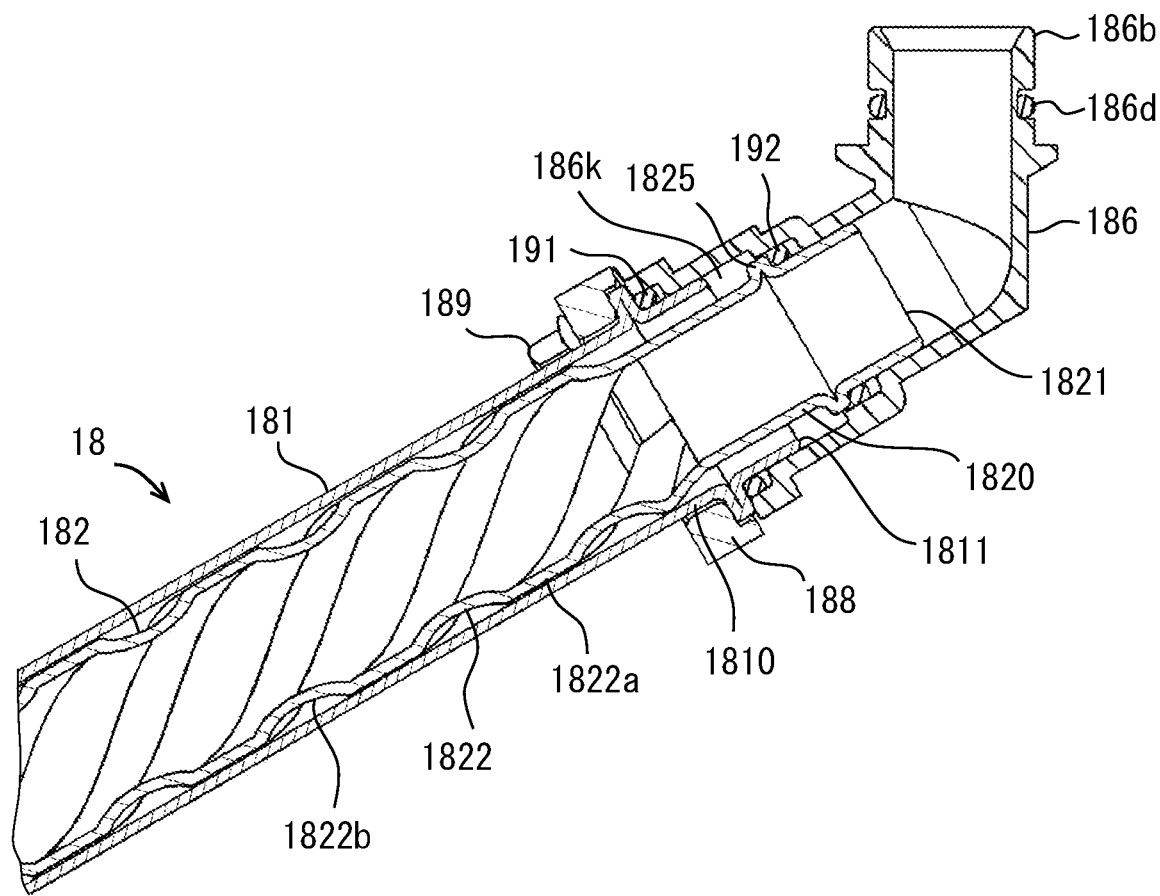
FIG. 23 is a cross-sectional view showing a part of the internal heat exchanger according to the twelfth embodiment.

FIGS. 22 and 23 are examples in which the angle between the extension direction of the high-pressure side joint 186a and the low-pressure side joint 186b and the axis of the double pipe is an obtuse angle. This angle may be designed according to an assembling direction of the double pipe to meet requirements, and of course, it may be an acute angle.

Thirteenth Embodiment

Figure 24:
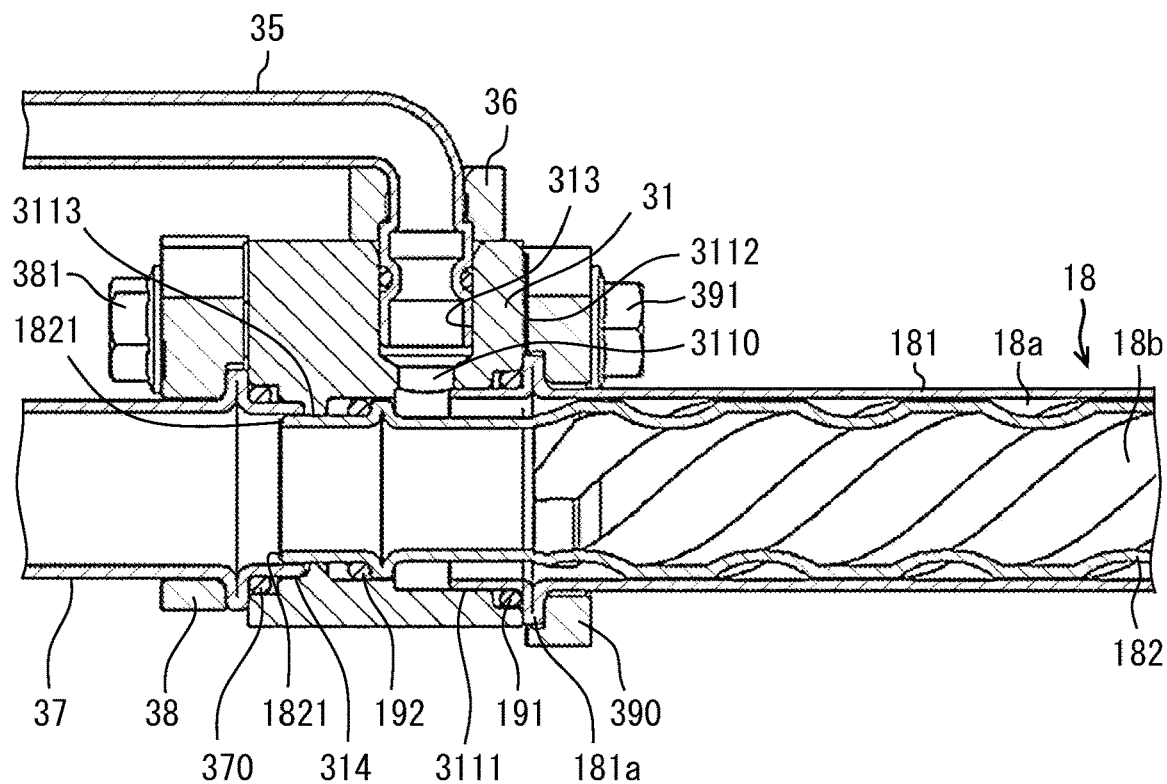
FIG. 24 is a cross-sectional view showing a part of an internal heat exchanger according to a thirteenth embodiment.

As described above, the pressure switch 34 and the like may be eliminated from the fifth embodiment of FIGS. 9 and 10. FIG. 24 shows the counter-expansion valve side connector 31 in which the pressure switch 34 and the like are eliminated. The high-pressure side piping member 35 through which the high-pressure liquid refrigerant flows from the condenser 13 is inserted into the high-pressure side joint portion 313 of the counter-expansion valve side connector 31 and fixed by using the high-pressure side joint plate 36 and a bolt (not shown).

The low-pressure side piping member 37 through which the low-pressure gas refrigerant flowing toward the suction port of the compressor 12 flows is inserted into the low-pressure side joint portion 314 of the counter-expansion valve side connector 31 and fixed by the low-pressure side joint plate 38 and the bolt 381. In this embodiment, the high-pressure side joint portion 313 and the low-pressure side joint portion 314 are female members.

In the counter-expansion valve side connector 31, the distal end 1821 of the inner pipe 182 is inserted into the inner pipe insertion portion 3113 and the distal end 1811 of the outer pipe 181 is inserted into the outer pipe insertion portion 3111. In an inserted state, the bulge processed portion 181a comes into contact with the end surface 3112 and is fixed by a holding plate 390 and the bolt 391.

The distal end 1811 of the outer pipe 181 is open to the high-pressure communication space 3110 and does not interfere at the inserting process. Further, the distal end 1821 of the inner pipe 182 enters into an inside of the low-pressure side piping member 37, and the distal end 1821 is not interfered.

The high-pressure communication space 3110 is sealed by the outer pipe side O-ring 191 and the inner pipe side O-ring 192. Then, the high-pressure communication space 3110 communicates with the inner-outer flow path 18a. Therefore, in the present embodiment, the high-pressure communication space 3110 forms a high-pressure refrigerant flow path.

The inner pipe 182 enters into an inside of the low-pressure side piping member 37, and the inner flow path 18b is sealed by the inner pipe side O-ring 192 and an O-ring 370 of the low-pressure side piping member 37. Therefore, in the present embodiment, the low-pressure side refrigerant flow path corresponds to the end portion 1820 of the inner pipe 182. At the portion of the counter-expansion valve side connector 31, the inner pipe insertion portion 3113 holding the end portion 1820 corresponds to the low-pressure side refrigerant flow path.

Fourteenth Embodiment

In the eleventh embodiment in FIG. 20 and the twelfth embodiment in FIG. 21, both the high-pressure liquid refrigerant pipe 205 and the low-pressure gas refrigerant pipe 206 for the rear cooler are branched by the expansion valve side connector 186.

The present embodiment is the same as the eleventh embodiment and the twelfth embodiment in that the high-pressure liquid refrigerant pipe 205 for the rear cooler is branched by the expansion valve side connector 186. However, as shown in FIGS. 25 to 27, the low-pressure gas refrigerant pipe 206 for the rear cooler is fixed to the counter-expansion valve side connector 31 by a holding plate 380 and a bolt (not shown).

Figure 26:
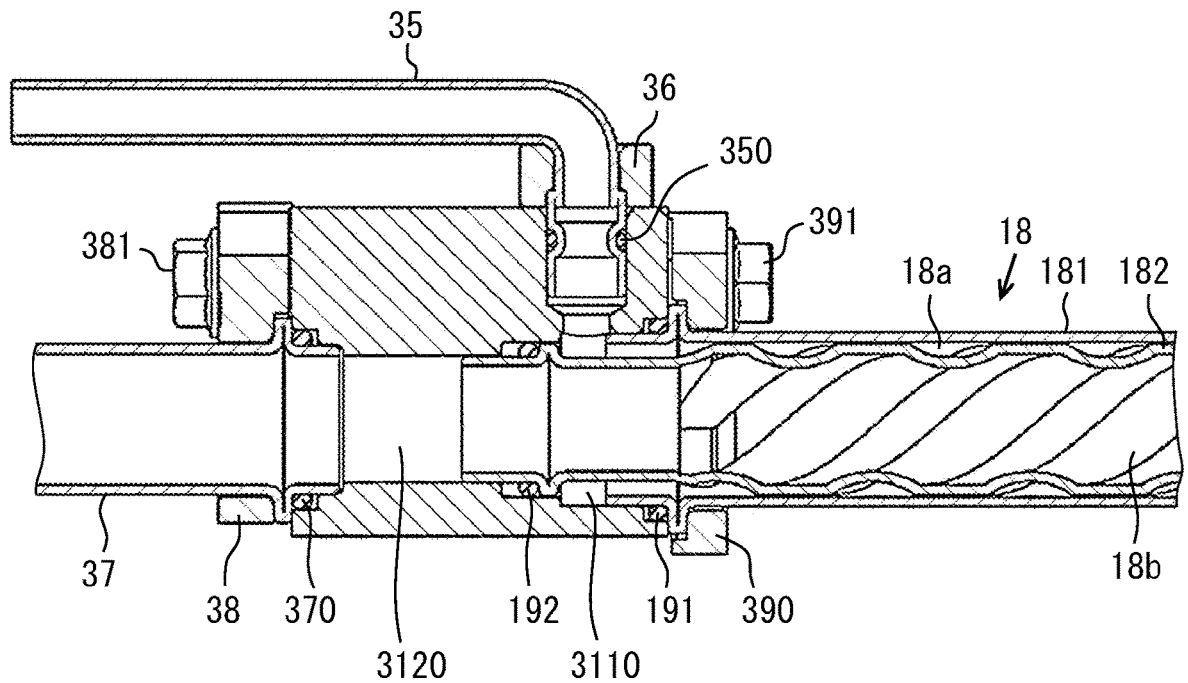
FIG. 26 is a cross-sectional view showing a part of the internal heat exchanger according to the fourteenth embodiment.

In this embodiment, the high-pressure communication space 3110 of the counter-expansion valve side connector 31 communicates with the inner-outer flow path 18a of the internal heat exchanger 18 (FIG. 26). Therefore, all the high-pressure liquid refrigerant from the condenser 13 flows into the inner-outer flow path 18a. Then, the expansion valve side connector 186 branches into a flow flowing to the expansion valve 14 of the indoor air conditioning unit 20 for a front side and a flow flowing to the expansion valve of the rear cooler.

Figure 25:
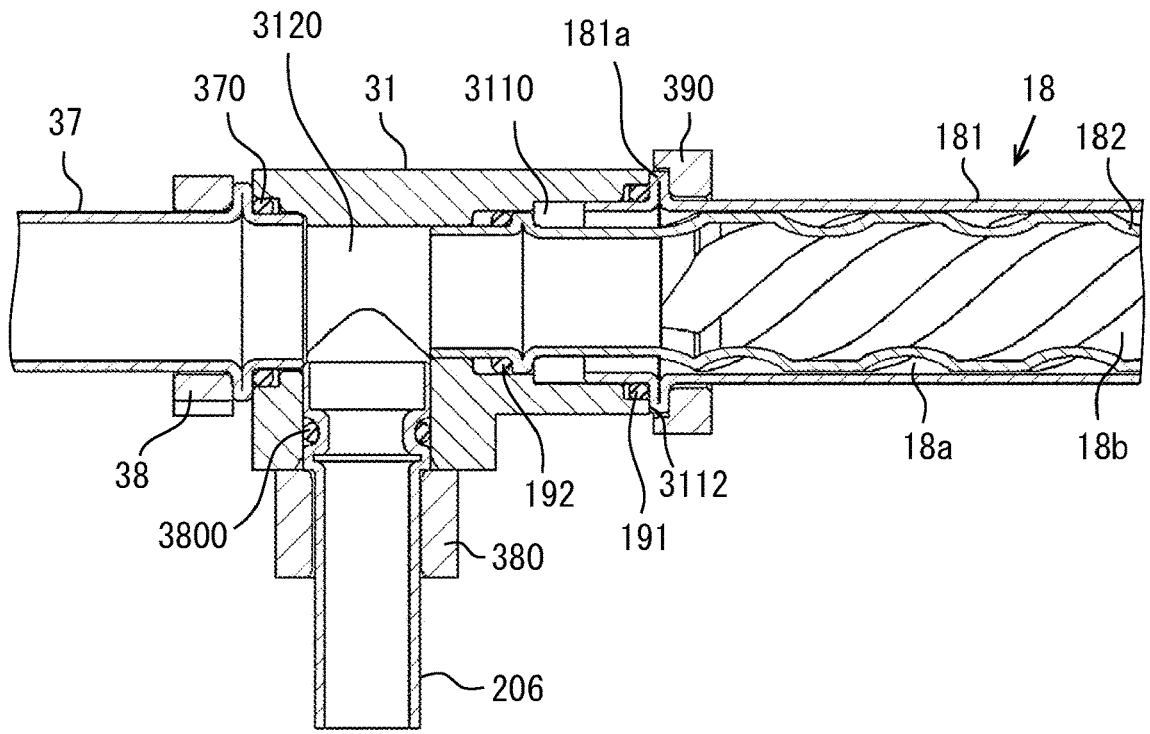
FIG. 25 is a cross-sectional view showing a part of an internal heat exchanger according to a fourteenth embodiment.

On the other hand, the flow of the low-pressure gas refrigerant merges in the low-pressure communication space 3120 of the counter-expansion valve side connector 31 (FIG. 25). That is, the inner flow path 18b and the low-pressure gas refrigerant pipe 206 of the rear cooler are open to the low-pressure communication space 3120. The low-pressure side piping member 37 is also connected to the low-pressure communication space 3120, and the gas refrigerant merged is sucked into the compressor 12 via the low-pressure side piping member 37.

Figure 27:
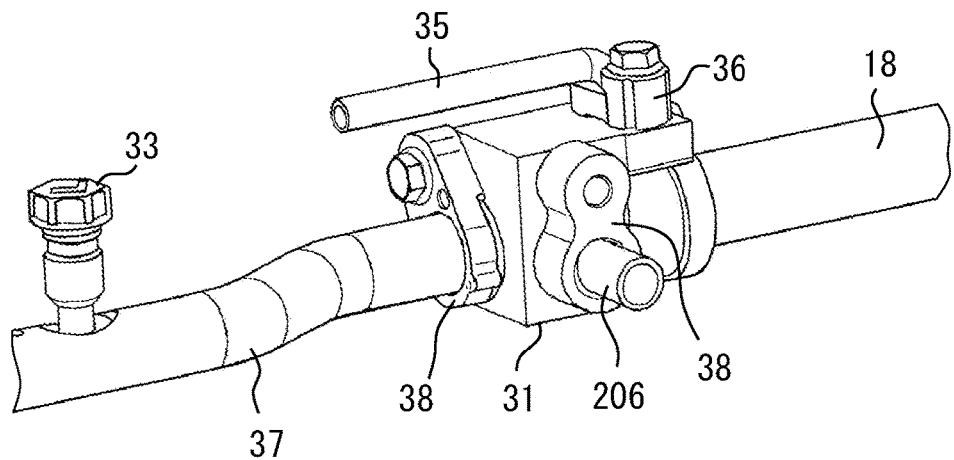
FIG. 27 is a perspective view showing a part of the internal heat exchanger according to the fourteenth embodiment.

As shown in FIG. 27, an arrangement position of the high-pressure side piping member 35 and an arrangement position of the low-pressure gas refrigerant pipe 206 of the rear cooler are orthogonal to each other. FIG. 25 shows a cross-sectional view at a position where the low-pressure gas refrigerant pipe 206 of the rear cooler is shown, and FIG. 26 shows a cross-sectional view at a position where the high-pressure side piping member 35 is shown.

The internal heat exchanger 18 and the counter-expansion valve side connector 31 are sealed by the outer pipe side O-ring 191 and the inner pipe side O-ring 192 as in the above embodiment. Further, the counter-expansion valve side connector 31 and the low-pressure side piping member 37 are sealed by the O-ring 370, and the rear cooler low-pressure gas refrigerant piping 206 is also sealed by an O-ring 3800. The high-pressure side piping member 35 is also sealed by an O-ring 350. Performing a connection of the double pipe or the piping member by mechanical assembling using the O-ring and the bolt is the same as the above-described embodiment.

As shown in FIG. 27, the low-pressure side service valve 33 is attached to the low-pressure side piping member 37. Although not shown, a high-pressure side service valve 32 is attached to the high-pressure side piping member 35. The pressure sensor or pressure switch 34 is attached to an outlet side tank of the high-pressure side piping member 35 or the condenser 13. However, the pressure switch 34 or the like may be attached to the counter-expansion valve side connector 31 as in the fifth embodiment shown in FIG. 10.

In the present embodiment, it is possible to obtain a predetermined sub-cool to the high-temperature and high-pressure liquid refrigerant flowing through the inner-outer flow path 18a by performing heat exchange with the low-temperature and low-pressure gas refrigerant from the evaporator 15 of the indoor air-conditioning unit 20 on the front side. In that state, it flows into both expansion valves 14 and 140 for the indoor air-conditioning unit 20 on the front side and the rear cooler, and is evaporated by the evaporators 15 and 150, respectively, therefore, it is possible to perform efficient operation of the refrigeration cycle.

On the other hand, among the refrigerant sucked into the compressor 12, the refrigerant from the evaporator 15 of the indoor air-conditioning unit 20 on the front side is over-heated by performing heat exchange at the internal heat exchanger 18, but the refrigerant from the rear cooler evaporator 150 does not perform heat exchange. Therefore, it is possible to prevent a situation in which the temperature of the refrigerant sucked into the compressor 12 becomes higher than necessary. In addition, a degree of freedom in handling the low-pressure gas refrigerant pipe 206 of the rear cooler is increased.

Fifteenth Embodiment

Figure 29:
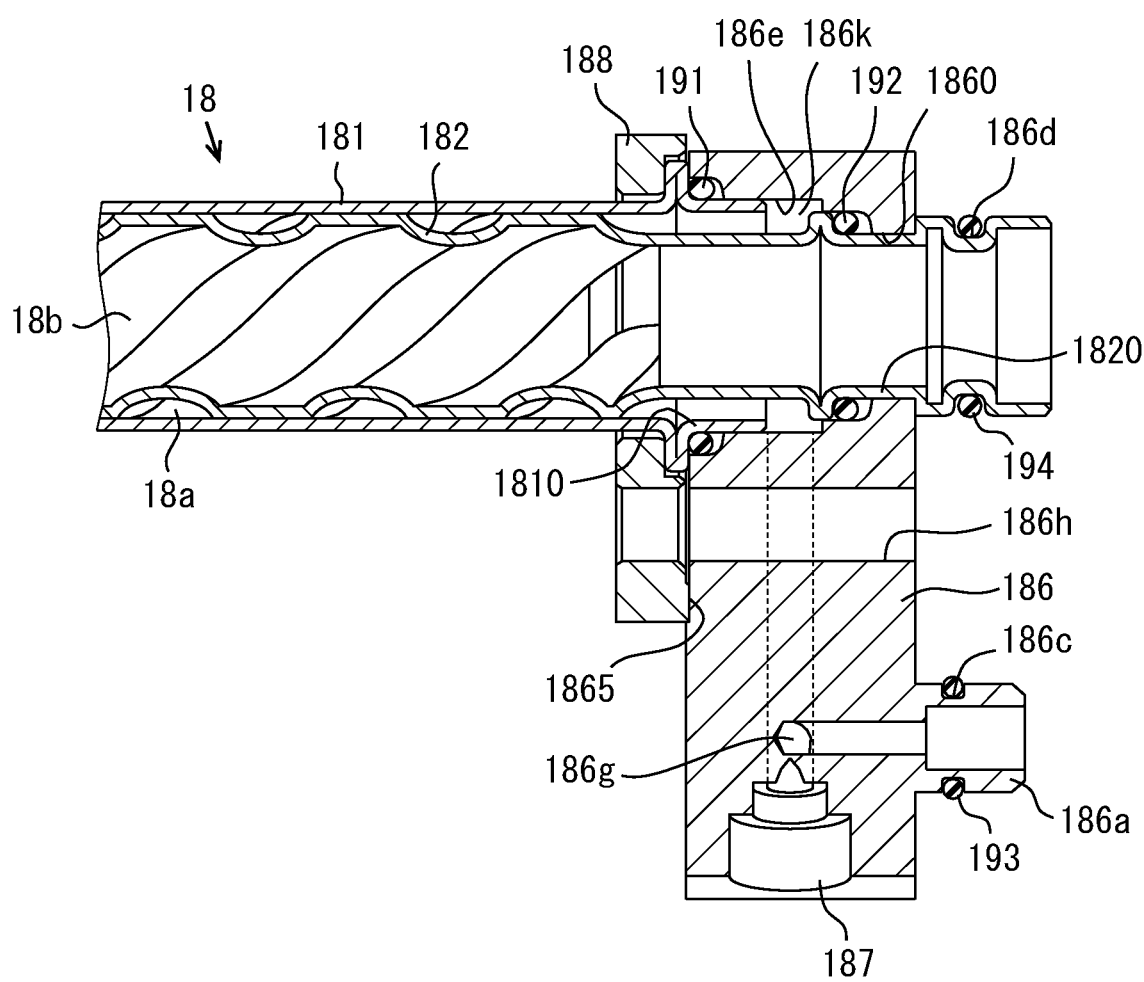
FIG. 29 is a perspective view showing a part of an internal heat exchanger according to a fifteenth embodiment.

In the thirteenth embodiment shown in FIG. 24, the inner pipe 182 is fitted into the counter-expansion valve side connector 31, but the expansion valve side connector 186 may be similarly configured. As shown in FIG. 29, the inner pipe 182 may penetrate the expansion valve side connector 186 to configure a low-pressure joint. In this example, a low-pressure side O-ring groove 186d is formed in the inner pipe 182 to hold the low-pressure side O-ring 194.

Also in this embodiment, the low-pressure side refrigerant flow path corresponds to the end portion 1820 of the inner pipe 182. At the counter-expansion valve side connector 186, the inner pipe insertion portion 1860 holding the end portion 1820 corresponds to the low-pressure side refrigerant flow path.

In the present embodiment, the low-pressure side O-ring groove 186d having a circumferential groove-shape is formed on the inner pipe 182 during condition in which the double pipe is inserted into the expansion valve side connector 186 and fixed by the holding plate 188 with a bolt (not shown). Since the inner pipe 182 is deformed and comes into contact with the expansion valve side connector 186 when the low-pressure side O-ring groove 186d is formed, a joint between the double pipe and the expansion valve side connector 186 becomes stronger.

Sixteenth Embodiment

In the eleventh embodiment in FIG. 21, the double pipe is used from the rear cooler to the expansion valve side connector 186, and further, the double pipe is also used from the expansion valve side connector 186 to a side of the compressor 12 and the condenser 13. Therefore, as compared with the example in FIG. 20, the liquid refrigerant flowing toward the rear cooler is more sub-cooled. In other words, an amount of super-heat of the gas refrigerant flowing from the rear cooler to the compressor 12 becomes large. Therefore, an adoption of the double pipe connected to the rear cooler requires to determine whether the internal heat exchanger 18 is adopted, and an amount of heat exchange thereof based on evaluating an efficiency of the entire refrigeration cycle.

Figure 30:
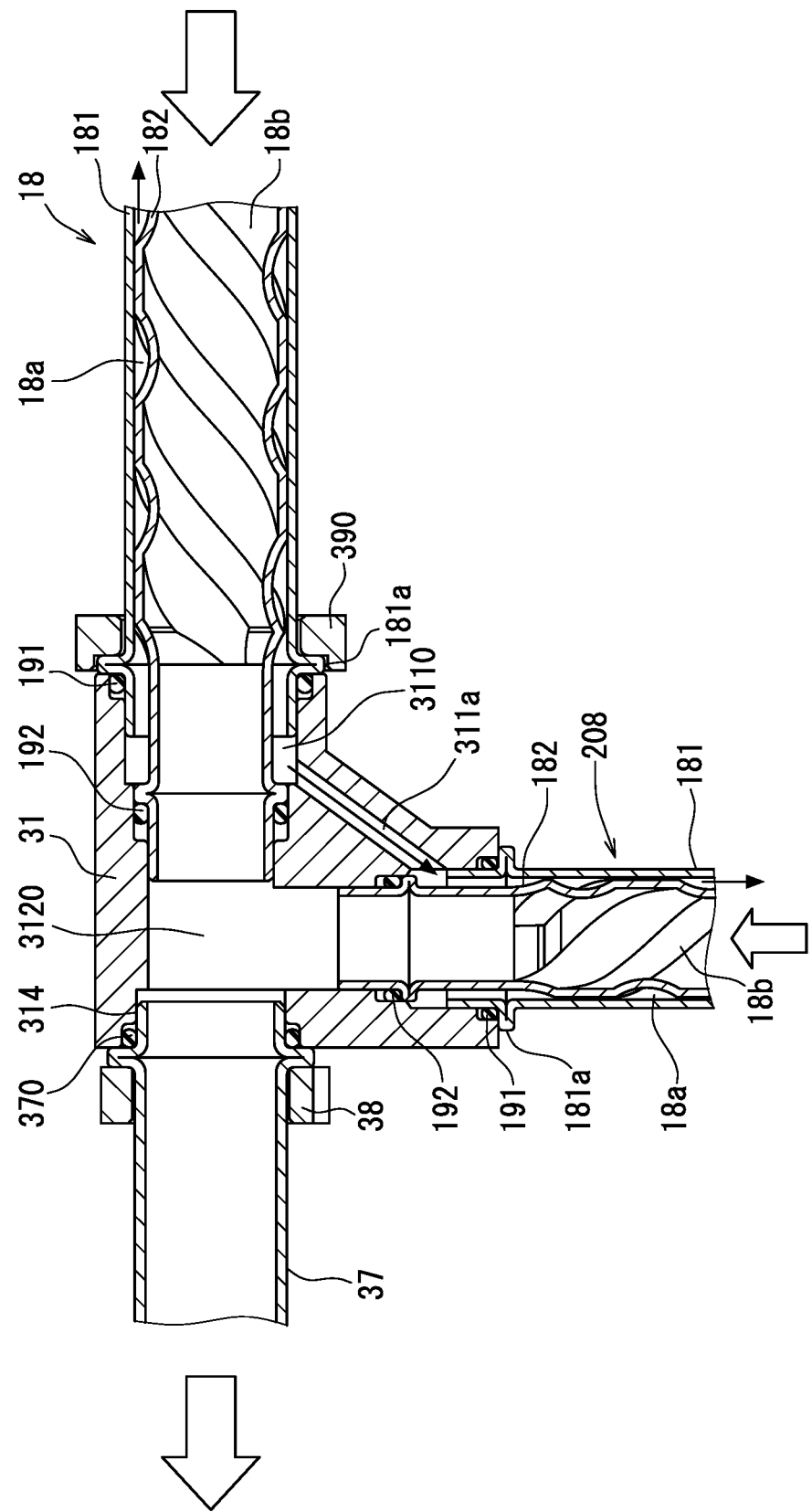
FIG. 30 is a perspective view showing a part of an internal heat exchanger according to a sixteenth embodiment.

Therefore, as in the embodiment shown in FIG. 30, a connector connecting two double pipes may be adopted for the counter-expansion valve side connector 31. In this case, the internal heat exchanger 18 communicates with the front-side indoor air-conditioning unit 20 arranged in the casing 21, and the rear-side internal heat exchanger 208 communicates with the rear cooler.

The low-pressure gas refrigerant from the indoor air-conditioning unit 20 on the front side and the rear cooler flows into the counter-expansion valve side connector 31 from the respective inner flow paths 18b and merges in the low-pressure communication space 3120. Next, it is sucked into the compressor 12 from the low-pressure side piping member 37. The high-pressure liquid refrigerant condensed by the condenser 13 is separated in the high-pressure communication space 3110 of the counter-expansion valve side connector 31, and flows out to the indoor air conditioning unit 20 on the front side and the rear cooler through the respective inner-outer flow paths 18a.

That is, the high-pressure liquid refrigerant that has flowed into the high-pressure communication space 3110 from the high-pressure side joint portion 313 of the counter-expansion valve side connector 31 flows into the inner-outer flow path 18a of the internal heat exchanger 18. The flow of this high-pressure refrigerant is the same as in FIG. 26.

In the present embodiment, the counter-expansion valve side connector 31 is formed with a rear side high-pressure refrigerant flow path 311a toward the rear side internal heat exchanger 208. Then, the high-pressure refrigerant branches in the high-pressure communication space 3110 and also flows into the rear-side high-pressure refrigerant flow path 311a. The liquid refrigerant entering into the rear side high-pressure refrigerant flow path 311a flows into the inner-outer flow path 18a of the rear side internal heat exchanger 208.

The low-pressure gas refrigerant entering into from the inner flow path 18b of the internal heat exchanger 18 and the low-pressure gas refrigerant entering into from the inner flow path 18b of the rear side internal heat exchanger 208 are merged in the low-pressure communication space 3120 of the counter-expansion valve side connector 31. Then, the low-pressure gas refrigerant merged flows from the low-pressure side joint portion 314 to the suction port of the compressor 12 via the low-pressure side piping member 37.

OTHER EMBODIMENTS

The above-described embodiments may be combined with each other to meet requirements. The above-described embodiments may be variously modified as follows, for example.

(1) The spiral groove on the outer surface of the inner pipe 182 is not limited to the one having three threads, but may be a groove portion having one, two, four, etc., and may be a plurality of spiral grooves are provided in a crossing manner. Alternative to the spiral groove, a straight groove extending linearly parallel to the axial direction of the inner pipe 182 may be formed. This is similar to the spiral groove 181b formed on the outer pipe 181.

(2) In the above embodiment, the outer pipe 181 and the inner pipe 182 are made of aluminum, but is not limited to this, and may be made of iron or copper etc. Other materials may be used as long as they have a good heat transfer coefficient.

(3) In the above embodiment, the internal heat exchanger 18 arranged in the refrigeration cycle apparatus 11 is applied to the vehicle air conditioner 10, but is not limited to this, and may be applied to a stationary air conditioner such as an air conditioner for homes and buildings etc.

(4) In the above-described embodiment, a fluorocarbon refrigerant is used as the refrigerant for the refrigeration cycle apparatus 11 and configures a sub-critical refrigeration cycle in which a high-pressure side refrigerant pressure does not exceed a critical pressure of the refrigerant. However, carbon dioxide may be used as the refrigerant to configure a super-critical refrigeration cycle in which a high-pressure side refrigerant pressure is equal to or higher than the critical pressure of the refrigerant.

(5) In the fifth embodiment, both ends of the outer pipe 181 and the inner pipe 182 are connected by the expansion valve side connector 186 and the counter-expansion valve side connector 31. However, only one end on the condenser 13 side and the compressor 12 side among the outer pipe 181 and the inner pipe 182 may be connected by the counter-expansion valve side connector 31.

That is, it may be possible to employ a structure in which the end of the outer pipe 181 and the inner pipe 182 opposite side to the expansion valve 14 is connected to the condenser 13 and the compressor 12 by the counter-expansion valve side connector 31, and the end of the outer pipe 181 and the inner pipe 182 side to the expansion valve 14 is connected to the expansion valve 14 by a liquid pipe, a suction pipe and a joint.

(6) Similarly, in the fifth embodiment, the pressure sensor is used instead of the pressure switch 34, but if necessary, both the pressure switch 34 and the pressure sensor may be used.

(7) In the above-described embodiment, although a positional relation is designed so that the inner pipe side O-ring 192 comes into contact with the expansion valve side connector 186 prior to the outer pipe side O-ring 191 when the double pipe is inserted into the expansion valve side connector 186, if necessary, a reverse relation may be employed. That is, the outer pipe side O-ring 191 may come into contact with the expansion valve side connector 186 in a prior manner.

When the inner pipe side O-ring 192 and the outer pipe side O-ring 191 are in contact with the expansion valve side connector 186, the inner pipe 182 and the outer pipe 181 are inserted into the expansion valve side connector 186 and the axes are aligned, therefore, biting of the inner pipe side O-ring 192 and the outer pipe side O-ring 191 can be satisfactorily prevented.

What is claimed is:
1. An internal heat exchanger comprising:
an outer pipe forming an outside pipe of a double pipe; and
an inner pipe formed separately from the outer pipe and forming an inside pipe of the double pipe, wherein
the inner pipe forms, thereinside, an inner flow path through which a refrigerant of a low-pressure side for a refrigeration cycle flows, and wherein
the inner pipe and the outer pipe form, therebetween, an inner-outer flow path through which the refrigerant of a high-pressure side for the refrigeration cycle flows, and wherein
the outer pipe has an outer diameter of 30 millimeters or less, and wherein a ratio of a difference between an inner diameter of the outer pipe and an outer diameter of the inner pipe to the inner diameter of the outer pipe is 25% or less, and wherein the inner pipe and the outer pipe form, therebetween, a concentric structure which maintains a flow path cross-sectional area of the inner-outer flow path and arranges the outer pipe and the inner pipe concentrically, and wherein the inner pipe has a distal end which extends more outwardly in an axial direction than a distal end of the outer pipe, and further comprising:

a connector interposed between the outer pipe and the inner pipe and a connection target member and defines both a low-pressure communication flow path communicating the inner flow path with a refrigerant passage of the connection target member and a high-pressure communication flow path communicating the inner-outer flow path with a refrigerant flow path of the connection target member, wherein the distal end of the outer pipe is separated from an innermost portion of an outer pipe insertion portion of the connector to form a high-pressure communication space communicating the high-pressure communication flow path, and wherein an outer pipe side sealing member is interposed between the outer pipe and the outer pipe insertion portion of the connector to prevent a refrigerant leakage from the high-pressure communication space, and wherein an inner pipe side sealing member is interposed between the inner pipe and an inner pipe insertion portion of the connector to prevent a refrigerant leakage from the high-pressure communication space, and wherein the double pipe and the connector are mechanically fixed at a place other than places where the outer pipe side sealing member and the inner pipe side sealing member are arranged, and wherein the concentric structure is not defined at a position where the outer pipe side sealing member and the inner pipe side sealing member are arranged, and wherein an end portion of the outer pipe at the connector is pressed and deformed inward in the radial direction of the outer pipe over a predetermined distance.

2. The internal heat exchanger according to claim 1, wherein
the outer pipe, the inner pipe, and the connector are mechanically fixed by a bolt.

3. The internal heat exchanger according to claim 1, wherein
the outer pipe and the connector are mechanically crimped and fixed.

4. The internal heat exchanger according to claim 1, wherein
the connector includes attachments to which at least one of a service valve, a pressure switch and a pressure sensor is attached.

5. The internal heat exchanger according to claim 1, wherein
the connector includes a male-shaped portion to be inserted into a female-shaped portion forming an opening of the refrigerant flow path among the connection target member.

6. The internal heat exchanger according to claim 1, wherein
the connector includes a female-shaped portion to be inserted into a male-shaped portion forming an opening of the refrigerant flow path among the connection target member.

7. The internal heat exchanger according to claim 1, wherein
the connector is formed so that end portions of the high-pressure communication flow path and the low-pressure communication flow path on a side of the connection target member opens in a direction parallel to an extension direction of the outer pipe and the inner pipe.

8. The internal heat exchanger according to claim 1, wherein
the connector is formed so that end portions of the high-pressure communication flow path and the low-pressure communication flow path on a side of the connection target member opens in a direction orthogonal to an extension direction of the outer pipe and the inner pipe.

9. The internal heat exchanger according to claim 1, wherein
the connector is formed so that an axial direction of the high-pressure communication flow path is parallel to an axial direction of the low-pressure communication flow path, and both axial directions are inclined at a predetermined angle with an extension direction of the outer pipe and the inner pipe.

10. The internal heat exchanger according to claim 1, wherein
the connection target member is an expansion valve that decompresses and expands the refrigerant on a high-pressure side.

11. The internal heat exchanger according to claim 1, wherein
the connection target member is a piping member through which the refrigerant flows.

12. The internal heat exchanger according to claim 1, wherein
the connector forms, thereinside, a low-pressure refrigerant passage communicating with the inner flow path and an orifice passage communicating with the inner-outer flow path to decompress and expand the high-pressure side refrigerant, and wherein
the connector is arranged with a valve body portion which changes a passage cross-sectional area of the orifice passage and an element portion which outputs a driving force for displacing the valve body portion.

13. The internal heat exchanger according to claim 1, wherein
the concentric structure is a structure in which a spiral groove is formed on one of the inner pipe and the outer pipe, and a ridge portion of the spiral groove comes into contact with the other one of the inner pipe and the outer pipe at a plurality of places.

14. The internal heat exchanger according to claim 1, wherein
the concentric structure is a rib which is formed to project from one of the inner pipe and the outer pipe toward the other one of the inner pipe and the outer pipe, and is a structure in which the rib has a distal end coming into contact with the other one of the inner pipe and the outer pipe at a plurality of places.

15. The internal heat exchanger according to claim 1, wherein
the inner pipe is formed with a groove which holds an inner pipe side sealing member on an end portion, and the outer pipe is formed with a groove which holds an outer pipe side sealing member on an end portion.

16. The internal heat exchanger according to claim 1, wherein
the inner pipe has an end portion with a circular cylindrical shape, and the inner pipe side sealing member is sandwiched and held between the end portion with the circular cylindrical shape of the inner pipe and the inner pipe insertion portion of the connector, and the outer pipe has an end portion with a circular cylindrical shape, and the outer pipe side sealing member is sandwiched and held between the end portion with the circular cylindrical shape of the outer pipe and the outer pipe insertion portion of the connector.

17. The internal heat exchanger according to claim 1, wherein
the outer pipe is formed, on an end portion, with a contact portion which comes into contact with the connector in an outer peripheral direction, and wherein
a distance between the distal end of the inner pipe and an innermost portion of the inner pipe insertion portion is longer than a distance between the distal end of the outer pipe and an innermost portion of the outer pipe insertion portion, and wherein
the distal end of the inner pipe and the innermost portion of the inner pipe insertion portion forms a gap therebetween.

18. The internal heat exchanger according to claim 17, wherein
the inner pipe has an end portion with a circular cylindrical shape, the end portion being formed with a flange, and the inner pipe side sealing member is sandwiched and held between the flange with the circular cylindrical shape of the inner pipe and the inner pipe insertion portion of the connector,
the outer pipe has an end portion with a circular cylindrical shape, and the outer pipe side sealing member is sandwiched and held between the contact portion with the circular cylindrical shape of the outer pipe and the outer pipe insertion portion of the connector.

19. The internal heat exchanger according to claim 17, wherein
a positional relationship between the distal end of the inner pipe, the inner pipe side sealing member, the distal end of the outer pipe, and the outer pipe side sealing member, and the inner pipe insertion portion, the outer pipe insertion portion, and the contact portion of the connector define a structure,
at inserting the inner pipe and the outer pipe into the connector,
first, the distal end of the inner pipe comes into contact with the inner pipe insertion portion, next, the distal end of the outer pipe comes into contact with the outer pipe insertion portion, after that, the inner pipe side sealing member comes into contact with the inner pipe insertion portion, after that, the outer pipe side sealing member comes into contact with the outer pipe insertion portion, and finally the contact portion comes into contact with the connector.

20. The internal heat exchanger according to claim 17, wherein
a positional relationship between the distal end of the inner pipe, the inner pipe side sealing member, the distal end of the outer pipe, and the outer pipe side sealing member, and the inner pipe insertion portion, the outer pipe insertion portion, and the contact portion of the connector define a structure, a distance of the distal end of the inner pipe and the distal end of the outer pipe is longer than a distance of a beginning point of a portion, which comes into contact with the inner pipe, among the inner pipe insertion portion and a beginning point of a portion, which comes into contact with the outer pipe, among the outer pipe insertion portion.

21. The internal heat exchanger according to claim 18, wherein
a positional relationship between the distal end of the inner pipe, the flange portion, the inner pipe side sealing member, the distal end of the outer pipe, and the outer pipe side sealing member, and the inner pipe insertion portion, the outer pipe insertion portion, and the contact portion of the connector define a structure, in which
a distance of the inner pipe O-ring holding portion among the inner pipe insertion portion is longer than a distance of the outer pipe O-ring holding portion among the outer pipe insertion portion.

22. The internal heat exchanger according to claim 21, wherein
a positional relationship between the distal end of the inner pipe, the flange portion, the inner pipe side sealing member, the distal end of the outer pipe, and the outer pipe side sealing member, and the inner pipe insertion portion, the outer pipe insertion portion, and the contact portion of the connector define a structure, in which
a distance of the distal end of the inner pipe and the flange portion is longer than a sum of a distance of the inner pipe O-ring holding portion among the inner pipe insertion portion and a diameter of the inner pipe side sealing member, and wherein
a distance of the distal end of the outer pipe and the contact portion is longer than a sum of a distance of the outer pipe O-ring holding portion among the outer pipe insertion portion and a diameter of the outer pipe side sealing member.

23. The internal heat exchanger according to claim 13, wherein
the end portion of the outer pipe is press formed inward in the radial direction of the outer pipe over a predetermined distance.

24. The internal heat exchanger according to claim 1, wherein
the connector is arranged at both sides of distal ends of the inner pipe and the outer pipe, and wherein
the inner pipe and the outer pipe perform, therebetween, heat exchange efficiencies which are different at a part of a portion between the inner pipe and the outer pipe and at another portion between the inner pipe and the outer pipe.

25. The internal heat exchanger according to claim 14, wherein
the spiral groove is formed in a first part of a portion between the inner pipe and the outer pipe and is not formed in a second part of the portion between the inner pipe and the outer pipe, and wherein
the connector is arranged at both sides of distal ends of the inner pipe and the outer pipe, and wherein
the inner pipe and the outer pipe perform, therebetween, heat exchange efficiencies which are different at the first part of the portion between the inner pipe and the outer pipe and at the second part of the portion between the inner pipe and the outer pipe.

26. The internal heat exchanger according to claim 1, wherein
the concentric structure is defined at an end portion of at least one of the outer pipe and the inner pipe which comes directly in contact with the connector.

27. The internal heat exchanger according to claim 1, wherein
the end portions of the outer pipe and the inner pipe at the connector are joined to each other via the concentric structure.

28. A refrigeration cycle apparatus comprising:
a compressor; a condenser; an expansion valve for an indoor air conditioning unit; an evaporator for the indoor air-conditioning unit; an expansion valve for a rear cooler; an evaporator for the rear cooler; and an internal heat exchanger, wherein
the internal heat exchanger includes:
an outer pipe forming an outside pipe of a double pipe; and
an inner pipe formed separately from the outer pipe and forming an inside pipe of the double pipe, and wherein
the inner pipe forms, thereinside, an inner flow path through which a refrigerant of a low-pressure side for a refrigeration cycle flows, and wherein
the inner pipe and the outer pipe form, therebetween, an inner-outer flow path through which the refrigerant of a high-pressure side for the refrigeration cycle flows, and wherein
the outer pipe has an outer diameter of 30 millimeters or less, and wherein
a ratio of a difference between an inner diameter of the outer pipe and an outer diameter of the inner pipe to the inner diameter of the outer pipe is 25% or less, and wherein
the inner pipe and the outer pipe form, therebetween, a concentric structure which maintains a flow path cross-sectional area of the inner-outer flow path and arranges the outer pipe and the inner pipe concentrically, further comprising:
a connector located at end portions of the outer pipe and the inner pipe, and forms a high-pressure communication flow path communicating the inner-outer flow path with a refrigerant flow path of a connection target member, and a low-pressure communication flow path communicating the inner flow path with a refrigerant passage of the connection target member;
an outer pipe side sealing member located at the end portion of the outer pipe to prevent a refrigerant leakage; and
an inner pipe side sealing member located at the end portion of the inner pipe to prevent a refrigerant leakage, wherein
the double pipe and the connector are mechanically fixed at a place other than places where the outer pipe side sealing member and the inner pipe side sealing member are arranged, and wherein
the concentric structure is not defined at a position where the outer pipe side sealing member and the inner pipe side sealing member are arranged, and wherein
an end portion of the outer pipe at the connector is pressed and deformed inward in the radial direction of the outer pipe over a predetermined distance, and wherein
the internal heat exchanger is interposed between the condenser and the compressor, and the expansion valve for the indoor air-conditioning unit and the expansion valve for the rear cooler, and wherein
the connector connects the high-pressure communication flow path with at least the condenser or one of the expansion valve for the indoor air-conditioning unit and the expansion valve for the rear cooler, and connects the low-pressure communication flow path with at least the expansion valve for the indoor air-conditioning unit and one of the expansion valve for the rear cooler or the compressor.

29. The refrigeration cycle apparatus according to claim 28, wherein
the connector is arranged on a side of the internal heat exchanger to the expansion valve of the indoor air-conditioning unit, is connected with the expansion valve for the indoor air-conditioning unit by a high-pressure side joint and a low-pressure side joint, and is connected with the expansion valve for the rear cooler by a high-pressure liquid refrigerant pipe and a low-pressure gas refrigerant pipe.

30. The refrigeration cycle apparatus according to claim 28, wherein
the connector is arranged on a side of the internal heat exchanger to the expansion valve of the indoor air-conditioning unit, is connected with the expansion valve for the indoor air-conditioning unit by a high-pressure side joint and a low-pressure side joint, and is connected with the expansion valve of the rear cooler by an internal heat exchanger for the rear cooler.

31. The refrigeration cycle apparatus according to claim 28, wherein
the connector is arranged on both sides of the internal heat exchanger to the expansion valve and to a counter-expansion valve for the indoor air-conditioning unit, is connected with the expansion valve for the indoor air-conditioning unit by a high-pressure side joint and a low-pressure side joint, and is connected with the expansion valve for the rear cooler by a high-pressure liquid refrigerant pipe connected to the expansion valve side connector and a low-pressure gas refrigerant pipe connected to the counter-expansion valve side connector.

32. The refrigeration cycle apparatus according to claim 28, wherein
the connector is arranged on both sides of the internal heat exchanger to the expansion valve and to a counter-expansion valve for the indoor air-conditioning unit, is connected with the expansion valve for the indoor air-conditioning unit by a high-pressure side joint and a low-pressure side joint, and is connected with the expansion valve for the rear cooler via a rear cooler internal heat exchanger connected to a counter-expansion valve side connector.

33. An internal heat exchanger comprising:
an outer pipe forming an outside pipe of a double pipe; and
an inner pipe formed separately from the outer pipe and forming an inside pipe of the double pipe, and wherein
the inner pipe forms, thereinside, an inner flow path through which a refrigerant of a low-pressure side for a refrigeration cycle flows, and wherein
the inner pipe and the outer pipe form, therebetween, an inner-outer flow path through which the refrigerant of a high-pressure side for the refrigeration cycle flows, and wherein
the inner pipe and the outer pipe form, therebetween, a concentric structure which arranges the outer pipe and the inner pipe concentrically, and wherein the inner pipe has a distal end which extends more outwardly in an axial direction than a distal end of the outer pipe, and further comprising:
a connector interposed between the outer pipe and the inner pipe and a connection target member and defines both a low-pressure communication flow path communicating the inner flow path with a refrigerant passage of the connection target member and a high-pressure communication flow path communicating the inner-outer flow path with a refrigerant flow path of the connection target member;
an outer pipe side sealing member is interposed between the outer pipe and an outer pipe insertion portion of the connector to prevent a refrigerant leakage from a high-pressure communication space; and
an inner pipe side sealing member is interposed between the inner pipe and an inner pipe insertion portion of the connector to prevent a refrigerant leakage from the high-pressure communication space, wherein
the double pipe and the connector are mechanically fixed at a place other than places where the outer pipe side sealing member and the inner pipe side sealing member are arranged, and wherein
the high-pressure communication space is formed so that the distal end of the outer pipe is separated from an innermost portion of the outer pipe insertion portion of the connector, and wherein
the high-pressure communication flow path communicates with the high-pressure communication space, and wherein
the distal end of the inner pipe and the innermost portion of the inner pipe insertion portion form a gap therebetween, and wherein
the distal end of the inner pipe and the distal end of the outer pipe are capable of being shifted in an axial deviation.

34. The internal heat exchanger according to claim 33, wherein
the outer pipe is formed, on an end portion, with a contact portion which comes into contact with the connector in an outer peripheral direction.

* * * * *